(12) United States Patent
Gibson

(10) Patent No.: US 7,076,045 B2
(45) Date of Patent: *Jul. 11, 2006

(54) SYSTEM AND METHOD FOR IMPLEMENTING AND ACCESSING CALL FORWARD SERVICES

(75) Inventor: Elizabeth Goldwyn Gibson, Austin, TX (US)

(73) Assignee: SBC Properties, L.P., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/049,350

(22) Filed: Feb. 3, 2005

(65) Prior Publication Data

US 2005/0195957 A1 Sep. 8, 2005

Related U.S. Application Data

(63) Continuation of application No. 10/164,065, filed on Jun. 7, 2002, now Pat. No. 6,954,524.

(51) Int. Cl.
*G06F 3/00* (2006.01)
*H04M 3/42* (2006.01)
*H04M 3/46* (2006.01)
*H04M 3/54* (2006.01)

(52) U.S. Cl. .......................... 379/211.02; 379/201.04; 715/760; 715/780

(58) Field of Classification Search ........... 379/201.01, 379/201.02, 201.03, 201.04, 201.12, 211.02, 379/211.03, 211.04; 715/700, 760, 764, 715/780

See application file for complete search history.

(56) References Cited

U.S. PATENT DOCUMENTS

| | | | |
|---|---|---|---|
| 4,053,949 A | 10/1977 | Recca et al. | |
| 4,191,860 A | 3/1980 | Weber | |
| 4,313,035 A | 1/1982 | Jordan et al. | |
| 4,611,094 A | 9/1986 | Asmuth et al. | |
| 4,611,096 A | 9/1986 | Asmuth et al. | |
| 4,756,020 A | 7/1988 | Fodale | |

(Continued)

FOREIGN PATENT DOCUMENTS

EP 0740480 10/1993

(Continued)

OTHER PUBLICATIONS

CLASS, Calling Name Delivery Generic Requirements FSD 01-02-1070, LATA Switching Systems Generic Requirements, Bell Communications Research, Technical TR-NWT-001188, Issue 1 (Dec. 1991).

(Continued)

*Primary Examiner*—Harry S. Hong
(74) *Attorney, Agent, or Firm*—Greenblum & Bernstein, P.L.C.

(57) ABSTRACT

A call forwarding service forwards calls placed to a subscriber's number to a forward-to number. Enabling an interface with the call forwarding service includes transmitting display data from a call forwarding service server through a packet switched data network to the subscriber's graphical user interface. At least a portion of the display data is displayed on a first screen of the graphical user interface, which includes a forward-to number field and at least one of multiple activation fields. The activation fields include a first activation indicator corresponding to the call forwarding service, a second activation indicator corresponding to the screening list and a third activation indicator corresponding to the schedule. Selection data is entered by the subscriber in response to the first screen, the selection data indicating one of an ON condition and an OFF condition corresponding to the at least one of the activation fields.

9 Claims, 39 Drawing Sheets

U.S. PATENT DOCUMENTS

| | | |
|---|---|---|
| 4,757,267 A | 7/1988 | Riskin |
| 4,788,718 A | 11/1988 | McNabb et al. |
| 4,802,199 A | 1/1989 | Lange et al. |
| 4,893,336 A | 1/1990 | Wuthnow |
| 4,899,373 A | 2/1990 | Lee et al. |
| 4,959,855 A | 9/1990 | Daudelin |
| 4,995,074 A | 2/1991 | Goldman et al. |
| 5,054,055 A | 10/1991 | Hanle et al. |
| 5,117,452 A | 5/1992 | Callele et al. |
| 5,241,588 A | 8/1993 | Babson, III et al. |
| 5,247,571 A | 9/1993 | Kay et al. |
| 5,253,288 A | 10/1993 | Frey et al. |
| 5,315,641 A | 5/1994 | Montgomery et al. |
| 5,339,352 A | 8/1994 | Armstrong et al. |
| 5,343,516 A | 8/1994 | Callele et al. |
| 5,345,380 A | 9/1994 | Babson et al. |
| 5,353,331 A | 10/1994 | Emery et al. |
| 5,367,566 A | 11/1994 | Moe et al. |
| 5,369,695 A | 11/1994 | Chakravarti et al. |
| 5,377,186 A | 12/1994 | Wegner et al. |
| 5,384,831 A | 1/1995 | Creswell et al. |
| 5,392,342 A | 2/1995 | Rosenthanl |
| 5,436,957 A | 7/1995 | McConnell |
| 5,440,620 A | 8/1995 | Slusky |
| 5,448,633 A | 9/1995 | Jamaleddin et al. |
| 5,467,388 A | 11/1995 | Redd, Jr. et al. ........ 379/210.02 |
| 5,469,500 A | 11/1995 | Satter et al. |
| 5,487,111 A | 1/1996 | Slusky |
| 5,491,744 A | 2/1996 | Kikinis |
| 5,502,759 A | 3/1996 | Cheng et al. |
| 5,513,251 A | 4/1996 | Rochkind et al. |
| 5,519,767 A | 5/1996 | O'Horo et al. |
| 5,533,102 A | 7/1996 | Robinson et al. |
| 5,546,447 A | 8/1996 | Skarbo et al. |
| 5,579,379 A | 11/1996 | D'Amico et al. |
| 5,583,564 A | 12/1996 | Rao et al. |
| 5,592,541 A | 1/1997 | Fleischer, III et al. |
| 5,594,859 A | 1/1997 | Palmer et al. |
| 5,598,464 A | 1/1997 | Hess et al. |
| 5,602,909 A | 2/1997 | Carkner et al. |
| 5,613,006 A | 3/1997 | Reese |
| 5,615,252 A | 3/1997 | Sizer, II et al. |
| 5,625,676 A | 4/1997 | Greco et al. |
| 5,625,681 A | 4/1997 | Butler, II |
| 5,627,978 A | 5/1997 | Altom et al. |
| 5,629,978 A | 5/1997 | Blumhardt et al. |
| 5,651,060 A | 7/1997 | Cohn et al. |
| 5,657,382 A | 8/1997 | Tamagawa et al. |
| 5,661,792 A | 8/1997 | Akinpelu et al. |
| 5,684,862 A | 11/1997 | Finnigan |
| 5,689,555 A | 11/1997 | Sonnenberg |
| 5,696,815 A | 12/1997 | Smyk |
| 5,703,935 A | 12/1997 | Raissyan et al. |
| 5,724,412 A | 3/1998 | Srinivasan |
| 5,742,668 A | 4/1998 | Pepe et al. |
| 5,751,707 A | 5/1998 | Voit et al. |
| 5,754,636 A | 5/1998 | Bayless et al. |
| 5,764,748 A | 6/1998 | Rosenthal et al. |
| 5,771,283 A | 6/1998 | Chang et al. |
| 5,802,157 A | 9/1998 | Clarke et al. |
| 5,805,587 A | 9/1998 | Norris et al. |
| 5,809,128 A | 9/1998 | McMullin |
| 5,825,862 A | 10/1998 | Volt et al. |
| 5,832,061 A | 11/1998 | Rubin |
| 5,854,836 A | 12/1998 | Nimmagadda |
| 5,870,549 A | 2/1999 | Bobo, II |
| 5,881,144 A | 3/1999 | Havens |
| 5,892,821 A | 4/1999 | Turner |
| 5,915,008 A | 6/1999 | Dulman et al. |
| 5,917,817 A | 6/1999 | Dunn et al. |
| 5,917,899 A | 6/1999 | Moss et al. |
| 5,920,618 A | 7/1999 | Fleischer, III et al. |
| 5,933,490 A | 8/1999 | White et al. |
| 5,933,778 A | 8/1999 | Buhrmann et al. |
| 5,937,050 A | 8/1999 | Yue et al. |
| 5,940,488 A | 8/1999 | DeGrazia et al. |
| 5,946,381 A | 8/1999 | Danne et al. |
| 5,958,016 A | 9/1999 | Chang et al. |
| 5,982,774 A | 11/1999 | Foladare et al. |
| 5,982,870 A | 11/1999 | Pershan et al. |
| 5,999,611 A | 12/1999 | Tatchell et al. ........ 379/211.02 |
| 6,014,379 A | 1/2000 | White et al. |
| 6,018,575 A | 1/2000 | Gross et al. |
| 6,028,917 A | 2/2000 | Creamer et al. |
| 6,031,836 A | 2/2000 | Haserodt |
| 6,031,896 A | 2/2000 | Gardell et al. |
| 6,038,296 A | 3/2000 | Brunson et al. |
| 6,041,325 A | 3/2000 | Shah et al. |
| 6,058,175 A | 5/2000 | Schultz |
| 6,058,178 A | 5/2000 | McKendry et al. |
| 6,078,581 A | 6/2000 | Shtivelman et al. |
| 6,078,583 A | 6/2000 | Takahara et al. |
| 6,081,589 A | 6/2000 | Jiang et al. |
| 6,088,433 A | 7/2000 | Culli et al. |
| 6,091,808 A | 7/2000 | Wood et al. |
| 6,101,246 A | 8/2000 | Heinmiller et al. |
| 6,125,126 A | 9/2000 | Hallenst |
| 6,161,128 A | 12/2000 | Smyk |
| 6,192,118 B1 | 2/2001 | Bayless et al. |
| 6,219,413 B1 | 4/2001 | Burg |
| 6,263,064 B1 | 7/2001 | O'Neal et al. |
| 6,304,641 B1 | 10/2001 | Culli et al. |
| 6,337,899 B1 | 1/2002 | Alcendor et al. |
| 6,442,259 B1 | 8/2002 | Culli et al. |
| 6,477,374 B1 | 11/2002 | Shaffer et al. |
| 6,631,186 B1 | 10/2003 | Adams et al. |
| 6,718,028 B1 | 4/2004 | Culli et al. |
| 6,816,481 B1 | 11/2004 | Machacek et al. |
| 6,954,524 B1* | 10/2005 | Gibson ................ 379/211.02 |
| 2002/0031207 A1 | 3/2002 | Lin ........................ 379/88.17 |
| 2002/0165969 A1 | 11/2002 | Gallant ...................... 709/227 |

FOREIGN PATENT DOCUMENTS

| | | |
|---|---|---|
| WO | 98/52342 | 11/1998 |
| WO | 00/03535 | 1/2000 |
| WO | 0010346 | 2/2000 |
| WO | 02/43338 | 5/2002 |

OTHER PUBLICATIONS

Switching System Requirements for Call Control Using the Integrated Services Digital network User Part Communications Research, Technical Reference TR-TSY-000317, Issue 2 (Jan. 1989).

"CLASS Feature: Selective Call Acceptance," Bell Communications Research, Technical Advisory TA-TSY-001034, Issue 1 (Apr. 1990).

"CLASS Feature: Distinctive Ringing/Call Waiting," Bell Communications Research, Technical Reference TR-TSY-000219, Issue 2 (Aug. 1988).

CLASS Feature: Calling Number Delivery FSD-01-02-1051,: Bell Communications Research, Technical Reference TR-TSY-000031, Issue 3 (Jan. 1990).

"ISDN Call Forwarding," Bell Communications Research, Technical Reference TR-TSY-000853, Issue 1 (Dec. 1988).

"ISDN Call Forwarding, Revision 1," Bell Communications Research, Technical Reference TR-TSY-000853, Revision 1 (Dec. 1993).

"Generic Requirements for ISDN Automatic Recall," Bell Communications Research, Technical Reference TR-NWT-001199, Issue 1 (Feb. 1992).

"CLASS Feature: Automatic Recall FSD 01-02-1260," Bell Communications Research, Technical Reference TR-NWT-000227, Issue 3 (Jun. 1993).

"CLASS Feature: Automatic Callback FSD 01-02-1250" Bell Communications Research, Technical Reference TR-NWT-000215, Issue 3 (Jun. 1993).

"CLASS Feature: Automatic Callback—Bulletin 1," Bell Communications Research, (Apr. 1995).

"Status of PIN's and Remote Access," Bell Communications Research, Technical Memorandum TM-INS-021336, May 29, 1992.

Berman et al., "Perspectives on the AIN Architecture," IEEE Communications Magazine, Feb. 1992, pp. 27-32.

Internet web pages by Z-Tel, "Personal Communications Center", dated Apr. 13, 2000 and May 15, 2000.

Internet web pages by TOSC International, "Cool Call", dated May 4, 2000.

Internet web pages by Phone. Com, "My Phone Service", dated May 4, 2000.

Internet web pages by Sea Communications, Inc., WavMail, dated Jul. 28, 2000.

Internet web pages by Donner, Chris, Pondering PC-PBX Permutations, CTI PCPBX Round-up, dated Dec. 1998.

Internet web pages by CNN.com, "Internet Call Waiting Turns One Phone Line Into Two", dated Aug. 13, 1999.

Internet web pages by Cincinnati Bell, "Internet Call Manager", dated 2000.

U.S. Appl. No. 09/050,986 to Baniak et al., filed on Mar. 31, 1998, which is now abandoned.

U.S. Appl. No. 10/435,195 to Adams et al., filed on May 12, 2003.

* cited by examiner

SYSTEM AND METHOD FOR IMPLEMENTING AND ACCESSING CALL FORWARD SERVICES

This application is a continuation application of U.S. patent application Ser. No. 10/164,065, filed on Jun. 7, 2002, now U.S. Pat. No. 6,954,524, the disclosure of which is expressly incorporated herein by referenced in its entirety.

CROSS REFERENCE TO RELATED APPLICATIONS

This application is related to U.S. patent application Ser. No. 09/716,276, filed Nov. 21, 2000, entitled "System and Method for Implementing and Accessing Call Forwarding Services" in the names of T. Adams et al., which is a continuation-in-part of U.S. patent application Ser. No. 09/619,312, filed Jul. 19, 2000, entitled "System and Method for Providing Remote Access to Telecommunications Services" in the names of A. BHANDARI et al., the disclosures of which are expressly incorporated by reference herein in their entireties. This application is further related to U.S. patent application Ser. No. 10/134,637, filed Apr. 30, 2002, entitled "Voice Enhancing for Advance Intelligent Network Services," in the names of S. Crockett et al., which application is a continuation-in-part of U.S. patent application Ser. No. 09/716,276, filed Nov. 21, 2000, entitled "System and Method for Implementing and Accessing Call Forwarding Services" in the names of T. Adams et al., referenced above, and a continuation-in-part of U.S. patent application Ser. No. 09/983,303, filed Oct. 24, 2001, entitled "System and Method for Restricting and Monitoring Telephone Calls" in the names of N. Book et al., which is related to U.S. patent application Ser. No. 09/716,276, filed Nov. 21, 2000, entitled "System and Method for Implementing and Accessing Call Forwarding Services" in the names of T. Adams et al., referenced above, the disclosures of which are expressly incorporated by reference herein in their entireties.

BACKGROUND OF THE INVENTION

1. Field of the Invention

The present invention relates to the field of telecommunications. More particularly, the present invention relates to call forwarding services that enable subscribers to forward calls to alternative locations.

2. Acronyms

The written description provided herein contains acronyms which refer to various telecommunications services, components and techniques, as well as features relating to the present invention. Although some of these acronyms are known, use of these acronyms is not strictly standardized in the art. For purposes of the written description herein, the acronyms are defined as follows:

Advanced Intelligent Network (AIN)
Anonymous Call Rejection (ACR)
Authentication/Subscription Information (ASI)
Call Processing Record (CPR)
Caller Identification (Caller ID)
Central Office (CO)
Customer Premises Equipment (CPE)
Dual Tone Multi-Frequency (DTMF)
Graphical User Interface (GUI)
Generic Data Interface (GDI)
HyperText Mark-Up Language (HTML)
HyperText Transfer Language Protocol (HTTP)
Incoming Call Manager (ICM)
Interactive Voice Response (IVR)
Internet Caller Identification (ICID)
Internet Call Waiting (ICW)
Lightweight Directory Access Protocol (LDAP)
Line Information Database (LIDB)
Outgoing Call Control (OCC)
Personal Computer (PC)
Personal Call Manager/Personal Communications Manager (PCM)
Personal Digital Assistant (PDA)
Personal Identification Number (PIN)
Public Switched Telephone Network (PSTN)
Registration Server (RS)
Service Control Point (SCP)
Service Management System (SMS)
Service Node/Intelligent Peripheral (SN/IP)
Service Switching Point (SSP)
Signaling System 7 (SS7)
Signaling Transfer Point (STP)
Terminating Attempt Trigger (TAT)
Time of Day/Day of Week (TOD/DOW)
Transaction Capabilities Application Part (TCAP)
Transmission Control Protocol/Internet Protocol (TCP/IP)
Uniform Resource Locator (URL)
World Wide Web (WWW)

3. Background Information

Currently, subscribers to call control services within the public switched telephone network (PSTN) are able to initiate and modify their services by calling a customer service representative or by interacting with an interactive voice response (IVR) system using a standard dual tone multi-frequency (DTMF) telephone device. These methods practically limit the number and types of services that can be provided to and modified by the subscribers because all information pertaining to the services is presented audibly. In addition, the potential market for subscribers to call control services is not fully exploited because of customer reluctance to use IVR systems.

There have been attempts to remedy the problems associated with IVR access to PSTN services. These attempts incorporate use of packet switched data networks, such as the Internet, to avoid conventional IVR systems and to streamline the initiation and modification functions. Generally, the PSTN services and related parameters are displayed to the subscriber on a graphical user interface (GUI), which interfaces with the PSTN intelligence through a web server, for example, in the packet switched data network. The current Internet based systems have several drawbacks, however, including the inability to ensure near real-time update of services and incompatibility with existing IVR implementations. Furthermore, often the presentation of the available PSTN services on the GUI is cluttered and confusing, preventing the subscriber from effortlessly creating, implementing and editing the desired service. The subscriber may spend an inordinate amount of time attempting to understand the display and decipher instructions for routinely interfacing with the service. As a result, the subscriber may resort to trial and error implementation of the service, or become altogether discouraged and revert to use of the conventional IVR or live customer service interaction.

For many call control services, subscribers must submit requests to the customer service arm of their provider to initiate new services or update existing ones. The requests are implemented according to the provider's time line and discretion. It is difficult for the users to gauge when the service alteration will take effect. Also, because the current Internet based systems operate exclusively from the conventional IVR systems, i.e., the two systems cannot coexist, customers must select either the Internet interface or the IVR interface. Consequently, a customer who has selected the Internet interface, and who is without a PC and/or Internet access, is not able to make desired changes to his or her services through an IVR. The inability to implement desired changes is especially troublesome considering that users are often interested in altering some call services (e.g., call forwarding, paging, and caller ID) when they are away from their home or business telephone and PC.

An example of call control services provided over a packet switched data network is described in CHANG et al., U.S. Pat. No. 5,958,016, which teaches enabling advanced intelligence network (AIN) services over the World Wide Web (WWW or "the web") through a provisioning system called the service management system (SMS). A conventional approach to implementing a call management system, including a call forwarding service, is presented in WOOD et al., U.S. Pat. No. 6,091,808, which describes a telephone call management network that can be remotely accessed by customers using web browsers over the Internet. One of the call services managed by the system disclosed in WOOD et al. is call forwarding. In WOOD et al. the customer is able to activate and deactivate call forwarding via a web facility. However, there is no provision for accomplishing the same objective alternatively via a PSTN, only using a DTMF telephone.

Another disadvantage of conventional Internet accessible call forwarding systems is incompatibility with IVR access to the same call forwarding account. In other words, if the subscriber elects to have Internet accessible call forwarding, then the service cannot be routinely changed through existing IVR systems. Therefore, subscribers are not able to update the service unless they have immediate access to a PC and modem (or device capable of implementing Internet connections). In order to have both IVR and Internet access to control call forwarding, subscribers would have to open separate accounts, which is inconvenient and potentially difficult for the provider to reconcile, especially where the multiple accounts may send conflicting information regarding calls to be forwarded with respect to the same telephone number.

The present invention overcomes the problems associated with the prior art, as described below.

BRIEF DESCRIPTION OF THE DRAWINGS

The present invention is further described in the detailed description that follows by reference to the noted drawings by way of non-limiting examples of embodiments of the present invention, in which like reference numerals represent similar parts throughout several views of the drawings, and in which:

FIG. 4 is an exemplary web page to be displayed at the user's PC showing a change to the weekly schedule, according to an aspect of the present invention;

FIG. 7 is an exemplary web page to be displayed at the user's PC showing activation and scheduling data for Flexible Call Forwarding, according to an aspect of the present invention;

DETAILED DESCRIPTION OF EMBODIMENTS

Figure 1:
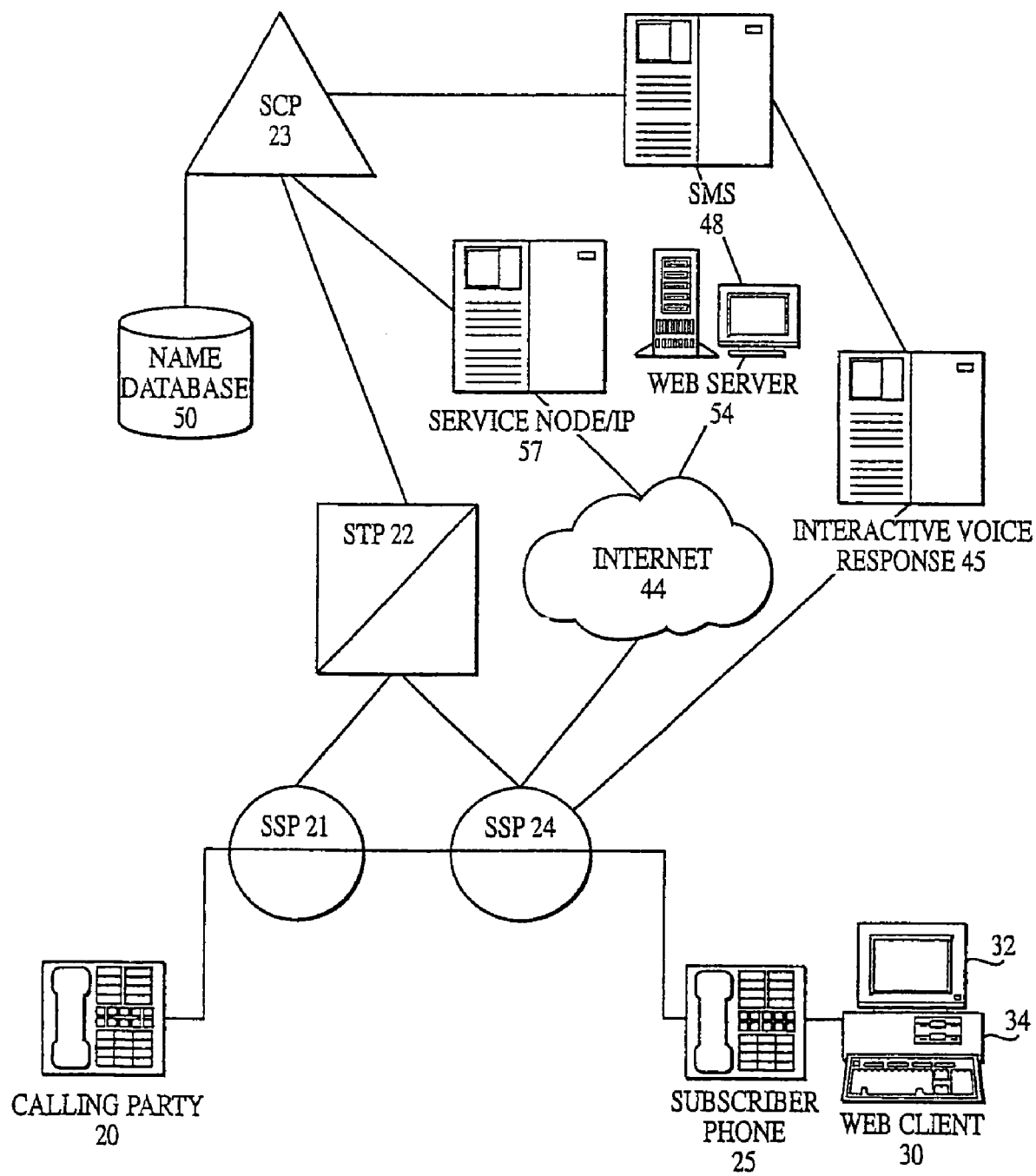
FIG. 1 is a block diagram showing an exemplary telecommunications network for Flexible Call Forwarding and Intelligent Call Forwarding, according to an aspect of the present invention.

The present invention relates to call forwarding services that resolve the previously identified problems, simply and efficiently. The call forwarding services include Flexible Call Forwarding and Intelligent Call Forwarding, which can be implemented individually or through a Personal Call Manager (PCM) system, along with other telecommunication services, such as personal directories, Internet Caller Identification (ICID), Incoming Call Manager (ICM) and Outgoing Call Control (OCC). The present invention is an AIN based system and method that allows a subscriber connected to a communications network, including the Internet and other packet switched type data networks, as well as through conventional IVR systems, to customize and execute the call forwarding services, with near real-time access to the service data.

In view of the above, the present invention through one or more of its various aspects and/or embodiments is presented to accomplish one or more objectives and advantages, such as those noted below.

An aspect of the present invention provides a method for enabling an interface with a subscriber's call forwarding service, which includes call forwarding service data corresponding to a telephone number of the subscriber and at least one of a screening list indicating at least one telephone number and a schedule indicating at least one activation period. The method includes transmitting display data from a call forwarding service server to display a first screen on a graphical user interface (GUI). The first screen includes a forward-to number field and at least one activation field. The activation fields include a first activation indication corresponding to the call forwarding service, a second activation indication corresponding to the screening list and a third activation indication corresponding to the schedule.

The first screen may further include a list creation field corresponding to the screening list. Additional display data may be transmitted from the server to display a second screen on the GUI in response to selecting the list creation field. The second screen includes a screening table having a name column and a priority telephone number column. The first screen may further include a schedule creation field corresponding to the schedule. Additional display data may be transmitted from the server to display a third screen on the GUI in response to selecting the schedule field. The third screen includes a schedule table having columns corresponding to days in a week, each of the columns including at least one start field and a corresponding stop field.

Another aspect of the present invention provides a method for interfacing with a call forwarding service that forwards calls placed to a subscriber's telephone number to a forward-to number and that includes call forwarding service data, having at least one of a screening list, indicating at least one telephone number, and a schedule, indicating at least one activation period. The method includes transmitting display data from a call forwarding service server to display a first screen on the subscriber's GUI. The first screen includes a forward-to number field and at least one activation field. The activation fields include a first activation indicator corresponding to the call forwarding service, a second activation indicator corresponding to the screening list and a third activation indicator corresponding to the schedule. Data is received indicating the forward-to number entered in the forward-to number field. Selection data, entered by the subscriber in response to the first screen, is received. The selection data indicates an ON condition or an OFF condition corresponding to each activation field. The call forwarding service is activated in response to an ON condition corresponding to the first activation indicator, and call forwarding functionality is implemented, subject to the screening list and the schedule, to forward calls to the forward-to number.

The screening list is activated in response to an ON condition corresponding to the second activation indicator, forwarding only calls from the at least one number are forwarded to the forward-to number when the call forwarding functionality is active. The weekly schedule is activated in response to an ON condition corresponding to the third activation indicator, enabling the call forwarding functionality only during the at least one activation period.

The first screen may further include a list creation field corresponding to the screening list. Additional display data is transmitted from the server to display a second screen on the GUI in response to selection of the list creation field. The second screen includes a screening table having a name column and a priority telephone number column. Additional selection data is received, indicating at least one name, entered in the name column, and a corresponding priority telephone number, entered in the priority telephone number column. Only calls from the at least one priority telephone number are forwarded to the forward-to number when the call forwarding functionality is active and when the screening list is activated in response to the ON condition corresponding to the second activation indicator.

The first screen may further include a schedule creation field corresponding to the schedule. Additional display data is transmitted from the server to display a third screen on the GUI in response to selection of the schedule field. The third screen includes a schedule table having multiple columns corresponding to days in a week. Each of the columns includes at least one start field and a corresponding stop field. Schedule data is received, indicating the at least one activation period, having at least one start time and a corresponding stop time during one of the days. The start and stop times correspond to the start and stop fields of the column corresponding to the day. The call forwarding functionality is activated only during the at least one activation period when the schedule is activated in response to the ON condition corresponding to the third activation indicator.

An aspect of the present invention provides a method for accessing data relating to a call forwarding service of a subscriber, the call forwarding data being implemented by a service control point (SCP) in a public switched telephone network (PSTN) and stored in a database associated with the subscriber and accessible by the SCP. The call forwarding service includes a screening list, which identifies at least one calling party directory number that is forwarded to a forward-to number when a call forwarding function of the call forwarding service is active, and a schedule, which identifies at least one activation period during which the call forwarding function is active and calls may be forwarded to the forward-to number. The method includes receiving a query relating to the call forwarding data, through a web server in a data network, in response to an instruction from the subscriber at a web client, which includes a GUI. A portion of the call forwarding data is displayed in a status web page at the GUI through the web server. The status web page includes a first ON field and a first OFF field associated with the call forwarding service, a second ON field and a second OFF field associated with the priority screening list, a third ON field and a third OFF field associated with the schedule, and a forward-to number field.

Additional call forwarding data may be displayed in a screening list web page at the GUI through the web server in response to selection of an indicator for modifying data associated with the priority screening list. A table of multiple columns is displayed. A first column displays at least one name of a priority caller and a second column displays the directory number associated with the name. The call forwarding service routes calls from the directory number to the forward-to number when the call forwarding function is active. The display of the additional call forwarding data may further include a third column, displaying a deletion field corresponding to the at least one name and the associated directory number of the priority caller. The name and the associated directory number are removed from the screening table in response to receiving a deletion indication from the corresponding deletion field.

Additional call forwarding data may be displayed in a schedule web page at the GUI through the web server in response to selection of an indicator for modifying data associated with the schedule. A table of multiple columns corresponding to days of the week is displayed. Each day column includes a start time column and a stop time column. The start time column displays at least one start time for activating the call forwarding function and the stop time column displays a corresponding stop time for deactivating the call forwarding function during the day of the week corresponding to the day column. The call forwarding service routes calls to the forward-to number only when the call forwarding function is active in accordance with the schedule table. The display of additional call forwarding data in the schedule web page further includes displaying a preestablished number of start time fields in the start time column and corresponding stop time fields in the stop time column for each day column. The at least one start time occupies one of the preestablished number of start time fields and the corresponding stop time occupies a corresponding stop time field. The remaining unoccupied start time fields and stop time fields continue to be displayed in the schedule table.

Another aspect of the present invention provides a system for implementing a subscriber's call forwarding service, which includes call forwarding service data corresponding to a telephone number of the subscriber. The call forwarding service data includes a screening list indicating at least one telephone number and a schedule indicating at least one activation period. The system includes an SCP that processes telephone calls in the PSTN and is configured to communicate with a database having the call forwarding service data. The system also includes a web server that enables a communications interface between the database and the subscriber's GUI through a packet switched data network. The web server transmits display data relating to the call forwarding service to display a first screen on the GUI. The first screen includes a forward-to number field and activation fields. The activation fields include a first activation indicator corresponding to the call forwarding service, a second activation indicator corresponding to the screening list and a third activation indicator corresponding to the schedule.

The database may receive data, entered at the GUI, which indicates the forward-to number entered in the forward-to number field. The database may further receive selection conditions corresponding to the activation indicators of the activation fields. The database updates the call forwarding service data in accordance with the entered data. The SCP retrieves the updated call forwarding service data and processes calls to the subscriber telephone number in accordance with the updated call forwarding service data, including activating the call forwarding service in response to an ON condition corresponding to the first activation indicator to implement call forwarding functionality to forward calls to the forward-to number, activating the screening list in response to an ON condition corresponding to the second activator indication to forward only calls from the at least one number to the forward-to number when the call forwarding functionality is active, and activating the schedule in response to an ON condition corresponding to the third activation indicator to enable the call forwarding functionality only during the at least one activation period.

The first screen may further include a list creation field corresponding to the screening list. The web server further transmits additional display data to display a second screen on the GUI in response to selection of the list creation field. The second screen includes a screening table having a name column and a priority telephone number column. The database receives screening data indicating at least one name, entered in the name column, and a corresponding priority telephone number, entered in the priority telephone number column. The SCP retrieves the screening data from the database and forwards only calls from the at least one priority telephone number to the forward-to number when the call forwarding functionality is active and when the screening list is activated in response to the ON condition corresponding to the second activation indicator.

The first screen may also include a schedule creation field corresponding to the schedule. The web server may then further transmit additional display data to display a third screen on the GUI in response to selection of the schedule field. The third screen includes a schedule table having columns corresponding to days in a week, each of the columns having at least one start field and a corresponding stop field. The database receives schedule data indicating the at least one activation period, including at least one start time and a corresponding stop time during one of days. The corresponding start and stop times correspond to the start and stop fields of the column corresponding to the day. The SCP retrieves the schedule data from the database and activates the call forwarding functionality only during the at least one activation period when the schedule is activated in response to the ON condition corresponding to the third activation indicator.

Yet another aspect of the present invention provides a computer readable medium for storing a computer program that enables accessing data relating to a call forwarding service of a subscriber. The call forwarding data is implemented by an SCP in a PSTN and is stored in a database associated with the subscriber and accessible by the SCP. The call forwarding service includes a screening list, which identifies at least one calling party directory number that is forwarded to a forward-to number when a call forwarding function of the call forwarding service is active, and a schedule, which identifies at least one activation period during which the call forwarding function is active and calls may be forwarded to the forward-to number. The computer readable medium includes a receiving source code segment that receives a query relating to the call forwarding data, through a web server in a data network, in response to an instruction from the subscriber at a web client, which includes a GUI. The computer readable medium also includes a display enabling source code segment that displays a portion of the call forwarding data in a status web page at the GUI through the web server. The status web page includes a first ON field and a first OFF field associated with the call forwarding service, a second ON field and a second OFF field associated with the priority screening list, a third ON field and a third OFF field associated with the schedule, and a forward-to number field.

The display enabling source code segment may further display additional call forwarding data in a screening list web page at the GUI through the web server in response to selection of an indicator for modifying data associated with the priority screening list. The screening list web page includes a table having multiple columns, a first column displaying at least one name of a priority caller and a second column displaying the directory number associated with the name. The call forwarding service routes calls from the directory number to the forward-to number when the call forwarding function is active. The table may further include a third column that displays a deletion field corresponding to the at least one name and the associated directory number of the priority caller. The name and the associated directory number are removed from the screening table in response to receiving a deletion indication from the corresponding deletion field.

The display enabling source code segment may further display additional call forwarding data in a schedule web page at the GUI through the web server in response to selection of an indicator for modifying data associated with the schedule. The schedule web page includes a table having multiple columns corresponding to days of the week. Each day column has a start time column and a stop time column, the start time column displaying at least one start time for activating the call forwarding function and the stop time column displaying a corresponding stop time for deactivating the call forwarding function during the day of the week corresponding to the day column. The call forwarding service routes calls to the forward-to number only when the call forwarding function is active in accordance with the schedule table. A preestablished number of start time fields in the start time column and corresponding stop time fields in the stop time column may be displayed for each day column, so that the at least one start time for activating the call forwarding function occupies one of the preestablished number of start time fields and the corresponding stop time for deactivating the call forwarding function occupies a corresponding one of the preestablished number of stop time fields. The remaining unoccupied start time fields and stop time fields continue to be displayed in the schedule table.

The various aspects and embodiments of the present invention are described in detail below.

Flexible Call Forwarding

The present invention is an AIN based system and method that allows a subscriber connected to a communications network, including the Internet and other packet switched type data networks, as well as through conventional IVR systems, to customize and execute call forwarding services with near real-time access to the service data. FIG. 1 illustrates an exemplary telecommunications network in association with the present invention, for implementing Flexible Call Forwarding and Intelligent Call Forwarding. The network includes a calling party 20, an originating service switching point (SSP) 21, a terminating SSP 24 and a subscriber's telephone 25 (i.e., the call destination or the called party). The network also includes a signaling transfer point (STP) 22, a service control point (SCP) 23, an interactive voice response (IVR) 45 and a service node/intelligent peripheral (SN/IP) 57. The network also includes a name database 50 connected to the SCP 23, which can be, for example a line information database (LIDB).

By way of example, the SCP 23 is implemented with the Bellcore Integrated Service Control Point, loaded with ISCP software Version 4.4 (or higher), available from Telecordia, Murray Hill, N.J. In an alternative embodiment of the invention, the SCP 23 may be a Lucent Advantage SCP, with software release 94, available from Lucent Technologies, Inc. An exemplary IVR 45 is available under the trademark CONVERSANT System for IVR, Version 6.0, Update 1, provided by Lucent Technologies, Inc. The network alternatively incorporates any compatible stand-alone IVR or advanced intelligence network-intelligent peripheral (AIN-IP or intelligent peripheral) providing an IVR. The SN/IP 57 is, for example, a Compact Service Node or an Enhanced Media Resource Server (eMRS) developed by Lucent Technologies, Inc. (The SN/IP 57 is utilized in the Intelligent Call Forwarding aspects of the invention, as discussed below.)

The SSP 24 is the terminating central office (CO) for the subscriber telephone 25 and the SSP 21 is the originating CO for the calling party 20. However, the terminating CO and the originating CO may be the same. The SSPs 21 and 24 may include, for example, 1AESS or 5ESS switches manufactured by Lucent Technologies, Inc.; DMS-100 switches manufactured by Nortel Networks Corporation (Nortel); AXE-10 switches manufactured by Telefonaktiebolaget LM Ericsson, or EWSD switches available from Siemens Information and Communication Networks, Inc. The switches may utilize an AIN Release 0.1 protocol.

The call service logic of the present invention may be upgraded to accommodate future AIN releases and protocols and future trigger types. Specifications of AIN Release 0.1 SSPs may be found in Telecordia Technical References TR-NWT-001285 or TR-NWT-001299, Switch-Service Control Point Application Protocol Interface Generic Requirements, and Telecordia Technical References TR-NWT-001284 or TR-NWT-001298, AIN Switching Systems Generic Requirements, the disclosures of which are expressly incorporated by reference herein in their entireties.

A data network of the invention includes a web client 30, a web server 54 and a service management system (SMS) 48, connectable through the Internet 44. The web client 30 includes a personal computer (PC) 32, i.e., a GUI, operating client software 34, an example of which is ICW Client, available from Southwestern Bell Telephone Company. The SMS 48 is capable of transmitting and receiving information to and from the SCP 23. Alternatively, the client software 34 can be run at the web server 54. The SMS 48 provides the subscriber interface to the SCP 23 from both the subscriber telephone 25 (or other DTMF telephone) through IVR 45 and the web client 30 (or other Internet compatible GUI) through the web server 54, via the Internet 44. The SMS 48 also maintains and distributes all subscriber specific data for the Flexible Call Forwarding service.

The web client 30 incorporates a web browser, such as Microsoft Internet Explorer, available from Microsoft Corporation, or Netscape Navigator, available from Netscape Communications Corporation. In one embodiment, the web client 30 is implemented with an IBM Pentium based PC, running the Linux operating system, available from, for example, Free Software Foundation, Inc., or the Microsoft Windows operating system, and running the Microsoft Internet Explorer, Netscape Navigator or HotJava, available from Sun Microsystems, Inc., web browser software. An embodiment of the invention includes the web server 54 running the Linux or Microsoft Windows operating system and the Apache web server software, available from the Apache Software Foundation, or the Jigsaw web server software, available from World Wide Web Consortium (W3C).

Generally, Flexible Call Forwarding enables a subscriber to direct incoming calls to alternative telephone numbers. In an embodiment, Flexible Call Forwarding further includes several optional features that the subscriber customizes. Among these features is an "automatic-off" function, which is a preset day and time when Flexible Call Forwarding will deactivate without further instruction from the subscriber. Also, there is a priority screening list, in which the subscriber designates priority names and telephone numbers. When the priority screening list is activated, only calls received from the telephone numbers on the list are forwarded. Flexible Call Forwarding also includes a weekly schedule, in an embodiment, which enables the subscriber to schedule up to a week in advance the time when the service is ON or OFF, the associated telephone numbers to which calls are forwarded and whether the priority screening list is ON or OFF. Other embodiments allow scheduling further in advance.

A subscriber can modify the call forwarding service status via two methods. First, from any DTMF telephone, the subscriber dials a toll-free number, e.g., an 800 number, to access the IVR 45. The subscriber is prompted to enter an account number, along with a personal identification number (PIN), further discussed below. The subscriber then has the ability to change the PIN, change the forwarding phone number, toggle the service ON and OFF, specify a day and time when the service will be deactivated, and activate or deactivate the priority screening list and the preset weekly schedule. Second, the subscriber has the option to access the Flexible Call Forwarding service using a GUI via the Internet 44. Over the web connection, the subscriber is able to implement all of the IVR functions identified above, as well as build the priority screening list and design the weekly schedule.

In order to implement Flexible Call Forwarding, a terminating attempt trigger (TAT) is set in the terminating SSP 24. The trigger launches when a call terminates to the subscriber telephone 25. Therefore, when the subscriber receives a call, the call is suspended at the terminating SSP 24 and a termination attempt query is sent to the SCP 23 for instructions via the STP 22. Upon receiving the query, the SCP 23 verifies whether the terminating line, i.e., the subscriber telephone 25, subscribes to the Flexible Call Forwarding service. If a Flexible Call Forwarding subscription is found, the service logic at the SCP 23 determines the status of the call forwarding service. In other words, it determines whether Flexible Call Forwarding is ON or OFF and whether various features have been activated. After making these determinations, the SCP 23 instructs the SSP 24 where to send the suspended call, i.e., whether to terminate the call to the subscriber telephone 25 or to forward the call to an alternative telephone number previously specified by the subscriber.

As stated above, Flexible Call Forwarding may include an automatic-off function, a priority screening list and a scheduler. These exemplary features can be routinely and efficiently customized by the subscriber without involvement of the account provider, which conventionally is time consuming and inconvenient.

The automatic-off function enables the subscriber to designate a time for the Flexible Call Forwarding service to deactivate automatically once the service has been activated. The automatic-off option is presented to the subscriber each time Flexible Call Forwarding is activated. If an OFF time is entered, the service stops forwarding calls (i.e., the calls are terminated at the subscriber telephone 25) after the designated time. If no OFF time is entered, the call forwarding service remains active until the subscriber instructs otherwise. If the subscriber elects to activate the weekly schedule, the automatic-off function is disabled to prevent interference with the weekly schedule.

The priority screening list is available for use at the subscriber's option. The list contains the names and telephone numbers of priority callers, as designated by the subscriber. In an embodiment, if the priority screening list has been activated, the SCP 23 will only forward calls originating from phone numbers included in the list. All other calls are terminated at the subscriber telephone 25. The priority screening list is implemented through a screening table, which is stored at the SCP 23 and the SMS 48 and is accessible by the subscriber via the Internet 44, as discussed in detail below.

The scheduler provides a weekly schedule of times for activating and deactivating the Flexible Call Forwarding service, as well as any features associated with Flexible Call Forwarding. For example, the scheduler indicates the times at which the priority screening list is ON or OFF, which times do not necessarily correspond to the Flexible Call Forwarding service activation. The scheduler also designates the telephone numbers to which calls are to be forwarded corresponding to the various ON and OFF times. The scheduler is implemented through a time of day and day of week ("tod/dow") table, which is stored at the SCP 23 and is accessible by the subscriber by the Internet 44, discussed in detail below.

In another embodiment, a rejection screening list feature is available. This feature is related to the priority screening list feature, except the rejection screening list includes names and phone numbers which are to be rejected. Calls from numbers on the rejection screening list are terminated to the subscriber's number (i.e., not forwarded) or forwarded to an alternative number designated for rejected calls.

Figure 2:
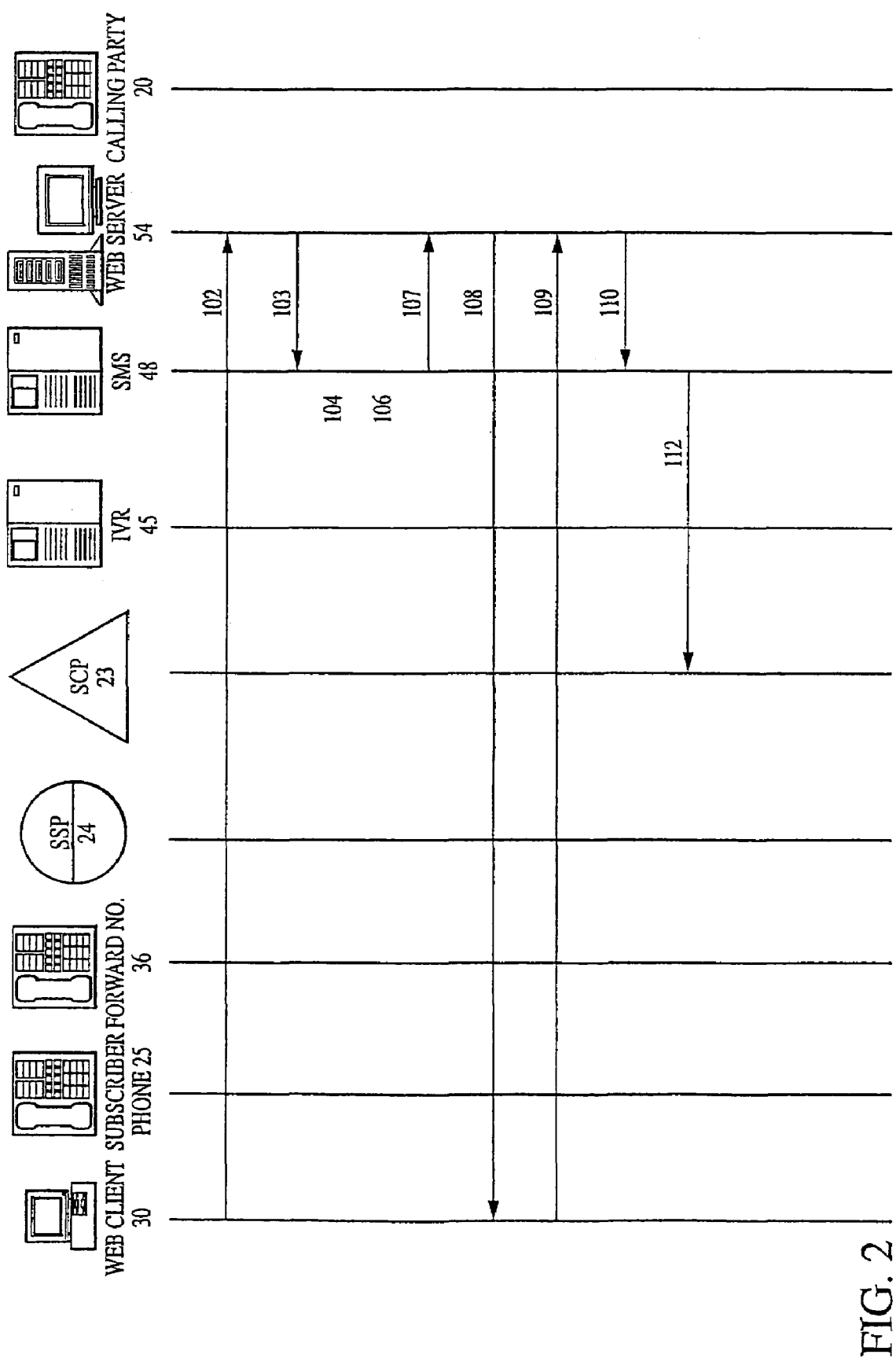
FIG. 2 is an exemplary call flow diagram in which the subscriber accesses the Flexible Call Forwarding data via the Internet, according to an aspect of the present invention.

A subscriber's exemplary interaction with Flexible Call Forwarding is depicted in the call flow diagram of FIG. 2. The subscriber is able to access the Flexible Call Forwarding service via an IVR 45 or the Internet 44, thereby greatly increasing flexibility and convenience. FIG. 2 depicts interaction with Flexible Call Forwarding over the Internet, using a GUI, for accessing and updating the more complicated procedures for customizing the service, including building the priority screening lists and weekly schedules, discussed above. In order for the subscriber to access the Flexible Call Forwarding service via the Internet 44, the subscriber accesses a unique uniform resource locator (URL) associated with the service provider. The URL is an address and identifies the appropriate protocol for communicating with the service over the web. When the subscriber accesses the Internet 44, the web server 54 provides Flexible Call Forwarding web screens, transmitted from the SMS 48, examples of which are shown in FIGS. 3–14. In an embodiment, an alternative manner for accessing the Flexible Call Forwarding data via the Internet 44 is through the PCM service, described below.

At step 102 of FIG. 2, the subscriber accesses Flexible Call Forwarding data by connecting from the web client 30 to the web server 54 through the Internet 44. The web server 54 then connects to the SMS 48, which stores and updates the Flexible Call Forwarding data, as well as authentication data, at step 103. The web server 54 receives HTTP messages from the subscriber web client 30 and provides HTML web pages in response to the subscriber's input. The web pages relate to the subscriber's Flexible Call Forwarding service, as indicated by the SMS 48.

Once connected to the SMS 48 via the web server 52, the user must provide authentication information to access the corresponding account. The SMS 48 performs the authentication at step 104. The SMS 48 queries the subscriber for an account number and associated password, which confirms the user's identity. The SMS 48 then retrieves the account number and associated password or PIN information to confirm that the subscriber is an authorized user. After successful authentication, the SMS 48 retrieves at step 106 the current service data for the Flexible Call Forwarding service, including current priority screening lists and weekly schedules, and makes the service data available to the subscriber. The SMS 48 forwards the service data information to the web server 54 at step 107, which forwards the data to web client 30 via the Internet 44 at step 108.

The subscriber is presented with a number of options for each telephone number in the account. For example, the subscriber can change the PIN, toggle the various Flexible Call Forwarding features ON or OFF, set the automatic-off function day and time, and activate or deactivate the priority screening list and the weekly schedule. In addition, the subscriber can build or edit the priority screening lists and weekly schedules.

Figure 3:
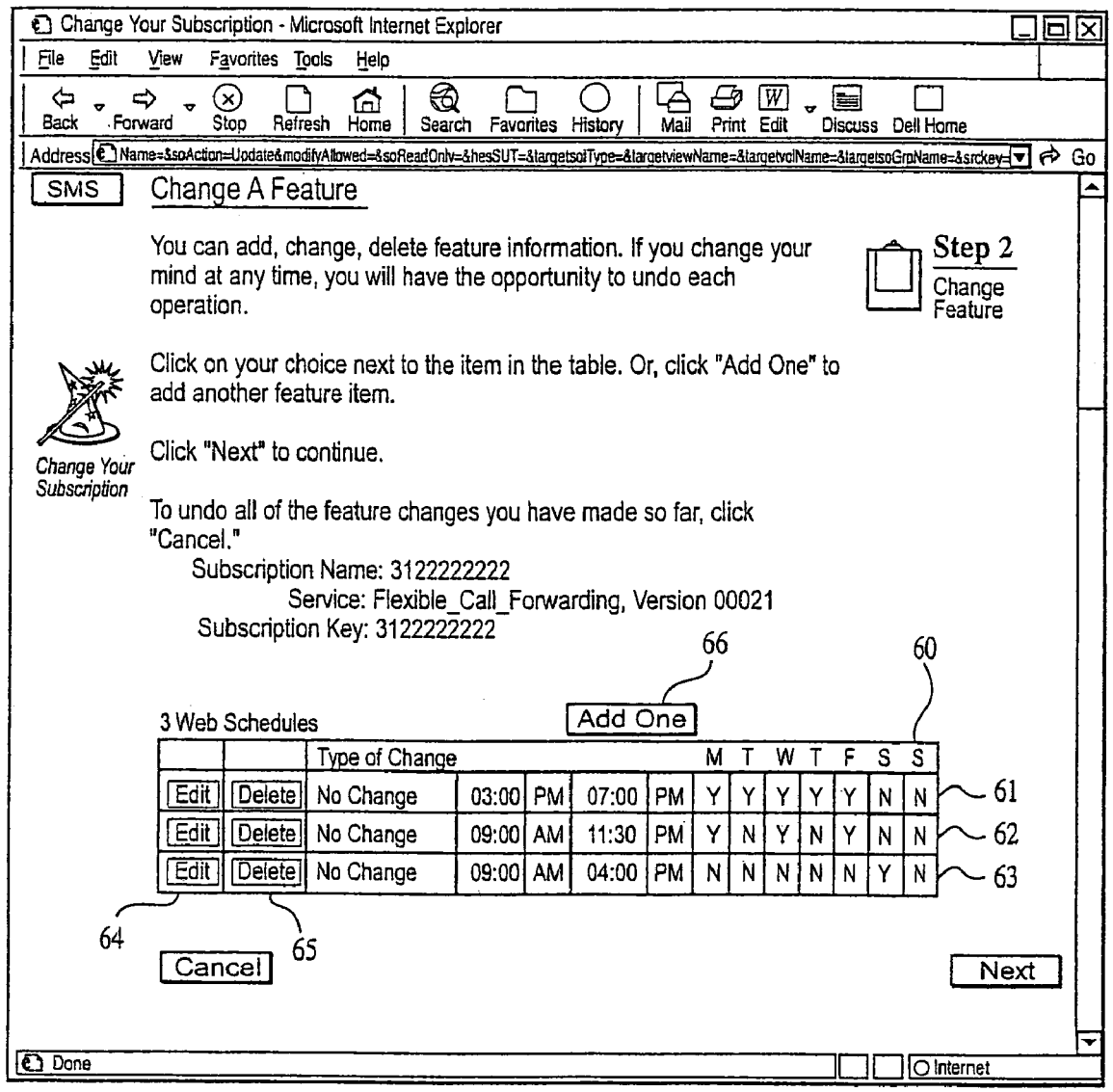
FIG. 3 is an exemplary web page to be displayed at the user's PC showing a weekly schedule, according to an aspect of the present invention.

For example, FIGS. 3–8 depict a set of exemplary web pages to be displayed to the subscriber on the monitor of the PC 32 at the web client 30, according to one embodiment of the present invention. FIG. 3 depicts an exemplary web page showing the weekly schedule, discussed above. The scheduling table 60 contains data entries from left to right for a Flexible Call Forwarding on-time, off-time and applicable days of the week, which are indicted by MTWTFSS (i.e., Monday, Tuesday, Wednesday, Thursday, Friday, Saturday and Sunday). The first entry 61, for instance, shows an on-time of 3:00 p.m. and an off-time of 7:00 p.m. This period of Flexible Call Forwarding activation is applied Monday through Friday. Similarly, the second activation period 62 is set for 9:00 a.m. to 11:30 p.m. on Monday, Wednesday and Friday. The third activation period 63 is scheduled for Saturday, only, beginning at 9:00 a.m. and ending at 4:00 p.m. In one embodiment, the days and times provided in the scheduler table must be within one week of the time the subscriber populates the table, although alternative embodiments are not limited to the one week schedule. The subscriber can easily edit the weekly schedule, in real-time, by simply selecting the Edit button or the Delete button, included in columns 64 and 65, respectively.

Figure 4:
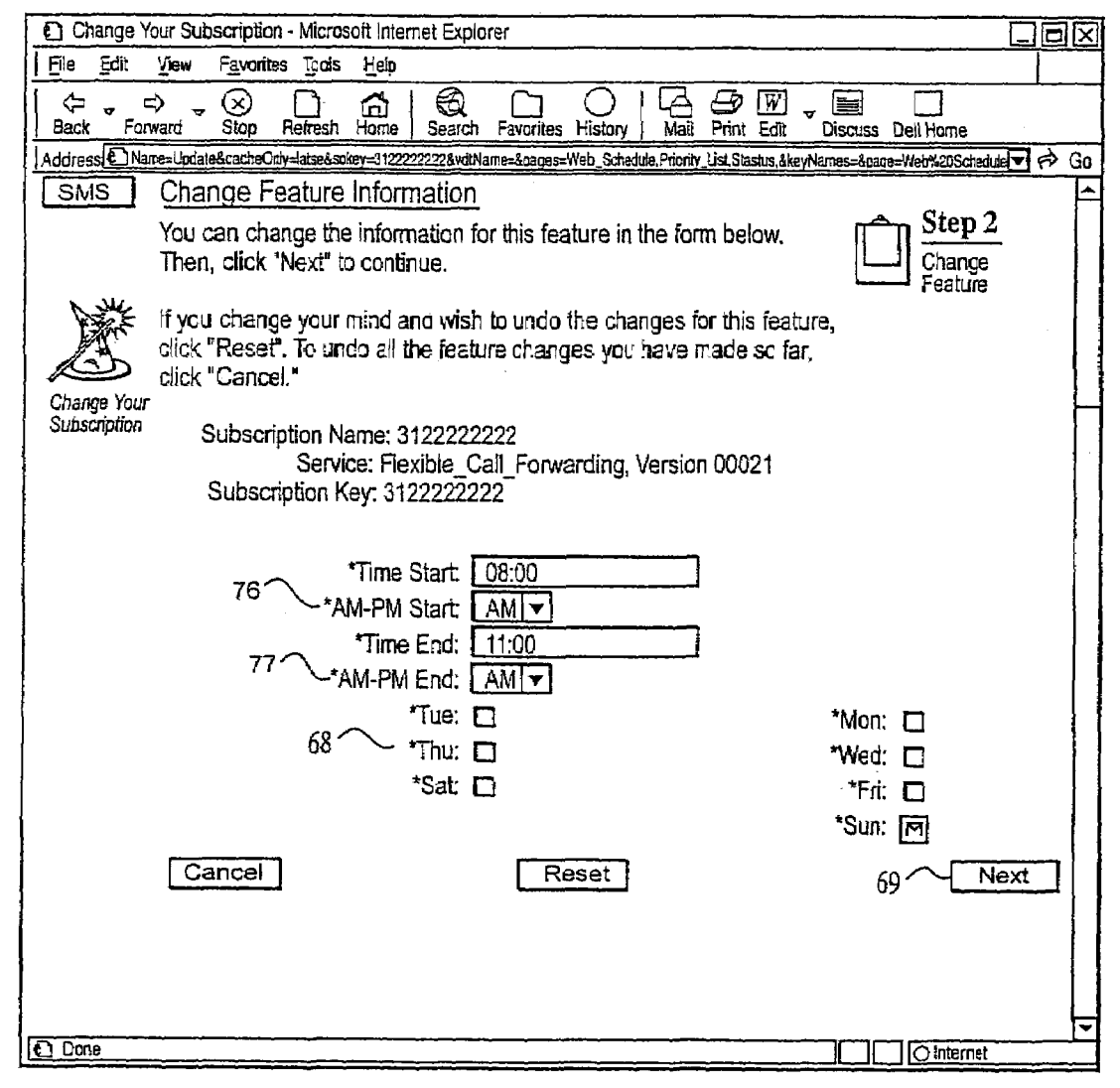
Figure 5:
FIG. 5 is an exemplary web page to be displayed at the user's PC showing an updated weekly schedule, according to an aspect of the present invention.

If the subscriber desires to build the schedule by adding another activation period, he or she simply selects the Add One button 66, located directly above scheduling table 60. Upon selecting the Add One button, the subscriber is presented with a new web page at web client 30, an example of which is shown in FIG. 4. The subscriber fills in the blank data fields to indicate the desired additional activation period. The Time Start field 76 is the on-time for Flexible Call Forwarding, including an AM or a PM designation. In this example, the subscriber chooses an on-time of 8:00 a.m. Likewise, the subscriber specifies the Time End 77, which is 11:00 a.m. The subscriber then assigns the days of the week to which the new activation period applies by simply checking the corresponding boxes 68. In this case, the Flexible Call Forwarding period of 8:00 a.m. to 11:00 a.m. will automatically activate on Sunday. The subscriber enters the new activation period by choosing the Next indication 69. The SMS 48 responds by sending the updated weekly schedule screen to the web client 30, an example of which is shown in FIG. 5. The new activation period 70 is now listed in scheduling table 60, acknowledging to the subscriber that the instructions have been received and implemented.

Figure 6:
FIG. 6 is an exemplary web page to be displayed at the user's PC showing a priority screening list, according to an aspect of the present invention.

FIG. 6 shows an exemplary web page for the priority screening list, according to an embodiment of the invention. The priority screening list 72 contains data entries for priority telephone numbers and corresponding names. As described in detail below, the SMS 48 stores these telephone numbers and names, and forwards the telephone numbers to the SCP 23. Whenever the priority screening list is active, only telephone calls from the numbers on the list will be forwarded according to the subscriber's Flexible Call Forwarding instructions. Edits and additions to the priority screening list 72 are implemented substantially the same as the weekly schedule edits and additions. An existing entry can be edited or deleted using the Edit buttons 73 and the Delete buttons 74, respectively. Selecting the Add One button 75 causes the SMS 48 to send another web page dedicated to building the priority screening list. The subscriber populates the fields for telephone number and name, selects Next and is returned to the priority screening web page of FIG. 6, which would include the additional entry in list 72.

Figure 7:
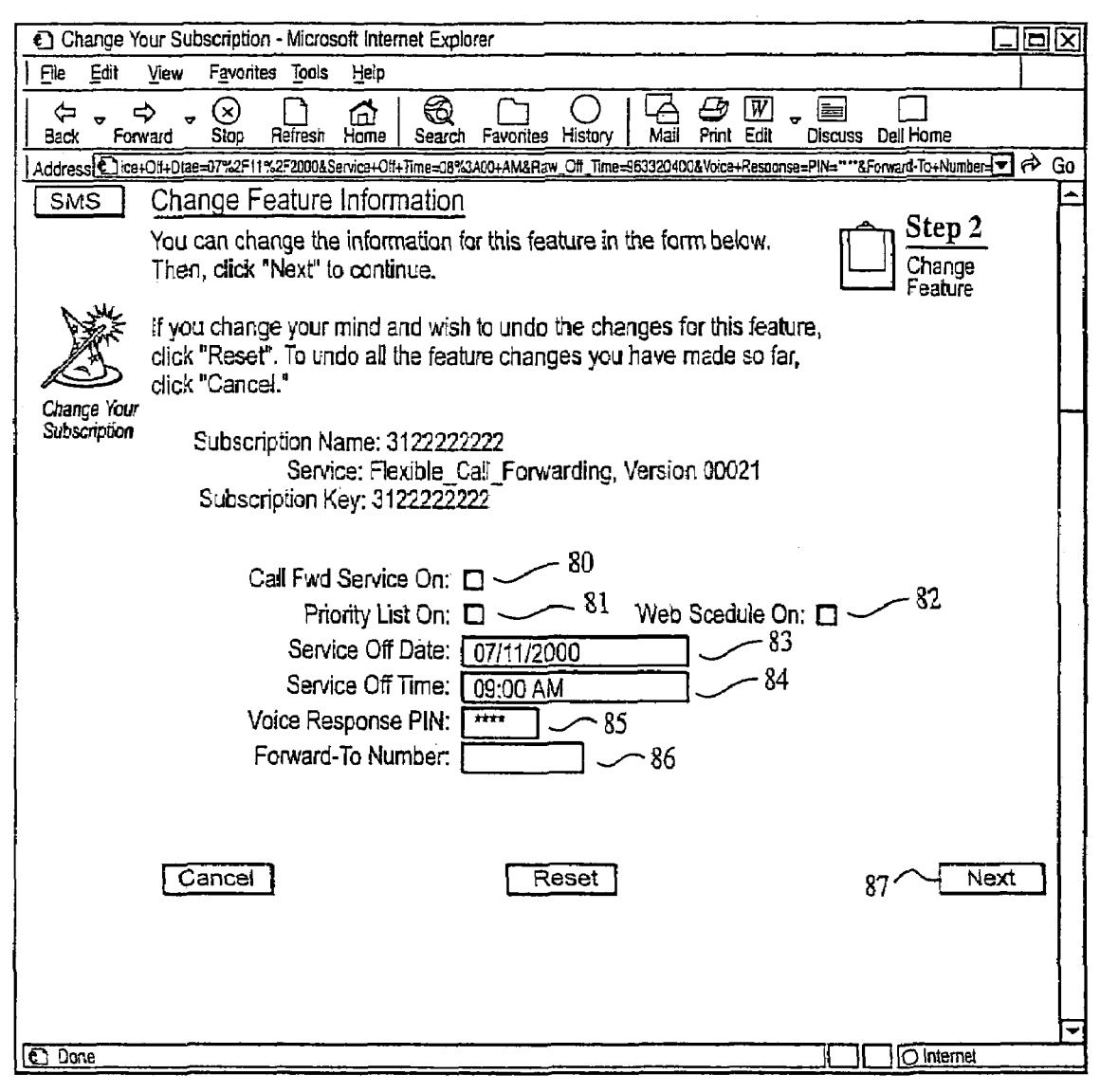

In addition to editing and building the weekly schedule and the priority screening list, the subscriber can specify the call forwarding times and service to be applied. FIG. 7 shows an exemplary web page presented to the web client 30 by the SMS 48 for basic Flexible Call Forwarding implementation. Box 80 is for indicating whether Flexible Call Forwarding is ON or OFF. A check mark placed in box 80 activates the service immediately upon pressing the Next button 87. Boxes 81 and 82 relate to the priority screening list and the weekly schedule, respectively. By checking the boxes, the subscriber indicates a desire to activate the respective features (which previously had been built and/or edited).

Boxes 83 and 84 of FIG. 7 pertain to the automatic-off function, discussed above. The boxes 83 and 84 provide fields for the OFF date and time, respectively, to stop forwarding calls placed to the subscriber telephone 25 once Flexible Call Forwarding has been activated, indicted at box 80. This OFF date and time is over-ridden by the weekly schedule of FIGS. 3 and 5, so that the automatic-off function will not interrupt the customized scheduling featured set up by the subscriber.

The web page of FIG. 7 also requests a voice response PIN at box 85. This is the same PIN that the user uses to access Flexible Call Forwarding by telephone, using IVR 45. In an embodiment, the PIN may also be used in lieu of a password to initially access the Flexible Call Forwarding data over the web.

FIG. 7 also displays a forward-to-number box 86, which is the telephone number to which incoming calls are forwarded. In an embodiment, this is limited to a ten-digit number, although alternative embodiments may include additional digits to accommodate international calls. Further, in the depicted embodiment of the invention, the Flexible Call Forwarding service allows for one number to which the calls are forwarded any time the service is active, including activation through the weekly schedule. In alternative embodiments, the weekly schedule includes a forward-to number column in the weekly schedule table 60, so that the subscriber can redirect incoming calls to alternative forwarding numbers at different days and times.

Figure 8:
FIG. 8 is an exemplary web page to be displayed at the user's PC showing an activation and scheduling summary for Flexible Call Forwarding, according to an aspect of the present invention.

The instructions input by the subscriber in FIG. 7 are entered when the subscriber selects the Next button 87, at which time they are sent from the web client 30 through the web server 54 to the SMS 48, indicated respectively at steps 109 and 110 of FIG. 2. The exemplary web page of FIG. 8 is then displayed at the web client 30. Substantially simultaneously with entry of these instructions, along with the weekly schedule and priority screening data, the SMS 48 updates the data stored at the SCP 23, according to the information entered by the subscriber, for implementation at step 112, accordingly. The data stored at the SMS 48 is therefore duplicated by the data stored at the SCP 23.

Referring to FIG. 8, the status table 90 presents a summary of the entered information, including the automatic-off date 83, the automatic-off time 84, the PIN number 85 and the forwarding phone number 86. In addition, entries 91–93 indicate the respective status of the service and optional features. The Y in entry 91 indicates that the Flexible Call Forwarding service is ON. The Ys in entries 92 and 93 indicate that the priority screening list and the weekly schedule are active, respectively.

The Flexible Call Forwarding service may be implemented through any set of web pages that enable the subscriber to effectively interact with the SMS 48 and the SCP 23. For example, FIGS. 9–13 depict an alternative set of exemplary web pages to be displayed to the subscriber on the monitor of the PC 32 at the web client 30, according to an embodiment of the present invention. Using the web screens of FIGS. 9–13, the subscriber implements essentially the same functionality of the Flexible Call Forwarding service, as described above. However, alternative presentations of the data to the subscriber may enhance the usability of the service. In particular, FIGS. 9–13 depict a more basic, uncluttered depiction of the Flexible Call Forwarding service data shown in FIGS. 3–8, and therefore are more straight-forward and are potentially less apt to confuse the subscriber.

Figure 9:
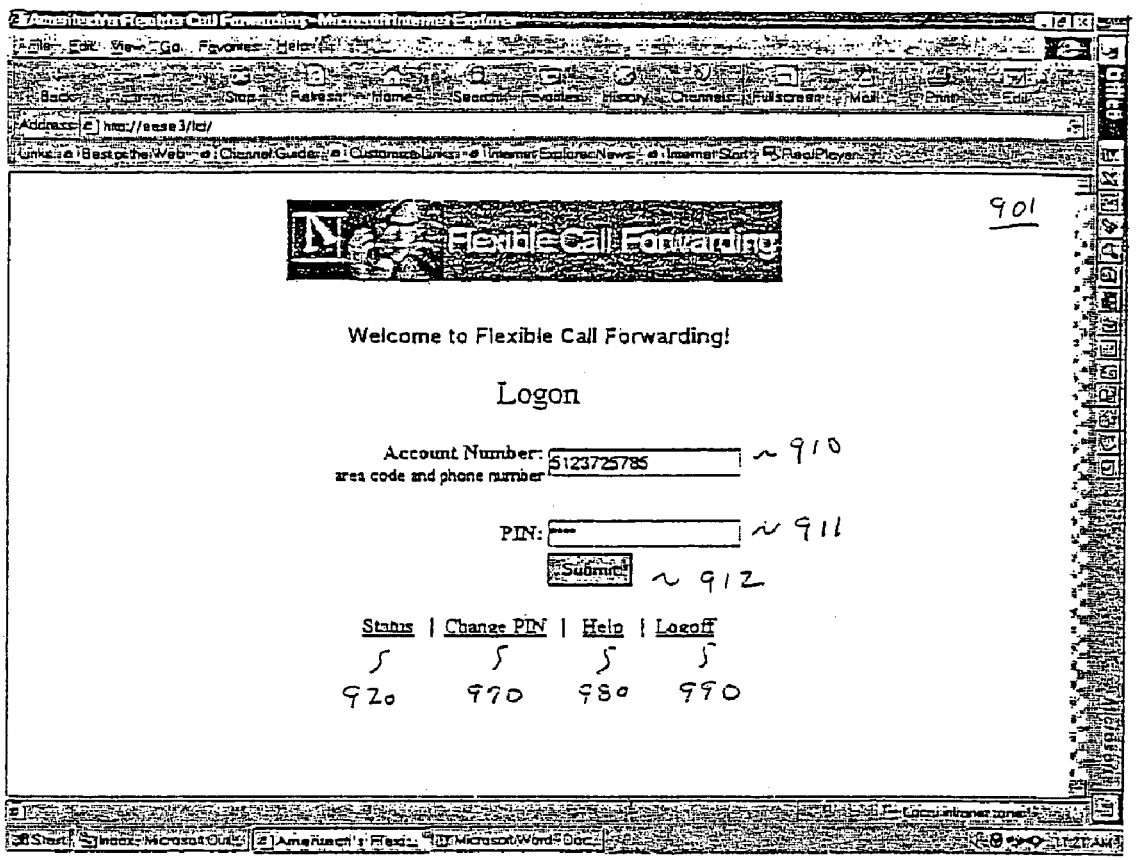
FIG. 9 is an exemplary web page of an alternative embodiment to be displayed at the user's PC showing a log on screen enabling authentication, according to an aspect of the present invention.

FIG. 9 depicts an exemplary web page showing a log on screen 901 that enables authentication of the subscriber. The subscriber provides the authentication data by entering the account number for his or her Flexible Call Forwarding service account in box 910, which may be the area code and telephone number to which the service applies. The subscriber then enters the PIN, which, in one embodiment, is at least four digits long and includes any combination of numbers (and letters), associated with the account number in box 911. As shown, the PIN is displayed only as a series of asterisks to enhance security to avoid unauthorized access to the service data. When the account number and the PIN have been entered, the subscriber selects the Submit button 912, in response to which the SMS 48 receives the authentication data from the web client 30 via the web server 54 and performs the authentication, as described above.

Figure 10:
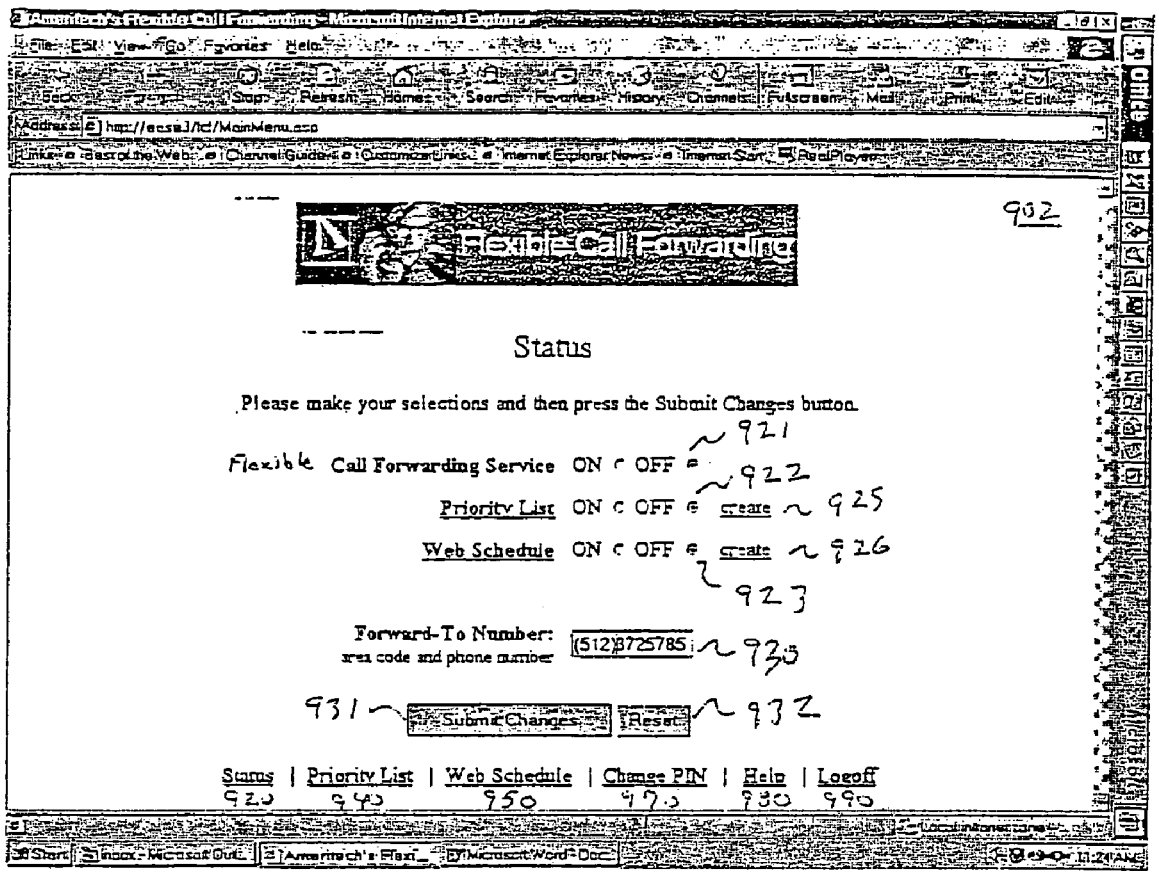
FIG. 10 is an exemplary web page of the alternative embodiment to be displayed at the user's PC showing the status of the Flexible Call Forwarding service, according to an aspect of the present invention.
Figure 13:
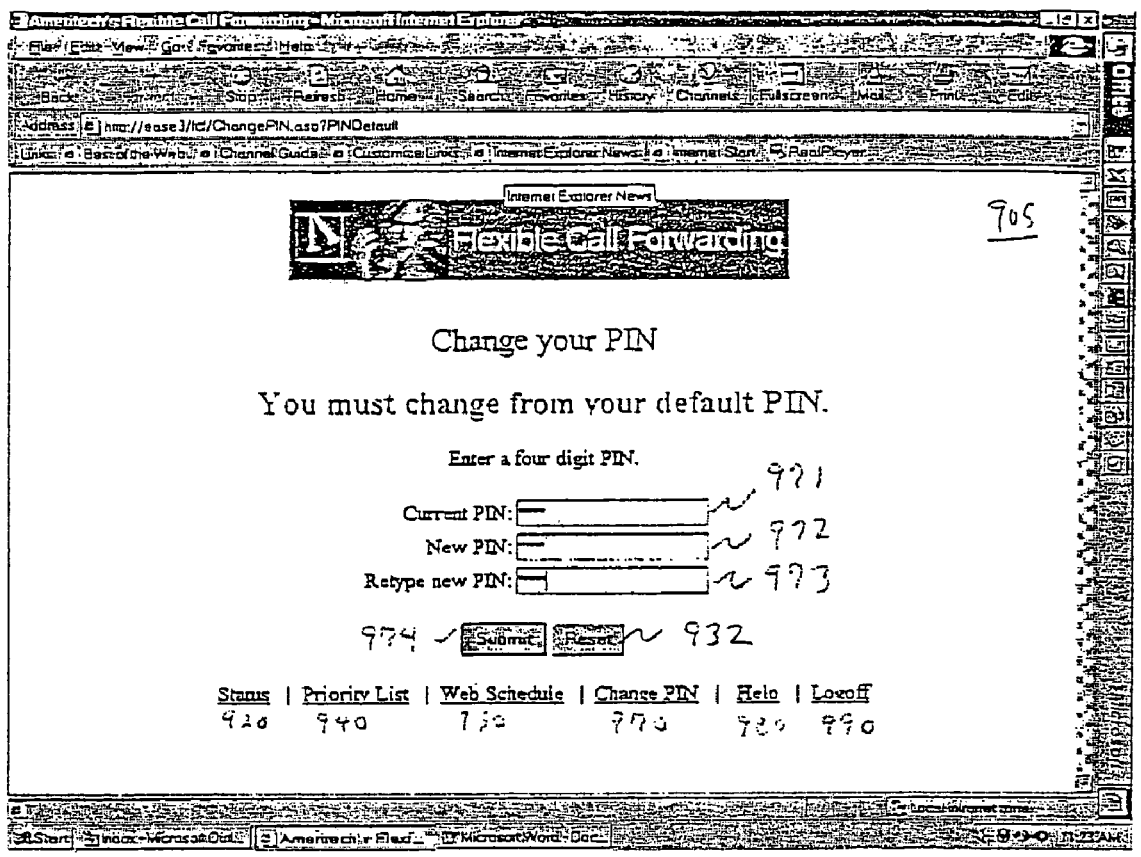
FIG. 13 is an exemplary web page of the alternative embodiment to be displayed at the user's PC enabling a change to the subscriber's PIN, according to an aspect of the present invention.

After successfully logging onto the Flexible Call Forwarding service web site, the subscriber may select one of the displayed functions: Status 920, Change PIN 970, Help 980 and Logoff 990. The Status link 920 links to a web page that enables the subscriber to visually review the status of the variable parameters available under the Flexible Call Forwarding service, such as service activation/deactivation, the priority screening list and the weekly schedule. By selecting the Status link 920, a Status screen 902 is displayed on the PC 32 of the web client 30, an example of which is depicted in FIG. 10. The Change PIN link 970 links to a web page that enables the subscriber to change the current PIN to a desired alternative PIN to be associated with the account number. By selecting the Change PIN link 970, a Change PIN screen 905 is displayed on the PC 32, an example of which is depicted in FIG. 13. Selection of the Logoff link 990 ends the interface session between the SMS 48 and the subscriber at the web client 30.

Selection of the Help link 980 provides instruction to the subscriber in preestablished categories relating to operation of the Flexible Call Forwarding service from the web site. For example, by selecting the Help link 980, a Help screen is displayed to the subscriber, which contains explanations of the Status screen 902 and the related variables, the Change PIN screen 905 and the related variables, and explanations of the priority screening list and the weekly schedule. In an embodiment of the invention, the Help link 980 is active and available prior to the subscriber successfully logging onto the service, i.e., prior to authentication, unlike the other links. The subscriber is therefore able to receive instructions regarding the log on process, for example, including assistance in recalling a PIN, without having to first log on.

FIG. 10 depicts an exemplary web page showing the Status screen 902 presented to the web client 30 in response to selection of the Status link 920 on the Logon screen 901 of FIG. 9. In an embodiment of the invention, the Status screen 902 is displayed automatically upon successful authentication of the subscriber to provide an immediate summary of the overall status of the Flexible Call Forwarding service. To simplify the subscriber interaction, the Status screen 902 is straight-forward in content and uncluttered in appearance. The Status screen 902 displays only the most informative Flexible Call Forwarding service variables for the subscriber's immediate review: the activation status of the Flexible Call Forwarding service, indicated by a set of ON/OFF indicators 921; the activation status of the Priority List, indicated by a set of ON/OFF indicators 922; the activation status of the Web Schedule, indicated by a set of ON/OFF indicators 923; and the forward-to telephone number, presented in the box 930.

The set of ON/OFF indicators 921 show that the Flexible Call Forwarding service is currently OFF by the mark appearing in the radio button next to the word OFF. To activate the service, the subscriber merely clicks on the radio button next to ON and selects the Submit Changes button 931. The activation signal is sent via the web server 54 to the SMS 48, which updates the SCP 23 to immediately begin implementing the Flexible Call Forwarding service with respect to calls incoming to the subscriber telephone 25. Similarly, the sets of ON/OFF indicators 922 and 923 indicate that the priority screening list and the weekly schedule are deactivated.

To activate the priority screening list, the Flexible Call Forwarding service must be ON. The subscriber then clicks on the ON radio button of the ON/OFF set 922, corresponding to the Priority List, and selects the Submit Changes button 931. The Priority List may be indicated as ON at ON/OFF set 922, even when the Flexible Call Forwarding service is indicated as OFF at the ON/OFF set 921. However, the Priority List will not actively function in the PSTN to screen incoming calls until the Flexible Call Forwarding service itself is actually activated, through the web client 30 or through the IVR 45. The subscriber may therefore elect to keep the Priority List ON, so that it is automatically activated whenever the call forwarding function of the Flexible Call Forwarding service becomes active, including selective activation in accordance with the weekly schedule.

Likewise, to activate the weekly schedule, the Flexible Call Forwarding service must be ON. The subscriber then clicks on the ON radio button of the ON/OFF set 923, corresponding to the Web Schedule, and selects the Submit Changes button 931. The Web Schedule may be indicated as ON at ON/OFF set 923, even when the Flexible Call Forwarding service is OFF at the ON/OFF set 921. However, the Web Schedule will not function in the PSTN until the Flexible Call Forwarding service is actually activated, through the web client 30 or through the IVR 45. Also, even when both the Flexible Call Forwarding service and the Web Schedule are ON, calls are forwarded to the forward-to number in box 930 only during the activation periods indicated in the weekly schedule, an example of which is shown in the Web Schedule screen 904 of FIG. 12.

Figure 11:
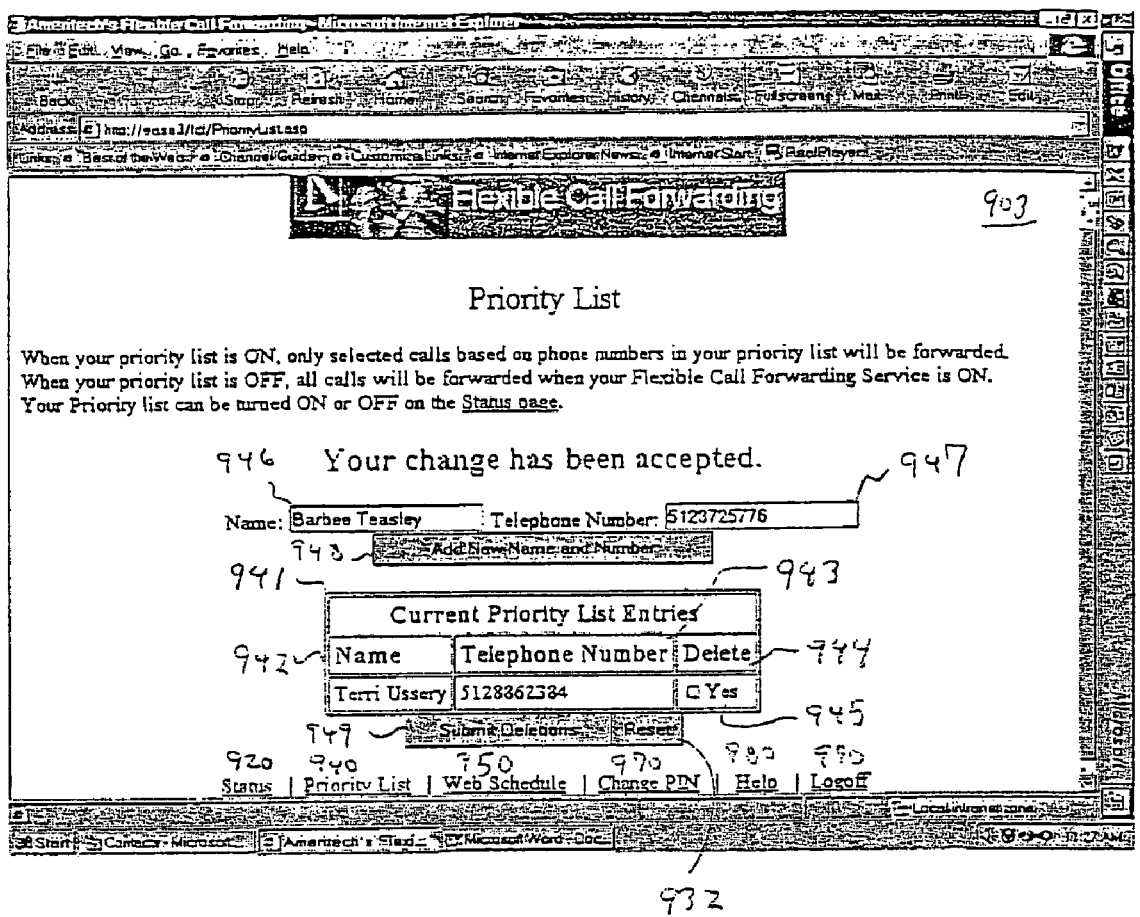
FIG. 11 is an exemplary web page of the alternative embodiment to be displayed at the user's PC showing a priority screening list, according to an aspect of the present invention.
Figure 12:
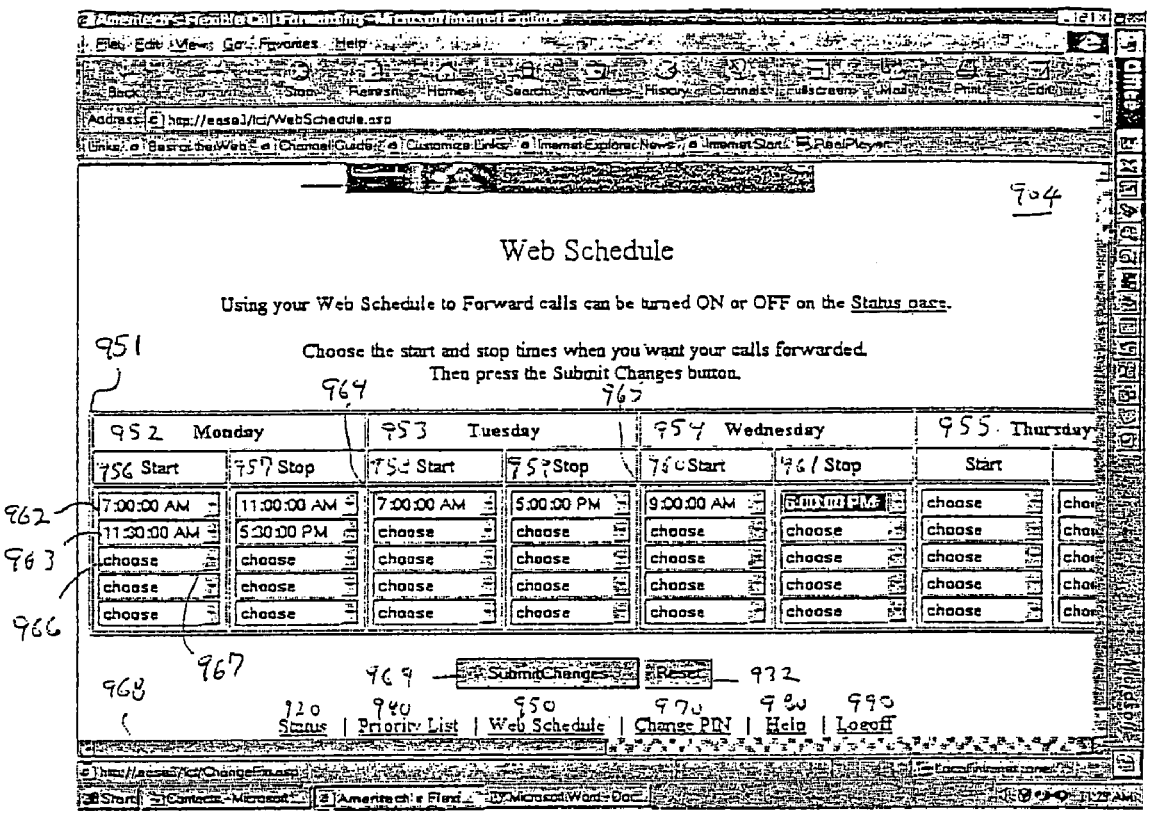
FIG. 12 is an exemplary web page of the alternative embodiment to be displayed at the user's PC showing a weekly schedule, according to an aspect of the present invention.

The Status screen 902 includes a number of additional links and buttons that are presented outside of the central viewing area of the screen, to avoid confusing the subscriber with ancillary information and choices. The Reset button 932 enables the subscriber to automatically reset all of the status entries to their respective values at the beginning of the interface session. The Status link 920, the Change PIN link 970, the Help link 980 and the Logoff link 990 are the same as previously discussed with respect to the Logon screen 901. The Priority List link 940 links to a web page that enables the subscriber to visually review and edit the current list of priority telephone numbers established by the subscriber. By selecting the Priority List link 940, a Priority List screen 903 is displayed on the PC 32 of the web client 30, an example of which is depicted in FIG. 11. The Web Schedule function link 950 enables the subscriber to visually review and edit the current weekly schedule established by the subscriber. By selecting the Web Schedule link 950, a Web Schedule screen 904 is displayed on the PC 32 of the web client 30, an example of which is depicted in FIG. 12.

In an embodiment of the invention, the Status screen 902 includes alternate means to access the Priority List screen 903 and the Web Schedule screen 904. For example, the Status screen 902 may include the create links 925 and 926, which respectively correspond to the Priority List and the Web Schedule. By selecting the create link 925, the Priority List screen 903 is displayed on the PC 32, enabling the subscriber to create and edit the priority screening list information to be implemented. By selecting the create link 926, the Web Schedule screen 904 is displayed on the PC 32, enabling the subscriber to create and edit the weekly schedule information to be implemented.

As discussed above, FIG. 11 depicts an exemplary web page showing the Priority List screen 903 presented to the web client 30 in response to selection of the create link 925 on the Status screen 902 or the Priority List link 940. The Priority List screen 903 clearly depicts the current priority screening list in table 941, which includes only three columns to avoid displaying an overabundance of information to the subscriber. The table 941 includes a Name column 942 and a Telephone Number column 943, which respectively include the names and telephone numbers of the priority screening list entries. The Name column 942 is first because the subscriber most readily identifies the name (as opposed to the telephone number) of the person or entity that has been assigned priority status.

The third column in table 941 is the Delete column 944. Each entry in the table 941 includes in the Delete column 944 a deletion indicator 945, consisting of the word YES with an adjacent activation box. To delete an existing entry, the subscriber simply clicks on the YES box, resulting in a mark within the box, associated with the name and telephone number the subscriber wishes to delete. The subscriber then selects the Submit Deletions button 949, which appears on the Priority List screen 903 outside the table 941, to avoid cluttering the presentation of the priority screening list data. Selection of the Submit Deletions button 949 results in the elimination of each entry in table 941 having a corresponding YES box checked in the Delete column 944.

The Priority List screen 903 further enables the subscriber to add entries to the priority screening list table 941. The subscriber enters the name of the priority party in box 946 and the corresponding telephone number in box 947. The name is entered in the order the subscriber wishes it to appear in the table, e.g., first name first or last name first. The subscriber then selects the Add button 948, resulting in the new name and telephone number being entered in the table 941. In an embodiment, the names are automatically sorted and entered into the table 941 alphabetically, enabling the subscriber to easily locate desired names when reviewing the table. When the Add button 948 and the Submit Deletions button 949 are selected, the corresponding changes to the priority list table 941 are sent to the SMS 48 to be stored and sent to the SCP 23 to be implemented, as discussed above.

FIG. 12 depicts an exemplary web page showing the Web Schedule screen 904 presented to the web client 30 in response to selection of the create link 926 on the Status screen 902 or the Web Schedule link 950 on any screen. The Web Schedule screen 904 depicts the existing weekly schedule for activating the call forwarding functionality of the Flexible Call Forwarding service in the Web Schedule table 951. In the depicted embodiment of the invention, the subscriber has one weekly schedule available for automatically activating the call forwarding functionality. In alternative embodiments, the subscriber has multiple weekly schedules available, each of which is associated with a separate Web Schedule table, e.g., Web Schedule A, Web Schedule B, etc., having a corresponding designation on the Status screen 902 of FIG. 10. The subscriber is then able to build multiple weekly schedules and selectively activate them from the Status page 902, as described above, or through the IVR 45, as described below.

The Web Schedule table 951 includes seven day columns corresponding to the seven days of the week. Although the Web Schedule table 951 shows only the Monday schedule 952, the Tuesday schedule 953, the Wednesday schedule 954 and the Thursday schedule 955, the schedules for the remaining days of the week are accessible by sliding the scroll bar 968 at the bottom of the Web Schedule screen 904 to the right.

Within each of the seven day schedules 952–955 are two columns indicating a start time and a corresponding stop time, which enable the subscriber to define the time periods during which the call forwarding functionality is active each day. In the depicted embodiment of the invention, each of the day schedules 952–955 allow up to five activation periods, as indicated by the five rows of boxes in each of the start time and stop time columns. The depicted layout allows the subscriber to easily view, understand and edit the activation time periods for the week. For example, when the subscriber desires calls to be forwarded to the forward-to number during the same time period every day, he or she may enter that time period across the same row of start times and stop times in the table 951 and select the Submit Changes button 969 to store and implement the entered data. The subscriber is then able to easily verify the entries by merely scanning a single row of time entries in the adjacent day schedules and confirming that they match.

The Web Schedule screen 904 of FIG. 12 includes exemplary activation time periods to illustrate use of the weekly schedule. The Monday schedule 952 includes two activation time periods 962 and 963. The first activation time period 962 begins at 7:00 a.m., as indicated by the first entry in the start column 956, and ends at 11:00 a.m., as indicated by the first entry in the stop column 957. The second activation time period 963 begins at 11:30 a.m., as indicated by the second entry in the start column 956, and ends at 5:30 p.m., as indicated by the second entry in the stop column 957. The two activation time periods are listed in chronological order, so that the subscriber is able to clearly visualize the start and stop times in relation to one another. In an embodiment of the invention, the subscriber is required to list the activation time periods of each day in chronological order, by either rejecting entries that are out of order or by automatically rearranging the activation time periods when the subscriber selects the Submit Changes button 969.

The Tuesday schedule 953 of the Web Schedule table 951 includes one activation time period 964, beginning at 7:00 a.m., as indicated by the first entry in the start column 958, and ending at 5:00 p.m., as indicated by the first entry in the stop column 959. Similarly, the Wednesday schedule 954 includes one activation time period 965, beginning at 9:00 a.m., as indicated by the first entry in the start column 960, and ending at 6:00 p.m., as indicated by the first entry in the stop column 961. In the depicted embodiment, each of the boxes that does not have a specific time entry displays the word "choose," as shown in box 966, for example, in order to hold the place in the start or stop column and to indicate the availability of another activation time period, if desired. Alternative embodiments may include more or fewer available time entries, although the number of time entries should not clutter the screen and thereby cause confusion to the subscriber.

The time entries in the start and stop columns are entered by the subscriber by selecting the desired box and typing the time, including a.m. or p.m., using a keyboard associated with the PC 32. The desired box is selected using conventional means, such as clicking on the box using a mouse or jumping from box to box using the tab key on the keyboard. Each of the time entry boxes also includes a drop-down list feature activated by selecting a drop-down list indicator 967. The drop-down list enables the subscriber to avoid manually typing the start and stop times by enabling selection from among preset morning (a.m.) and afternoon (p.m.) times shown in the drop-down list. The preset times are divided into convenient increments, such as every hour, every half hour, every fifteen minutes, etc. When the subscriber desires a start or stop time that does not match the preset time increments, the subscriber is not able to use the drop-down list feature. Of course, the present invention contemplates use of any conventional means for entering data on a web page, including use of a touch sensitive screen on a personal digital assistant (PDA) or a hand-held PC, for example.

FIG. 13 depicts an exemplary web page showing the Change PIN screen 905 presented to the web client 30 in response to selection of the Change PIN link 970. To change the PIN, the subscriber must first accurately enter the existing PIN in the Current Pin box 971. Even though the subscriber is already logged onto the Flexible Call Forwarding service web site, requiring the existing PIN to be entered again assures that the PIN will not be changed inadvertently or by someone other than the subscriber who has access to an already logged on web client 30. The characters entered in box 971 are authenticated by the SMS 48 in the same manner as described above with respect to the log on process. The subscriber then enters the desired new PIN in box 972, and repeats the entry in box 973. The two entries are compared and the existing PIN is not changed to the new PIN unless the entries match. Entering the PIN twice assures that the subscriber does not inadvertently change the PIN to a number that results from a faulty key stroke, for example. The change is implemented in the SMS 48 when the subscriber selects the Submit button 974. When the entries in boxes 972 and 973 do not match, however, the subscriber is notified accordingly and invited to try again. When the subscriber selects the Reset icon 932, prior to exiting the Change PIN screen 905, the PIN is returned to the same character it was at the time the Change PIN screen 905 was accessed.

In other embodiments of the invention, the Flexible Call Forwarding service forwards telephone calls to alternative numbers, depending on the priority screening list. For example, a calling party number on the priority screening list is forwarded to the current location of the subscriber and a calling party number not on the list is terminated at the original called party number. Furthermore, an embodiment includes a rejection screening list for the subscriber to identify specific directory numbers from which he or she does not wish to accept forwarded calls, or directory numbers that are forwarded to an alternative telephone number or message center.

Figure 14:
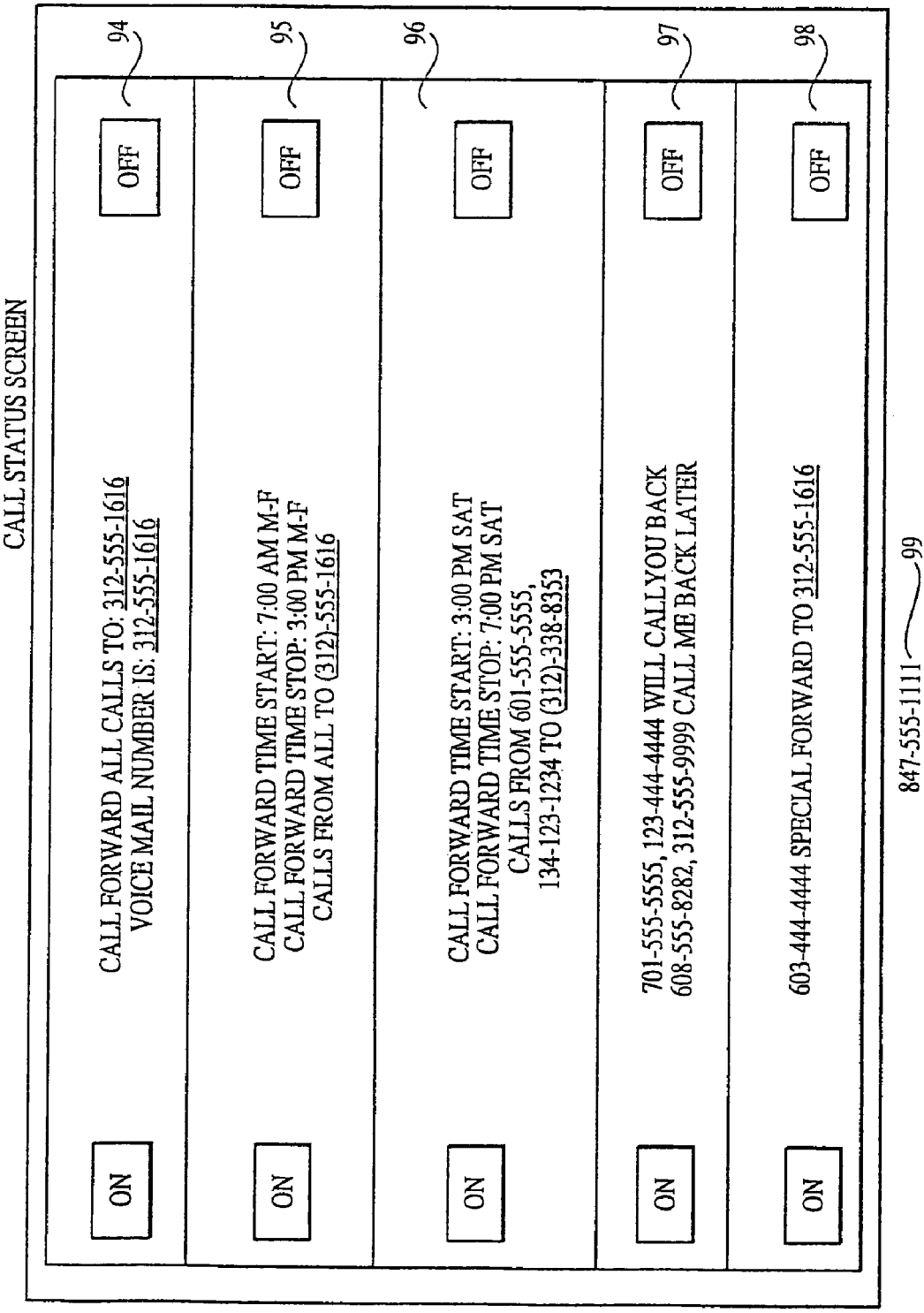
FIG. 14 is an exemplary web page of another alternative embodiment to be displayed at the user's PC showing an activation and scheduling summary for Flexible Call Forwarding, according to an aspect of the present invention.

For example, FIG. 14 shows an exemplary web page, entitled Call Status Screen, that displays summary information from a weekly schedule integrated with a priority screening list and a rejection screening list. The directory number 99 at the bottom of the screen is the telephone number of the subscriber using the service. Boxes 94–98 display scheduling options created and edited by the subscriber using the web client 30, as described above. Each box includes ON and OFF icons, which can be selected after the particular schedule and associated screening lists have been created, using either the web client 30 via the Internet 44 or the IVR 45 via the PSTN.

Box 94 is the basic call forwarding function in which, when activated, all calls are forwarded to telephone number 312-555-1616. (As shown, this number coincides with the subscriber's voice mail, which in an embodiment may be a call control option, discussed below.) All calls continue to be forwarded to this number until the subscriber deactivates this function, i.e., selects the OFF icon, or until the day and time set in the automatic-off function (not shown) is reached.

Box 95 of FIG. 14 is a summary of essentially the same type of information shown in the exemplary web page of FIG. 3. From the start time of 7:00 a.m. to the stop time of 3:00 p.m., Monday through Friday, all calls are automatically forwarded to the previously identified directory number, 312-555-1616, with no further action by the subscriber (other than activating box 95). Box 96 is similar to box 95, except that box 96 incorporates a priority screening list. Therefore, from 3:00 p.m. to 7:00 p.m. on Saturday, the Flexible Call Forwarding service forwards only calls from the two numbers on the priority screening list, i.e., 601-555-5555 and 134-123-1234, to a priority forwarding number, i.e., 312-338-8353.

Box 97 shows an example of using a rejection screening list in conjunction with a priority screening list. Assuming that the subscriber desires to return calls from those directory numbers on a second priority screening list, i.e., calls from 701-555-5555 and 123-444-4444, callers associated with the directory numbers on the second priority list will hear an announcement to that effect whenever they call the subscriber's number while box 97 is activated. However, calls from the directory numbers on the rejection screening list, i.e., 608-555-8282 and 312-555-9999, will hear an announcement instructing the caller to attempt the call at a later time.

Box 98 shows another embodiment of the invention in which the Flexible Call Forwarding service provides another priority screening list, referred to, for example, as the special forward list. This list is built by the subscriber using the web client 30 in the same manner described with respect to the priority screening list. Once created and implemented, i.e., activated by selecting the ON icon on the GUI of web client 30 or sending the appropriate touch tone over the IVR 45, calls from the special forward list directory numbers are sent to another optional telephone number (or played an alternative announcement) according to the subscriber's instructions.

Figure 15:
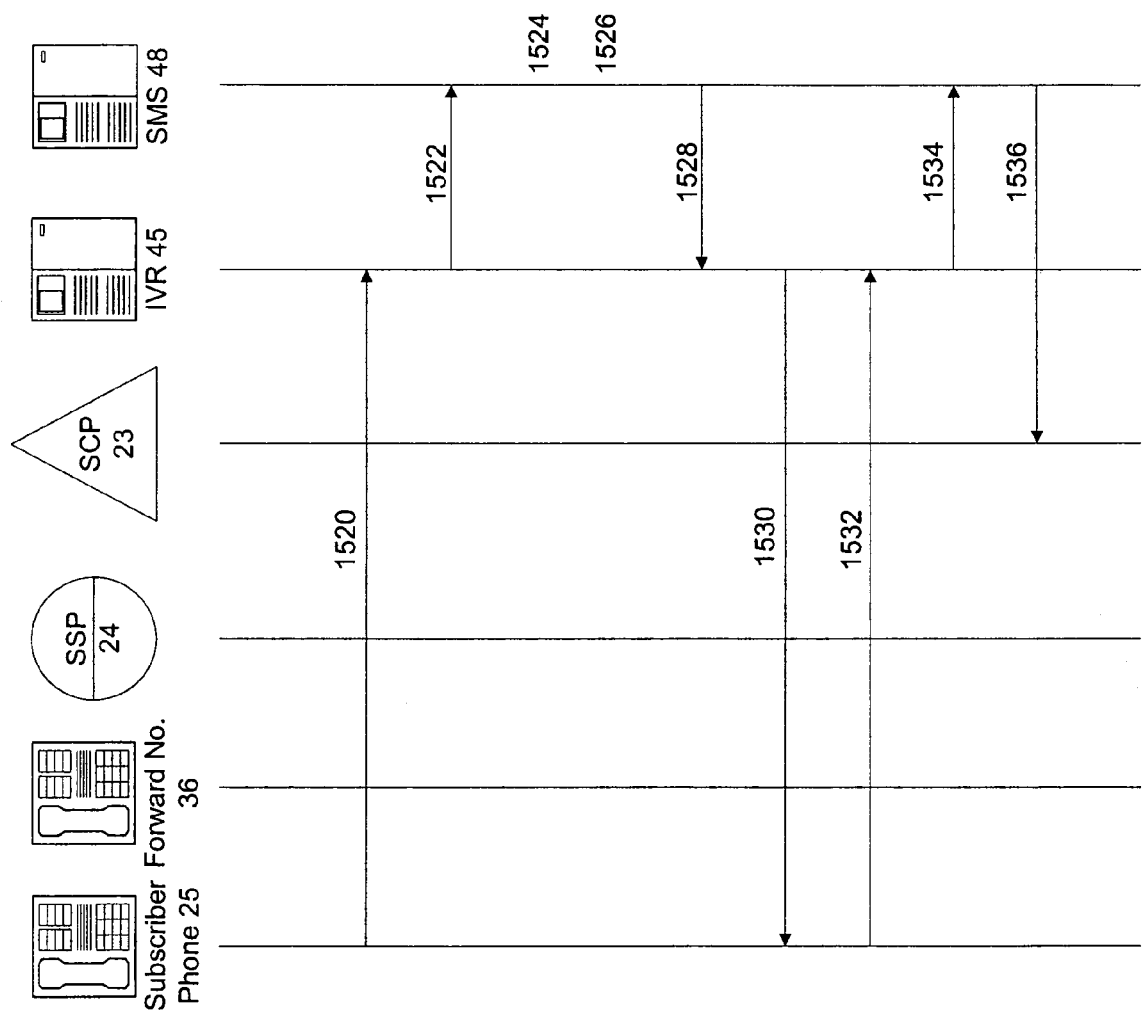
FIG. 15 is an exemplary call flow diagram in which the subscriber accesses Flexible Call Forwarding data via an IVR, according to an aspect of the present invention.

Exemplary steps through which the subscriber can alternatively interact with Flexible Call Forwarding using the IVR 45 are shown in FIG. 15. As stated above, access through the IVR 45 is slightly limited in that the subscriber cannot actually build or edit priority screening lists and weekly schedules. However, the subscriber can access all other features of the Flexible Call Forwarding service, including changing the PIN, toggling the Flexible Call Forwarding service ON or OFF, setting the automatic-off function day and time, and activating/deactivating the priority screening list and weekly schedule.

Referring to FIG. 15, the subscriber calls a toll free number from any DTMF telephone, which directly accesses the IVR 45, shown at step 1520. FIG. 15 depicts, for example, the call originating from the subscriber telephone 25. The IVR 45 receives the call and initiates a request for various authentication information, including the account and PIN numbers. These numbers coincide with the account and PIN numbers used to access the Flexible Call Forwarding service via the Internet 44. The pre-programmed voice announcements for this aspect of the invention reside in the IVR 45, and implementation of the voice announcements is well known. The authentication information is provided using the touch tones of the DTMF subscriber telephone 25. The IVR 45 forwards the information to the SMS 48 at step 1522 for verification at step 1524.

After verification, the system operates in much the same way as described above with respect to a GUI and the Internet. The SMS 48 retrieves at step 1526 the current service data for the Flexible Call Forwarding service, including current priority screening lists and schedules, and provides the IVR 45 with the call forwarding data specific to the subscriber at step 1528. The IVR 45 then verbally recites a menu of options to the subscriber at step 1530 based on the information received from the SMS 48. For example, if the subscriber has previously built a priority screening list, activation of this list will be included among the options provided to the user over the telephone. The subscriber listens to the options and inputs various choices at step 1532 via the telephone touch tone key pad, including, for example turning on Flexible Call Forwarding or selecting and activating a predefined priority list or weekly schedule. The subscriber can also set the automatic-off function date and time.

These commands are forwarded from the IVR 45 to the SMS 48 at step 1534, which updates the Flexible Call Forwarding data contained in the SCP 23 at step 1536. Once stored at the SCP 23, Flexible Call Forwarding is set with respect to incoming calls in accordance with the customizing instructions from the subscriber.

Figure 16:
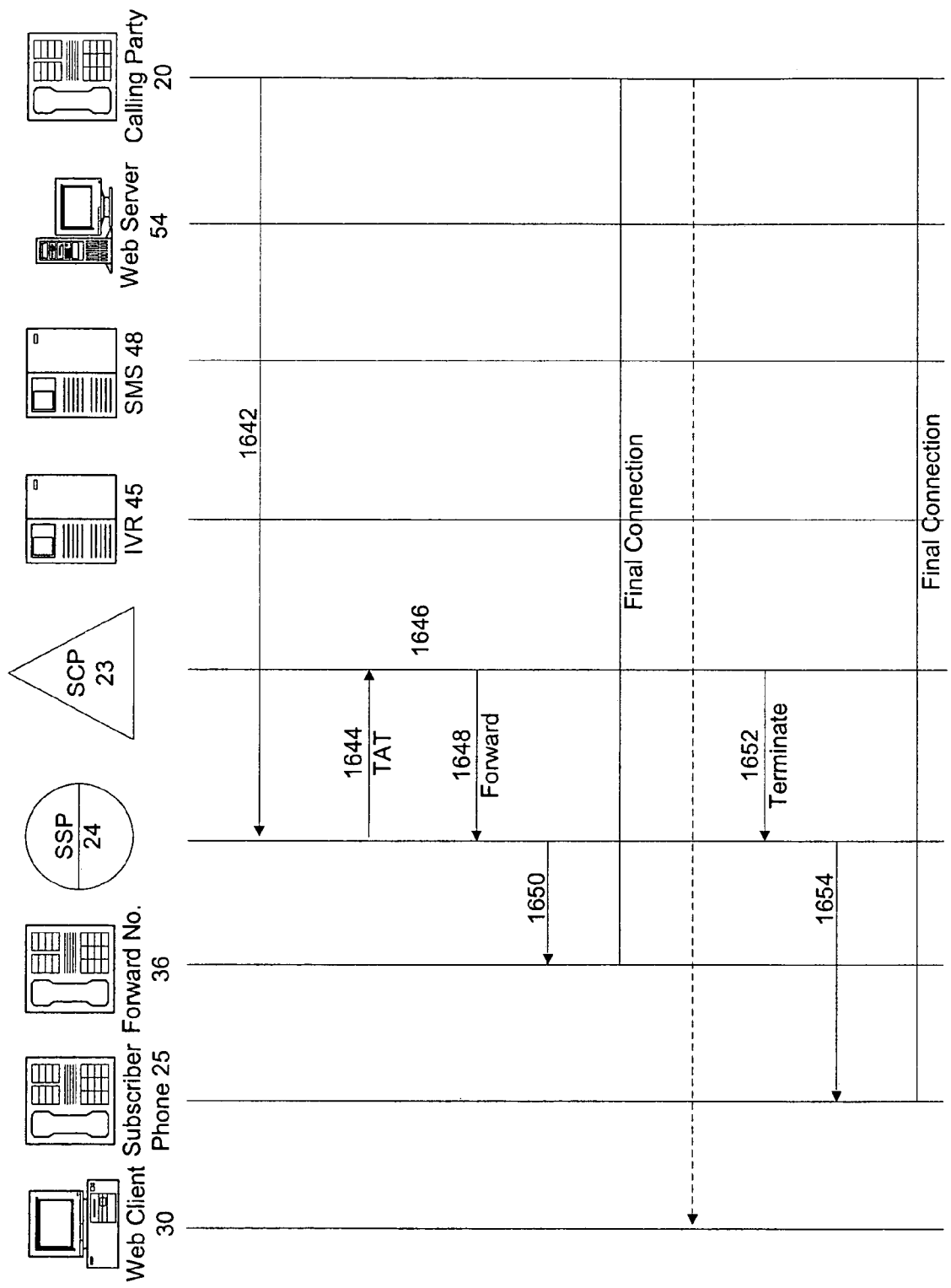
FIG. 16 is an exemplary Flexible Call Forwarding call flow diagram showing routing of an incoming telephone call, according to an aspect of the present invention.

FIG. 16 is a call flow diagram depicting an exemplary implementation of Flexible Call Forwarding in response to an incoming telephone call. At step 1642, a calling party 20 places a call to the telephone number of the subscriber telephone 25. The call proceeds through the originating SSP 21 (not pictured) to the terminating SSP 24, which launches an AIN Terminating Attempt Trigger (TAT) query to the SCP 23 at step 1644. Once the trigger has been assigned and activated, every call terminating to the subscriber's line will cause the SSP 24 to launch the TAT query via the existing SS7 network.

Figure 17:
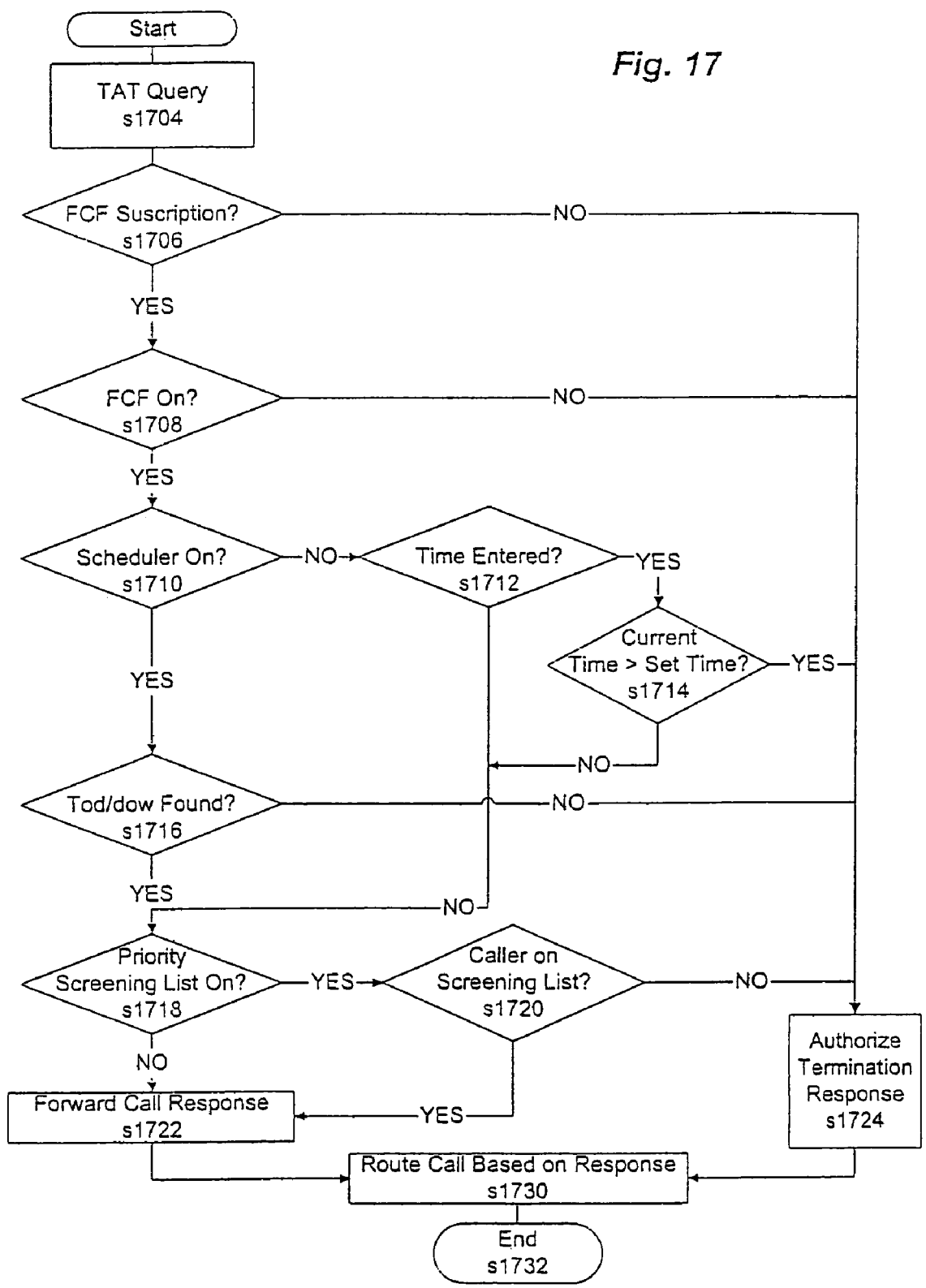
FIG. 17 is an exemplary flow chart of Flexible Call Forwarding call routing logic, according to an aspect of the present invention.

Step 1644 of FIG. 16 coincides with step s1704 of FIG. 17, which is a flow diagram depicting the logic flow of handling an exemplary call according to an embodiment of the invention. In particular, at step s1704, the SCP 23 receives a termination attempt query message from the SSP 24. The data corresponding to the termination attempt query includes standard AIN parameters, such as a called party identification number and a calling party identification number.

After receiving the TAT query, the SCP 23 internally processes the data at step 1646 of FIG. 16. The SCP 23 first determines at step s1706 of FIG. 17 whether the called party is a Flexible Call Forwarding subscriber. The determination is accomplished by comparing the query parameters from the SSP 24 to a list of subscribers in the Flexible Call Forwarding database of the SCP 23. If there is no match, the SCP 23 concludes that the called party is not a Flexible Call Forwarding subscriber and sends an authorize termination instruction to the SSP 24, which terminates the call to the dialed telephone number, as indicated at steps s1724 and s1730, ending the process at step s1732. In other words, the SCP 23 instructs the SSP 24 to simply complete the call as dialed with no further processing.

If the SCP 23 finds a match at step s1706, indicating that the called party is a subscriber to Flexible Call Forwarding, the process proceeds to step s1708, which determines whether the Flexible Call Forwarding service is ON or OFF. The ON/OFF status is indicated by a data flag, for example. If the Flexible Call Forwarding service is OFF, the logic proceeds to steps s1724 and s1730, as described above. That is, the SCP 23 sends the authorize termination instruction to SSP 24, which terminates the call to the called party number. If Flexible Call Forwarding service is ON, then the SCP 23 must determine which functions have been activated by the subscriber.

At step s1710, the SCP 23 determines whether the scheduler is ON or OFF. The scheduler status is also indicated by a data flag, for example. If the scheduler is OFF, the SCP 23 proceeds to step s1712, which represents the automatic-off function of Flexible Call Forwarding. As previously described, and as shown in FIG. 17, the automatic-off function is entirely bypassed whenever the scheduler is activated, thereby preventing conflicting instructions from the two features. With respect to the automatic-off function, the SCP 23 first determines whether a time has been entered into the Data Counter field, which indicates the time at which the subscriber wishes call forwarding to be discontinued. If there is no time entered, the SCP 23 assumes that call forwarding is still active and proceeds to step s1718 to determine whether the priority list is activated. If there is a time in the Data Counter field, which indicates the automatic shut-off time, the current time of day, provided by a timer of the SCP 23, is checked against the shut-off time at step s1714. If the current time is later than the shut-off time, the SCP 23 instructs SSP 24 to terminate the call to the called number of the subscriber telephone 25, at step s1724. Otherwise, the SCP 23 proceeds to step s1718.

If it is determined at step s1710 that the scheduler is on, the SCP 23 accesses the scheduler table to execute call forwarding accordingly. In an embodiment, the weekly schedule includes a time of day/day of week ("tod/dow") table, which may have the multiple entries. As discussed above, at a minimum, the tod/dow table contains multiple sets of start times and end times, as well as fields for identifying the days of the week for activation. The fields, for example, contain data indicating which days of the week have been designated activation periods. In an embodiment of the invention, the table also stores telephone numbers corresponding to the various activation periods of Flexible Call Forwarding.

At step s1716, the SCP 23 determines whether the tod/dow table is found and populated. If there is no such table or the table exists but is unpopulated, the SCP 23 proceeds to step s1724, where the call is terminated to the called number of the subscriber telephone 25. Otherwise, the SCP 23 determines the forwarding instruction according to the current time, the times and days indicated by the tod/dow table and, in one embodiment, the forwarding telephone numbers. If the table indicates that the current time falls within a period during which call forwarding is not active, then the SCP 23 instructs the SSP 24 to terminate the call to the called party number.

Otherwise, the process proceeds to step s1718, where the SCP 23 determines whether the priority screening list feature is ON or OFF. If the list feature is OFF, the SCP 23 simply instructs the SSP 24 to forward the telephone call to the designated forwarding number, at step s1722. If the list feature is on, the number of the calling party 20 is used to determine whether the caller is on the priority screening list, indicated at step s1720. The list accommodates multiple entries for priority calls (e.g., 75, in one embodiment) and is populated with telephone numbers associated with whomever the subscriber has previously identified as a priority caller. When the priority screening list feature is on and the calling party number 20 does not appear on that list, the SCP 23 instructs SSP 24 to terminate the call to the subscriber telephone 25, at step s1724. Otherwise, the SCP 23 instructs the SSP 24 to forward the call to the designated phone number, indicated at step s1722. The call is then routed accordingly at step s1730, ending the process at step s1732.

Referring back to FIG. 16, in order to instruct the SSP 24 to forward a call, the SCP 23 sends a forward call message to the SSP 24 at step 1648. In an embodiment of the invention, the forward call message sent by the SCP 23 to the SSP 24 includes standard AIN parameters. The SSP 24 then completes the connection between the calling party 20 and the forwarding number at step 1650, resulting in a final connection between the two. In the alternative, if the SSP 24 is instructed to terminate the call to the called party number of the subscriber telephone 25, the SCP 23 sends the authorize termination message, previously discussed, to the SSP 24 at step 1652. The SSP 24 then completes the connection between the calling party 20 and the subscriber telephone 25 (i.e., called party number) at step 1654, resulting in a final connection between the two.

System errors that occur while processing a call under Flexible Call Forwarding generally result in the call being terminated to the subscriber telephone 25. For example, if the SSP 24 does not receive a response to the termination attempt query from the SCP 23 within a predetermined time, e.g., 3 seconds, the call is terminated to the subscriber telephone 25. Other errors resulting in termination to the subscriber telephone 25 include the SSP 24 receiving any report of an application error after sending a termination attempt query and the SSP 24 detecting a protocol or application error in an authorize termination message from the SCP 23.

Personal Call Manager

Figure 18:
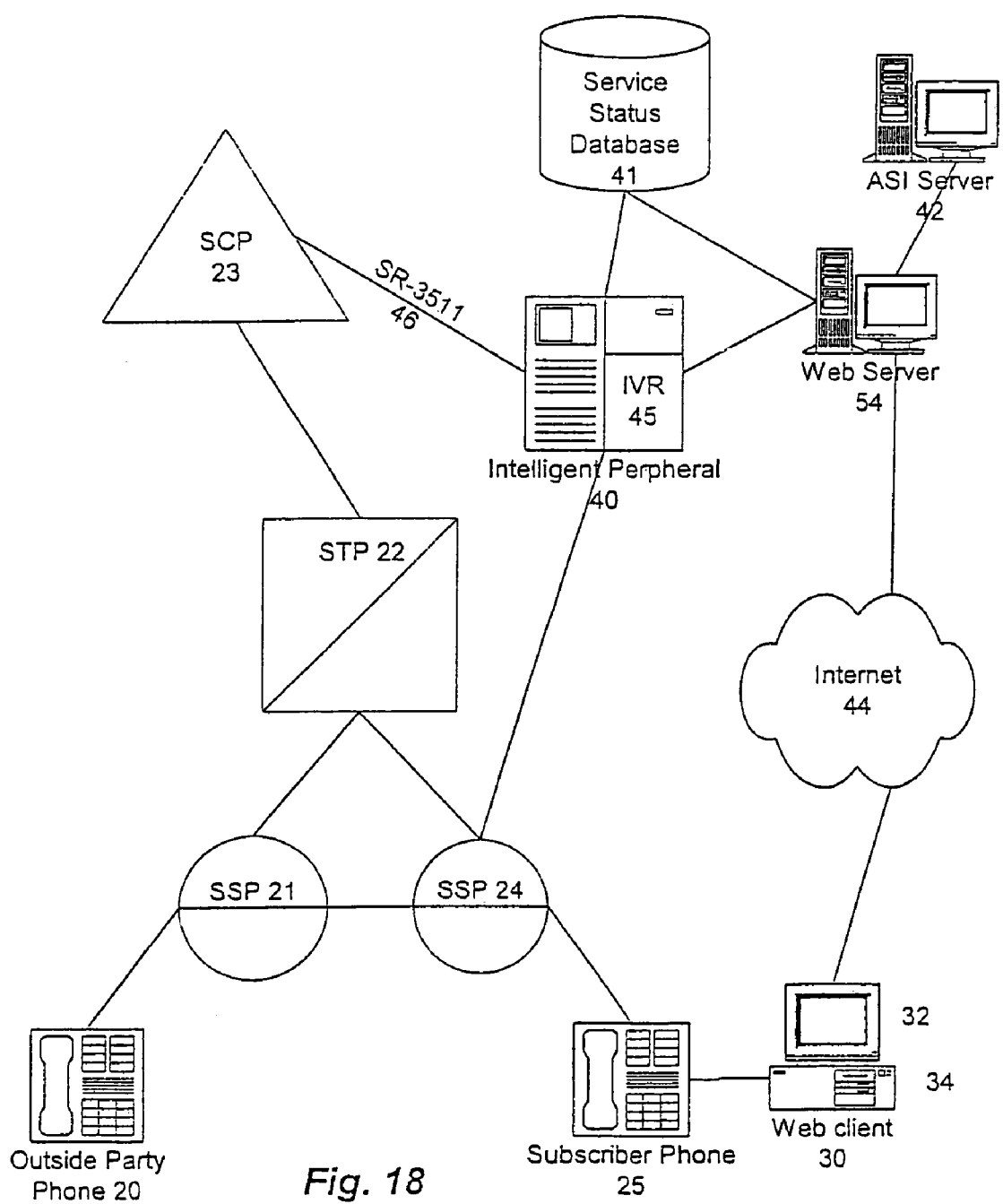
FIG. 18 is a block diagram showing an exemplary PCM telecommunications network, according to an aspect of the present invention.

Flexible Call Forwarding may be integrated with a Personal Call Manager (PCM) service to enhance functionality and compatibility with other call control services. PCM is an AIN based service that allows a subscriber connected to a communications network, including the Internet and other packet switched type data networks, as well as through conventional IVR systems, to customize and execute services associated with telephonic communications, with near real-time access to the service data. FIG. 18 illustrates an exemplary telecommunications network in association with PCM. The network includes a calling party telephone 20, an originating SSP 21, a terminating SSP 24 and a subscriber telephone 25, an STP 22 and an SCP 23, examples of which have been previously described. The network also includes an AIN/IP (intelligent peripheral) 40, which incorporates an IVR 45. In alternative embodiments, the intelligent peripheral may be an IBM Resource Manager or a Lucent PacketIN Application Server.

An associated data network includes a web client 30, a web server 54, an authentication/subscription information server 42 and a service status database 41. The data network communicates to the PSTN (specifically the SCP 23) through the intelligent peripheral 40 using the SR-3511 protocol 46, or an equivalent protocol. In an embodiment of the invention, the functions of the intelligent peripheral 40 may be performed by the SN/IP 57, shown in FIG. 1, such as an IBM Resource Manager, a Lucent Compact Service Node or a Lucent Enhanced Media Resource Server (eMRS).

Figure 19:
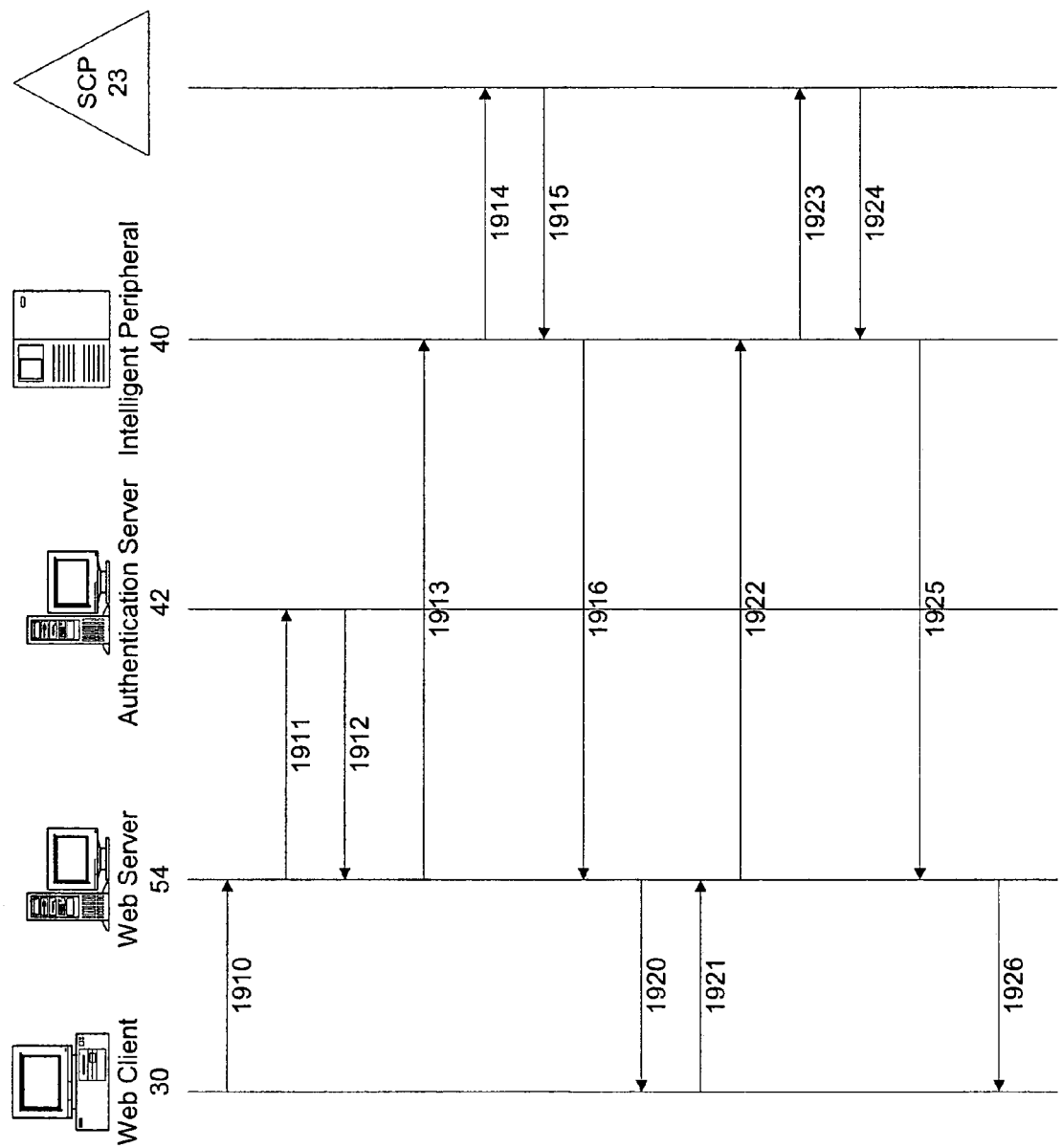
FIG. 19 is a call flow diagram illustrating subscriber requests for information from the PCM system, according to an aspect of the present invention.

FIG. 19 is an exemplary call flow diagram depicting a subscriber using the PCM service. Initially, the subscriber accesses a public packet switched data network, such as the Internet, from a web client 30, using a web browser such as Microsoft Internet Explorer, Netscape Navigator or HotJava. Once on the Internet, the subscriber connects to the web server 54 at step 1910, which serves as a secure access platform. The web server 54 receives HTTP messages from the web client 30 and provides HTML web pages, or the like, in response to the subscriber's input to the web client 30. The web pages relate to the subscriber's PCM account.

Once connected to the web server 54, the user must first log-in to the PCM account, also depicted at block 201 in FIG. 21 and described below. The log-in equates to an authentication of the user. To perform the authentication, the web server 54 contacts the authentication/subscription information (ASI) server 42 at step 1911, which confirms that the subscriber is an authorized user by verifying at least the subscriber's name and a password (or a PIN). The ASI server 42 also provides to the web server 54 a list of the services to which the user has subscribed in the PCM account at step 1912. The services for each phone number are linked to the PCM account through the ASI server 42.

At steps 1913 and 1914, the web server 54 then retrieves from the SCP 23, via the intelligent peripheral 40, current service data and the related status of the various services, such as call monitoring and Flexible Call Forwarding, managed through the PCM account. The data and status of the services, i.e., service data, is forwarded to the web client 30 at steps 1915 and 1916. A PCM summary page is displayed on the web client 30 at step 1920, as seen for example in FIG. 24, discussed in detail below.

Figure 20:
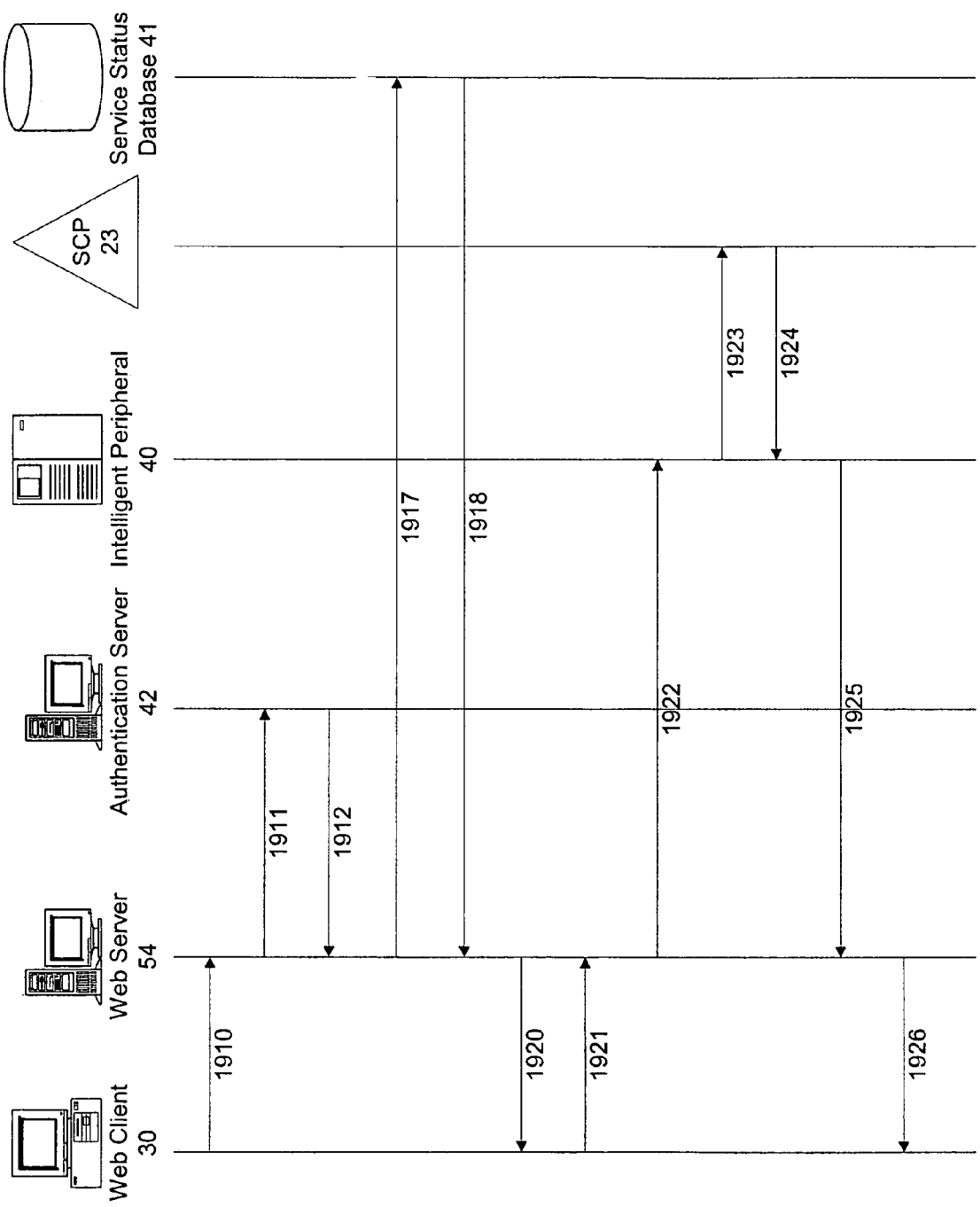
FIG. 20 is a call flow diagram illustrating subscriber requests for information from the PCM system, according to an alternative embodiment of the present invention.

In another embodiment, depicted in FIG. 20, after logging in and being authenticated at steps 1910–1912, the web server 54 retrieves from a service status database 41 the data and status of the various services managed through the PCM account at steps 1917 and 1918, rather than from the SCP 23, directly. This database serves as a cache for the service information in the SCP 23. The service status database 41 contains information current to the most recent update interface with the SCP 23. The cache arrangement enables the user to efficiently access this information without waiting for the SCP 23 to process the request. At the same time, it reduces SCP 23 traffic. The service status database 41 is refreshed periodically to ensure currency, as well as pursuant to a specific command by the user. This database is a conventional lightweight directory access protocol (LDAP) database, such as the LDAP database available from Lucent Technologies, Inc. In the alternative, the database may be a standard relational database, such as those available from Oracle Corporation or Sybase, Inc.

Upon review of the service status, the user may choose to interact with one or all of the available services, as shown in FIGS. 19 and 20. When the user selects a desired service, a message is sent at step 1921 to the web server 54, which responds with the corresponding service screen. When the user selects a particular service necessitating access to the PSTN (e.g., OCC or ICM), the request is sent to the intelligent peripheral 40 at step 1922.

Significantly, the intelligent peripheral 40 may be the same intelligent peripheral that implements IVR access to the user's services through a conventional PSTN. The intelligent peripheral 40 internally translates data messages received from the web server 54 and accesses the relevant call services data from the SCP 23 at step 1923 through the SR-3511 protocol, the use of which enables the simultaneous compatibility with functions of the IVR 45. Details of the SR-3511 protocol are provided in Bellcore, Recommendation SR-3511 SCP Intelligent Peripheral (IP) Interface Specification for TCP/IP, Version 5.0 (January 1997), the disclosure of which is expressly incorporated by reference herein in its entirety. In various embodiments, the translation program is in C, C++ or JAVA. The intelligent peripheral 40 then transmits a summary of the requested service, based on information received from the SCP 23 at step 1924, to the web server 54 at step 1925. The web server 54 sends the information to the web client 30 at step 1926 to be displayed to the user.

At this point, the user may choose to update or to simply review the service information. When the service is updated, the web server 54 sends the update instructions in a data message to the intelligent peripheral 40. The intelligent peripheral then translates the update instruction into the SR-3511 protocol and communicates the updated service parameters directly to the SCP 23.

For example, one available service is call manager, discussed in detail below, which includes an Incoming Call Manager (ICM), by which the user may prioritize, forward, preview or block selected telephone numbers. In the update procedure, the subscriber enters a telephone number to be blocked, for instance, which the web server 54 communicates to the intelligent peripheral 40. The intelligent peripheral 40, in turn, sends the data via SR-3511 to the SCP 23, which flags the number to be blocked. Because the instructions of the intelligent peripheral 40 to the SCP 23 are sent and implemented immediately, without the involvement of the provider's account management or customer service, the changes to the service are operable and available shortly after the user sends the instructions. In an embodiment that includes the service status database 41, the cache will then be updated in due course to reflect the updated information in the SCP 23.

Figure 21:
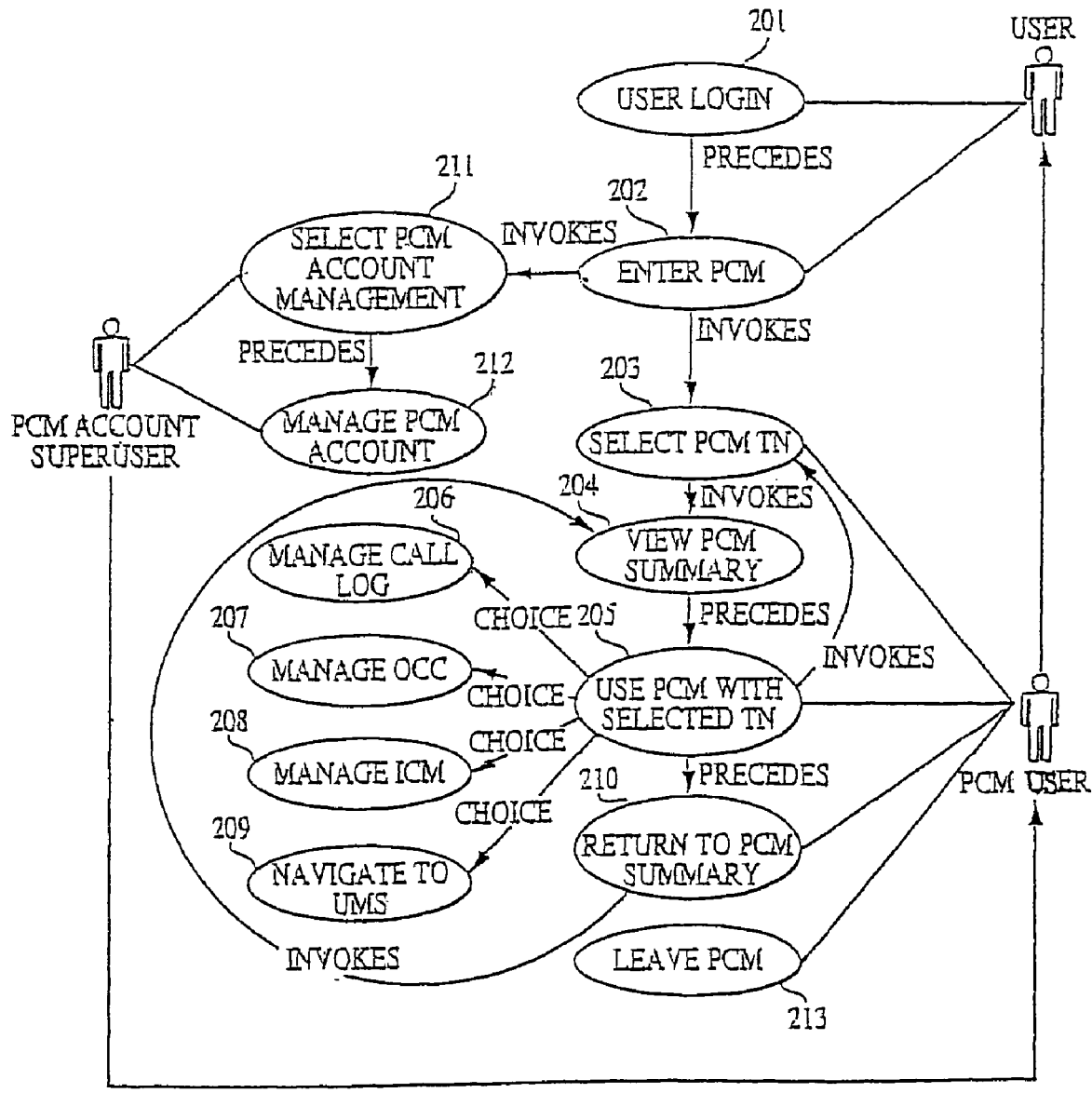
FIG. 21 illustrates user action in an exemplary web-based PCM system, according to an aspect of the present invention.
Figure 22:
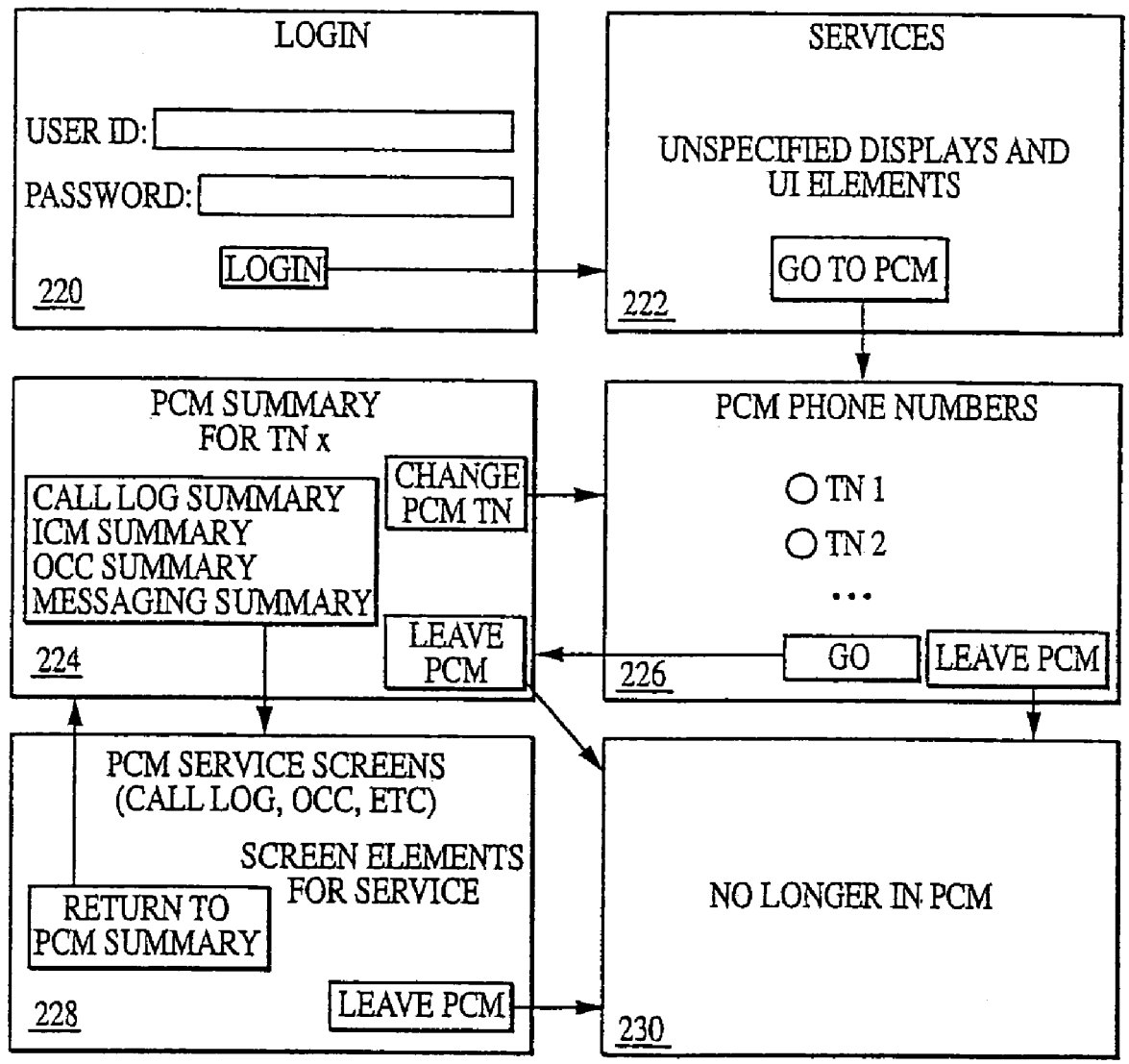
FIG. 22 illustrates an exemplary window navigation flow for basic user actions, according to an aspect of the present invention.

FIG. 21 depicts the procedure followed by the subscriber when first entering the PCM web site. The subscriber must first log-in at block 201. Assuming the subscriber's PCM account has already been established, as described below, he or she must provide the authentication data to proceed. The authentication data is entered at a log-in screen, an example of which is depicted in FIG. 22 at screen 220. To maintain the integrity of the secure platform, authentication requires preferably a user ID and a password. The user ID is any name, not necessarily unique within the PCM system, selected at account initiation by the subscriber. The password is confidential (at the subscriber's discretion) and must be unique with respect to the associated user ID. The subscriber may change the password as desired, but appropriate authentication data must be provided prior to such changes. If the subscriber enters an invalid user ID or password, the web server 54 responds with a message explaining the problem and allows another chance to enter correct data.

Figure 23:
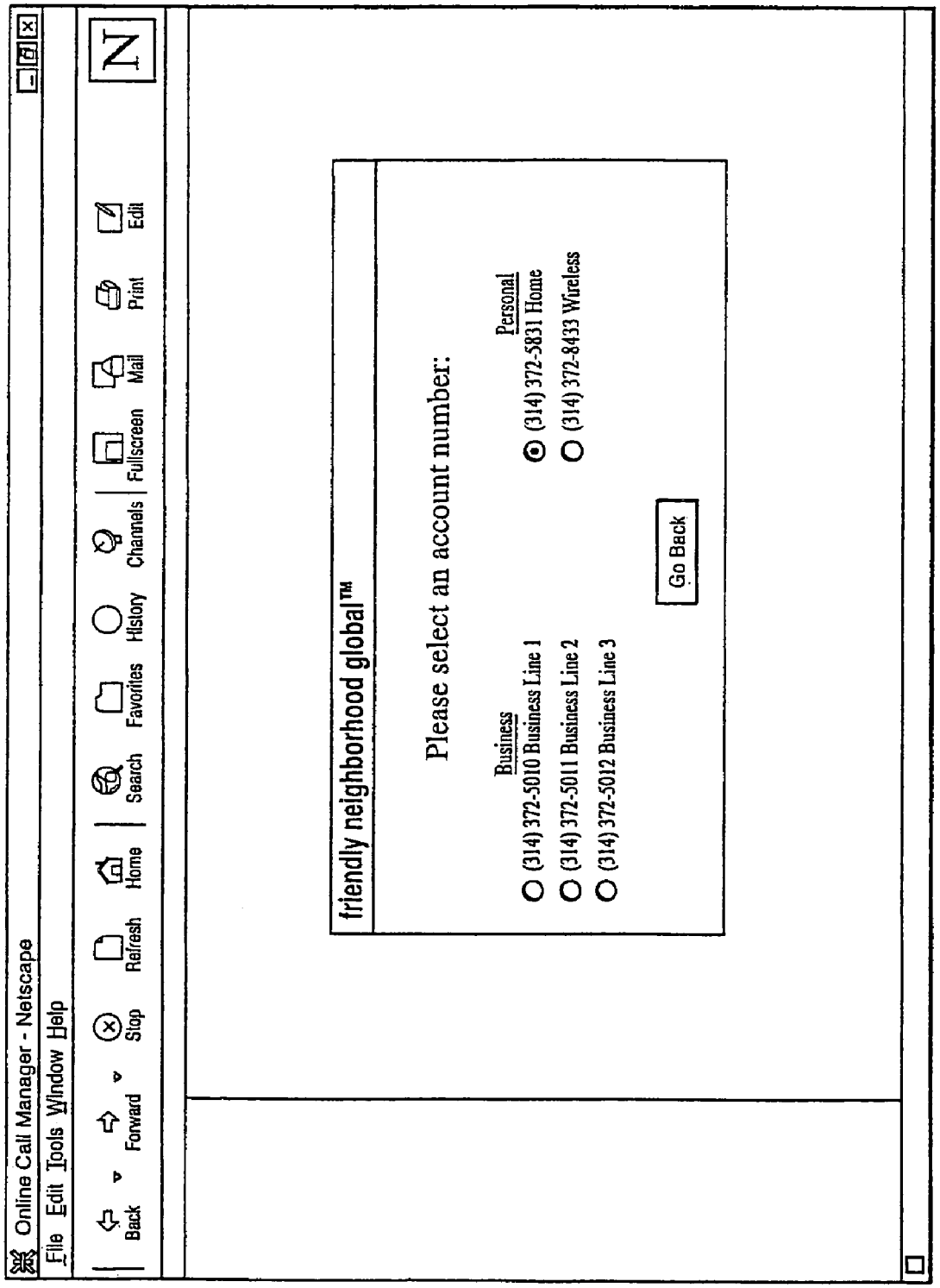
FIG. 23 is an exemplary window to be displayed at the user's PC requesting identification of a PCM account number, according to an aspect of the present invention.

After the subscriber is authenticated, the subscriber proceeds to enter the PCM at block 202. At this time, the user views a general informational screen 222 of FIG. 22, which is formatted at the discretion of the service provider. It may include, by way of example, new services offered to the subscriber. After the subscriber elects to proceed into the PCM, the web server 54 navigates to a page 226 that displays telephone numbers associated with the PCM account(s) to which the user belongs and to which the user is authorized to access. FIG. 23 depicts an exemplary screen displaying phone numbers to which the user has access.

At this point, the user selects a telephone number at block 203 and the corresponding services are displayed for the selected telephone number at screen 224. The user may then elect to implement the various services in place for a particular phone number. In an embodiment of the invention, if the subscriber selects the Flexible Call Forwarding service in the PCM account, he or she further enters the appropriate PIN. Alternatively, at block 202 the user may elect to manage the PCM account at blocks 211 and 212, depending on the user's privileges within a particular account to manage the PCM account.

If the PCM has more than one associated telephone number, the user would see a web page listing the numbers, as in block 226 of FIG. 22. The screen has user interface elements that allow the user to select one of the numbers. Thus, each PCM account keeps track of a non-empty set of phone numbers to be managed through the PCM on behalf of the corresponding set of users, presumably members of a family, business, organization or other group.

After the user selects a phone number at block 203, the system displays for the user a PCM summary page 204 corresponding to the selected telephone number. The PCM summary page displays only data the user is authorized to see for the selected telephone number. As shown at screen 224, the PCM summary provides various options to the user, including by way of example, selecting from among listed services 206–209, returning to select an alternative PCM telephone number or exiting PCM altogether at block 213.

Figure 24:
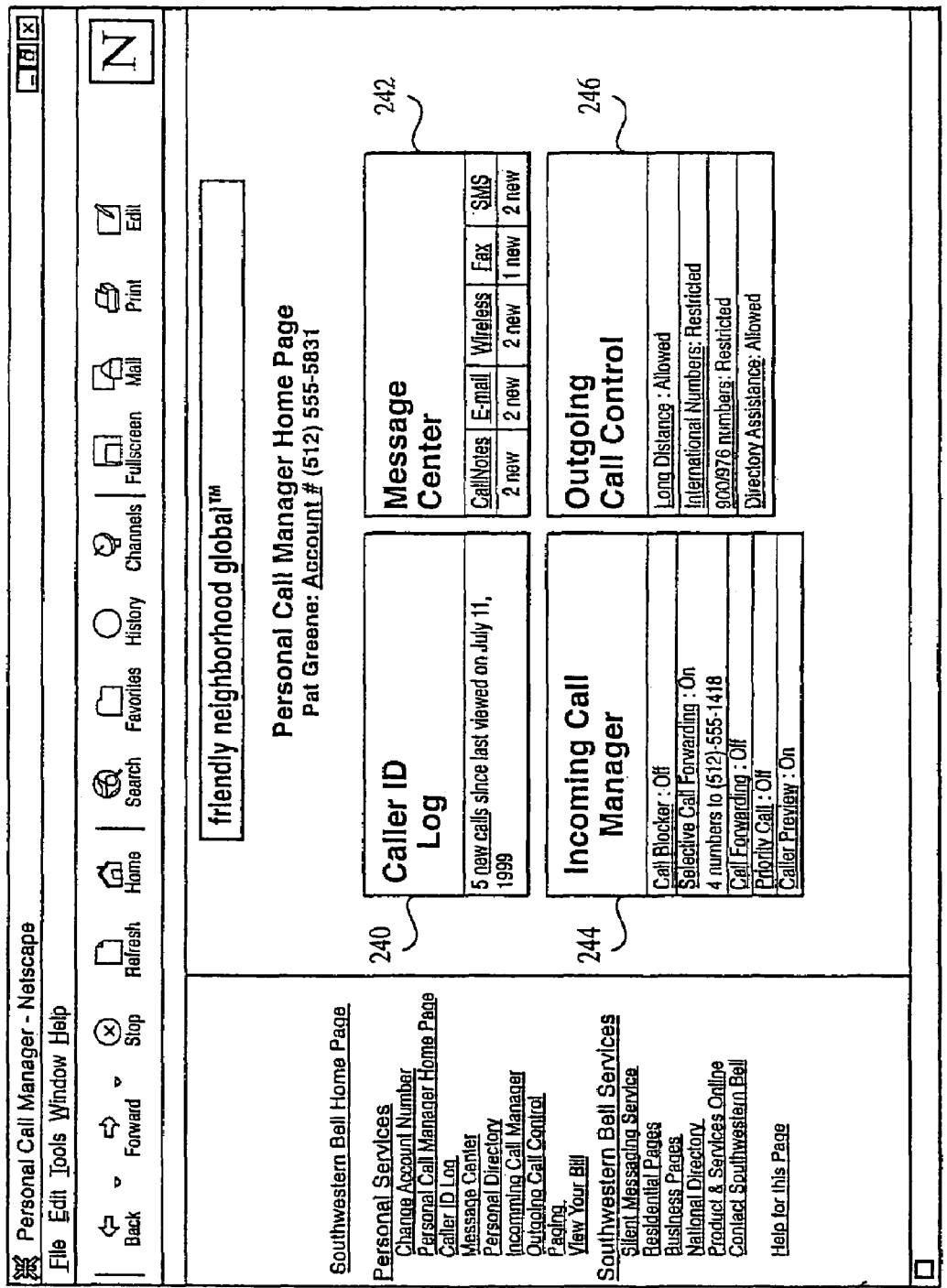
FIG. 24 is an exemplary PCM home page window to be displayed at the user's PC identifying customized user options for a selected account number, according to an aspect of the present invention.

FIG. 24 shows an exemplary PCM summary display, which corresponds to screen 224 of FIG. 22, entitled Personal Call Manager Home Page for account number (512) 555-5831, which is the selected telephone number in the example. FIG. 24 shows four services accessible through the PCM, although the four services are not intended to be limiting. That is, the PCM is able to administer any call services associated with an SCP 23. The services depicted in the PCM summary screen 224, as well as in FIG. 24, are Caller ID Log 240, Message Center 242, Incoming Call Manager (ICM) 244 and Outgoing Call Control (OCC) 246. The displayed information is summary in fashion, the details being available to the user through selection of one of the available services, which displays a PCM service screen 228 of FIG. 22. At the summary screen, the Caller ID Log 240 of FIG. 24 retrieves data from the SCP 23 and shows, for example, the number of call records added since the last review. The Message Center 242 retrieves data from the SCP 23 and shows the number of new call notes, e-mails, wireless calls, faxes and messages reviewed. The ICM 244 of FIG. 24 likewise retrieves data from the SCP 23 and shows the status of the call blocker, call forwarding, priority call and caller preview features. The OCC summary 246 retrieves data from the SCP 23 and shows whether international calls, long distance calls, 900/976 numbers and/or directory assistance calls are restricted.

From the PCM summary screen, the user may choose to use PCM to manage any of the displayed services, indicated at block 205 in FIG. 21. This is done by simply clicking on one of the display boxes 240–246 of FIG. 24 to cause the web server 54 to display a new web page corresponding to the selected service. Or, the PCM summary page includes a list of the personal services 248, which duplicates the display boxes. In addition, the list 248 may include additional personal services that do not require interaction with the SCP 23. These services include, for example, a personal directory, paging capability and billing review.

The paging capability provides the option of paging the subscriber when a caller ID is received from a subscriber specified phone number. Paging may include a page, a wireless short message, an e-mail, or a generated phone call to a specified number. Moreover, caller ID logs can be collected and paged to the subscriber at periodic intervals with summary and/or detailed information.

After selection of one of the services, the web server 54 navigates to and displays the selected services web page, indicated by blocks 206–209, and displays the corresponding service screen 228 of FIG. 22. The user may review information, activate or deactivate the service or change the scope of the service, as desired, in accordance with the level of access available to that user. After accessing one of the available services, the user may return to the PCM summary page at block 210. Returning can be accomplished by selecting a specific option to return or by simply clicking the BACK icon provided by the web browser. The user may also exit PCM at block 213 of FIG. 21, ending the current session at block 230 of FIG. 22.

Intelligent Call Forwarding

An additional embodiment of the present invention will be referred to as Intelligent Call Forwarding. Intelligent Call Forwarding is a call control service that is closely related to Flexible Call Forwarding and provides complementary features. Flexible Call Forwarding is implemented to forward telephone calls to at least one pre-designated number whenever the subscriber anticipates not being available at the subscriber telephone 25, but Flexible Call Forwarding does not provide call processing whenever the caller encounters a busy signal at the subscriber's line. The inability to forward calls is particularly problematic when the subscriber is connected to the Internet via the telephone line to which incoming calls are attempting to connect. Conventionally, the calling party simply receives a busy signal (or is sent to a message mailbox) and the subscriber has no notice of the incoming call.

An embodiment of the invention addresses two related services. One of the services is referred to as Intelligent Call Forwarding, which enables the subscriber connected to the Internet to direct incoming calls to alternative telephone numbers, including numbers that play announcements or accept messages, without interrupting the Internet session. For example, the announcements may include a message informing the calling party that the party they are trying to reach is busy and that the caller should call back later, or a message informing the calling party that the party they are trying to reach is busy and will call them back later. Intelligent Call Forwarding includes several optional features similar to Flexible Call Forwarding that the subscriber may customize. Among these features are a weekly schedule, which allows the subscriber to schedule up to a week in advance activation and deactivation times, as well as associated forwarding phone numbers. Another feature is a priority screening list, in which the subscriber designates priority names and telephone numbers. Related to the priority screening feature is a screening rejection list feature, which terminates an incoming call to the called number or forwards the rejected call to a pre-designated number having an appropriate announcement (switch-based, or otherwise).

As in the case of Flexible Call Forwarding, there are two methods by which subscribers may modify call forwarding service status. First, from any DTMF telephone, the subscriber dials a toll-free number, e.g., an 800 number, to access an IVR. When connected to the IVR, the subscriber is prompted to enter the account number, along with a personal identification number, as discussed above. The subscriber then has the ability to change the PIN, change the forwarding numbers, toggle the service on/off, specify a day and time when the service will be deactivated and activate or deactivate the priority screening list, the rejected call list and the weekly schedule. Second, the subscriber has the option to access the Intelligent Call Forwarding service using a GUI via the Internet. Over the web connection, the subscriber is able to implement all IVR functions, as well as build the screening lists and design weekly schedules. The Intelligent Call Forwarding service, when active, automatically takes effect whenever the subscriber accesses the Internet from a telephone number included in the service.

The other service for responding to busy signals on the subscriber's phone line is Internet Caller ID (ICID). Like Intelligent Call Forwarding, ICID enables the subscriber connected to the Internet via a dial-up connection to contemporaneously receive caller identification information concerning an incoming telephone call, without interrupting the connection with the Internet. The caller information is provided in a pop-up dialog box on the subscriber's display, which includes but is not limited to, a PC monitor. The information displayed to the subscriber includes the name and number of the calling party, if available. In addition, several disposition options are presented to the subscriber which, upon selection, determine handling of the incoming call.

In an embodiment, the disposition options available to the subscriber include accepting the call, forwarding the call to a voice mail system, redirecting the call to another telephone line (e.g., a cellular telephone or a second telephone line), and playing an announcement to the calling party. The announcement played to the calling party is selected by the subscriber and may be either a message informing the calling party that the party they are trying to reach is busy and that the caller should call back later, or a message informing the calling party that the party they are trying to reach is busy and will call them back later. Additionally, the subscriber has the option in all of the service described herein of selecting the language in which the messages plays, e.g., English or Spanish.

FIG. 1 illustrates an exemplary telecommunications network, for implementing the Intelligent Call Forwarding aspects of the invention. As in the case of Flexible Call Forwarding, the subscriber is able to access the Intelligent Call Forwarding service by GUI via the Internet 44 and by telephone via an IVR 45 through a common SMS 48 or through a SN/IP 57.

Figure 25:
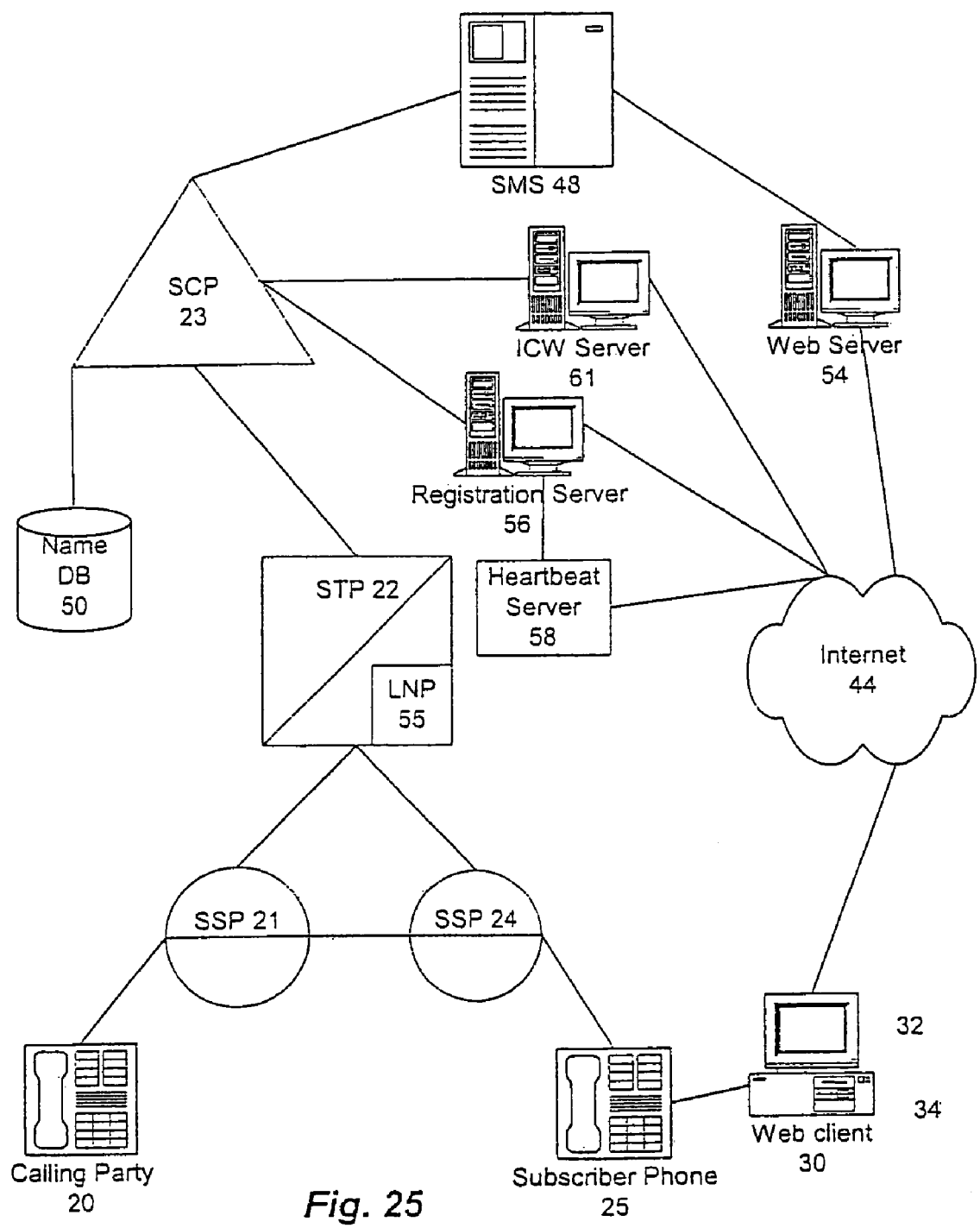
FIG. 25 is a block diagram showing an exemplary Intelligent Call Forwarding and ICID telecommunications network, according to an aspect of the present invention.

FIG. 25 illustrates an exemplary telecommunications network, including Intelligent Call Forwarding and ICID, according to an alternative embodiment of the invention. As in FIG. 1, the network of FIG. 25 includes a calling party 20, an originating SSP 21, a terminating SSP 24, a subscriber telephone 25, an SMS 48, an STP 22 and an SCP 23, examples of which have been previously described. The network also includes a local number portability (LNP) database 55, a registration server (RS) 56, a heartbeat server 58 and an Internet Call Waiting (ICW) server 61. An associated data network of the invention includes a web client 30 and a web server 54, connectable through the Internet 44. The web client 30 includes a PC 32 operating client software 34.

Generally, Intelligent Call Forwarding enables a subscriber to direct incoming calls to alternative telephone numbers, both when the subscriber telephone 25 is busy or not busy. In an embodiment, Intelligent Call Forwarding further includes several optional features that the subscriber customizes. Among these features is a weekly scheduler, which enables the subscriber to construct a weekly schedule of multiple times for activating and deactivating Intelligent Call Forwarding, as well as any features associated with Intelligent Call Forwarding. For example, the scheduler indicates the times at which the priority screening list and screening rejection list are ON/OFF, which times do not necessarily correspond to the Intelligent Call Forwarding service activation. The scheduler also designates the telephone numbers to which calls are to be forwarded corresponding to the various services and their various ON/OFF times. The scheduler is implemented through a tod/dow table, which is stored at the SCP 23 and accessible by the subscriber via the Internet 44.

The priority screening list is available for use at the subscriber's option. The list contains the names and telephone numbers of priority callers, as designated by the subscriber. In an embodiment, if the priority screening list has been activated, the SCP 23 will only process calls originating from phone numbers included in the list. All other calls are terminated at the subscriber telephone 25. The processing includes either sending a message to the subscriber engaged in the Internet session, notifying the subscriber of the priority caller, or forwarding the priority callers to a priority, alternative telephone number, where they hear a voice announcement and are provided the option to leave a message. The priority screening list is implemented through a screening table, which is stored at the SCP 23 and accessible by the subscriber via the Internet, as discussed in detail below.

Similarly, the rejection screening list is available for use at the subscriber's option. This list contains the names and telephone numbers of callers from which the subscriber does not want to accept calls. If a number is on the rejection screening list, and the list is active, then the call is terminated at the subscriber telephone 25, or it is terminated to a directory number specifically reserved to respond to rejection screening list callers. In an embodiment, this alternative number provides a voice announcement and an option for the screened caller to leave a message. As in the case of the priority screening list feature, the rejection screening list is implemented through a rejection screening table, which is stored at the SCP 23 and accessible for update by the subscriber via the Internet 44 and the web server 54.

Figure 26:
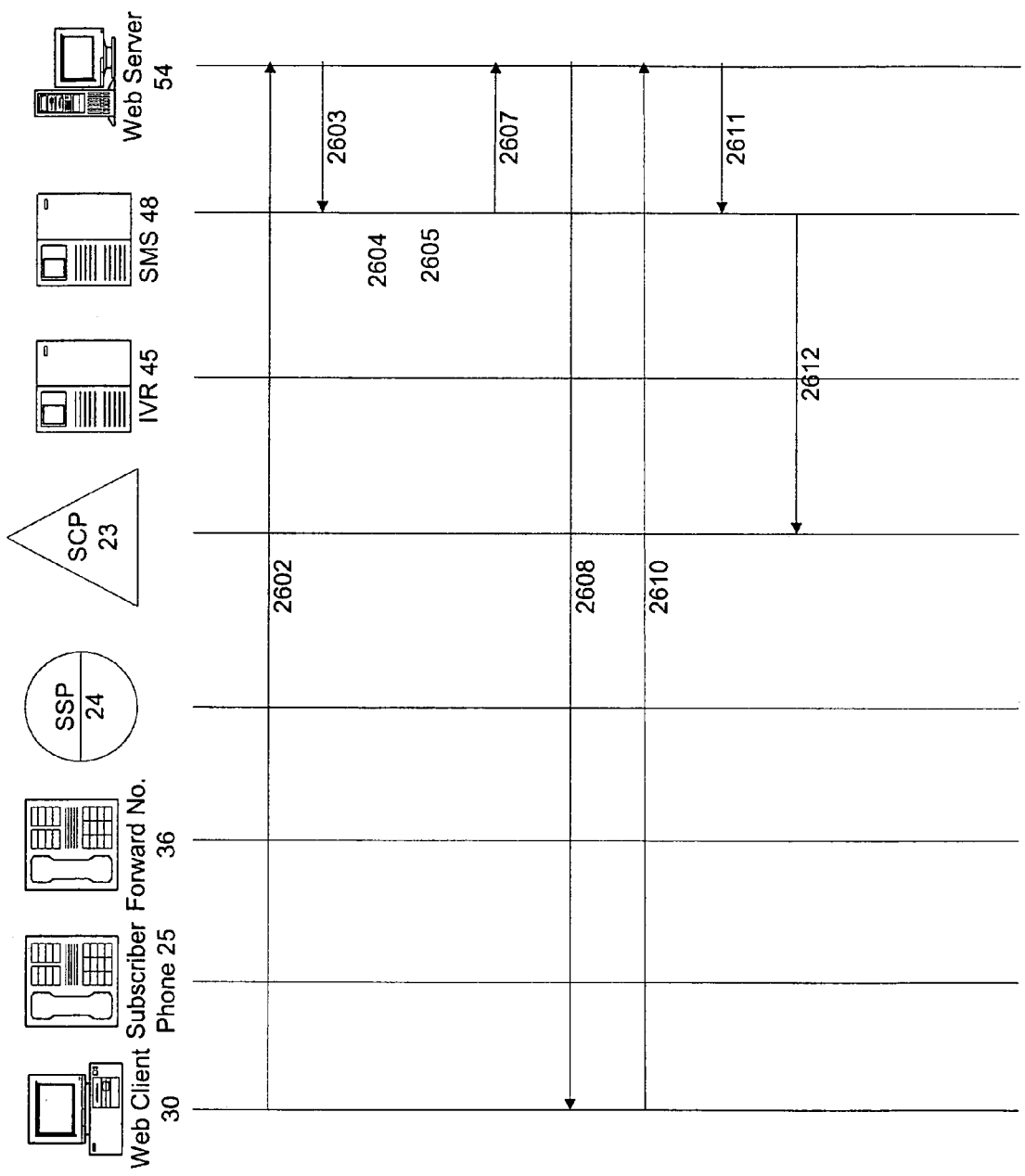
FIG. 26 is an exemplary call flow diagram in which the subscriber accesses the Intelligent Call Forwarding data via the Internet, according to an aspect of the present invention.

A subscriber's exemplary interaction with Intelligent Call Forwarding is depicted in the call flow diagram of FIG. 26. As with the Flexible Call Forwarding service, the subscriber is able to access the Intelligent Call Forwarding service via the Internet 44 or IVR 45, thereby greatly increasing flexibility and convenience. FIG. 26 depicts interaction with Intelligent Call Forwarding over the Internet, using a GUI, which includes the more complicated procedures for customizing the service, such as building the screening lists and weekly schedules. In the Internet interface, the subscriber accesses a unique URL associated with the service provider to obtain the web screens of Intelligent Call Forwarding, provided by the SMS 48. In an embodiment, an alternative manner for accessing the Intelligent Call Forwarding data via the Internet is through the PCM service, described above.

As shown at step 2602 of FIG. 26, in order to access Intelligent Call Forwarding, the subscriber must log-on to the web server 54 from the web client 30 through the Internet 44. This step incorporates use of any compatible web browser, discussed above. Once on the Internet 44, the subscriber connects to the web server 54, which receives HTTP messages from the subscriber web client 30 and provides HTML web pages in response to the subscriber's input. The web pages relate to the subscriber's Intelligent Call Forwarding service.

Once connected to the web server 54, the user must provide authentication information to access the corresponding account, through the web server 54 at step 2603. The SMS 48 performs the authentication. After receiving the account number and associated PIN from the subscriber via the web server 54, the SMS 48 retrieves the authentication data at step 2604 to confirm that the subscriber is an authorized user.

After successful authentication, the SMS 48 retrieves at step 2605 the current service data for Intelligent Call Forwarding, including current screening lists and weekly schedules. The SMS 48 transmits the information, along with a list of additional services and phone numbers, if any, corresponding to the subscriber, to the web server 54 at step 2607. The web server 54 forwards the information to the web client 30 at step 2608, via the Internet 44. The subscriber is presented with a number of options for each telephone number in the account. For example, the subscriber can change the PIN, enter the forwarding directory number, toggle the Intelligent Call Forwarding service ON or OFF, and activate or deactivate the priority screening list, the rejection screening list and the weekly schedule. In addition, the subscriber can build or edit the priority screening lists and weekly schedules. Once the changes have been entered by the subscriber and forwarded to the web server 54 at step 2610, the web server 54 forwards the updated data to the SMS 48 at step 2611. The SMS 48 stores the data and also updates the SCP 23 at step 2612 for implementation.

Figure 27:
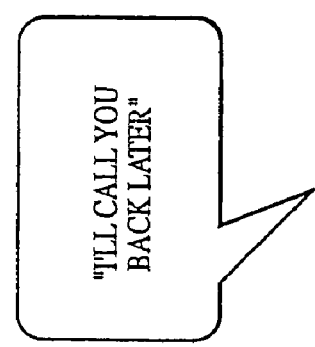
FIG. 27 is an exemplary web page to be displayed at the user's PC showing a rejection screening list for Intelligent Call Forwarding, according to an aspect of the present invention.
Figure 27:
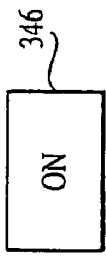
Figure 27:
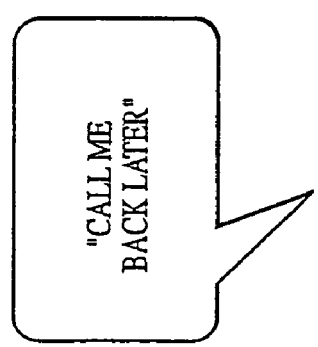
Figure 27:
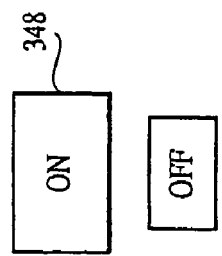

The web pages and associated prompts for input by the subscriber are similar to those shown in FIGS. 3–8 and 14 in reference to Flexible Call Forwarding. In addition, FIG. 27 depicts an exemplary web page related to the rejection screening list (which may also be included in the Flexible Call Forwarding service). The web page is displayed on the monitor of the PC 32 at the web client 30 and includes the subscriber's telephone number 350, which in this example is 847-555-1111. The subscriber may enter the telephone numbers of calls to be accepted and rejected by building the priority and rejection screening lists, respectively. Box 340 of FIG. 27 shows various directory numbers that the subscriber has identified for special treatment. It also contains the ALL calling numbers options, which when selected by the subscriber, causes the Intelligent Call Forwarding service to process all incoming calls to the subscriber's phone number 350 the same.

In this example, the calling numbers on the subscriber's priority screening list are indicated by a single asterisk and calling numbers on the rejection screening list are indicted by double asterisks. In an embodiment of the invention, the calling numbers on the screening lists can be highlighted in different colors, for example, to aid the subscriber in visually distinguishing priority calling number from rejection calling numbers. The subscriber can then select the announcement to be played for each screening list. In this example, announcement 342, i.e., "I'll call you back later," is played in response to calling numbers on the priority screening list and announcement 344, i.e., "Call me back later," is played in response to calling numbers on the rejection screening list. The ON/OFF icons 346 and 348 activate and deactivate the announcements 342 and 344, respectively. As in all embodiments of the invention, the activation and deactivation may be accomplished by the GUI at web client 30 via the Internet or by DTMF touch tones or voice interaction through a telephone in conjunction with the IVR 45 via the PSTN.

Of course, numerous other options are available to the subscriber, such as message playback language. The "S" and "E" indicators show that the message will be played in Spanish and English, respectively. Other languages are of course possible. Moreover, the subscriber may elect to be notified at the web client 30 of calls from numbers on the priority screening list during the Internet session, while calls from numbers on the rejection screening list are not notified to the subscriber. Instead, the rejected calls may hear a busy signal or may be forwarded to a number or prerecorded message reserved for rejected calls. The exemplary web page of FIG. 14 also depicts a typical summary screen of the Intelligent Call Forwarding service.

Figure 28:
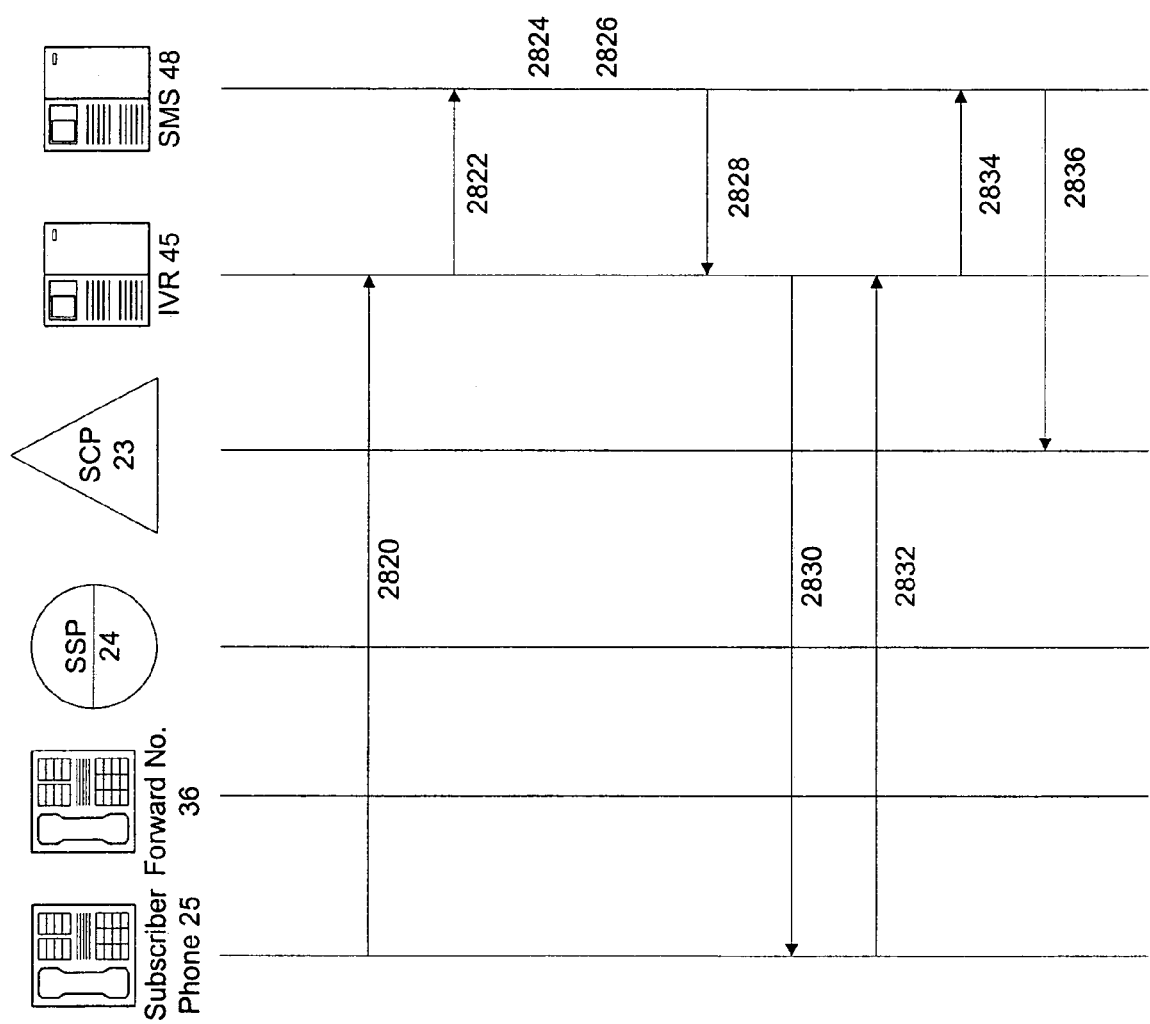
FIG. 28 is an exemplary call flow diagram in which the subscriber accesses Intelligent Call Forwarding data via an IVR, according to an aspect of the present invention.

The subscriber can alternatively interact with Intelligent Call Forwarding using the IVR 45, exemplary steps of which are shown in FIG. 28. Access through the IVR 45 is slightly limited in that the subscriber cannot actually build or edit screening lists and weekly schedules, in an embodiment of the invention. However, the subscriber can access all other features of Intelligent Call Forwarding, including changing the PIN, toggling the service ON or OFF, and activating/deactivating the priority screening list, the rejection screening list and the weekly schedule.

Referring to FIG. 28, the subscriber calls a toll free number from any telephone, which directly accesses the IVR 45 (or the SN/IP 57, if applicable), shown at step 2820. FIG. 28 depicts, as an example, the call originating from the subscriber telephone 25. The IVR 45 receives the call and initiates a request for various authentication information, including the account and PIN number. These numbers coincide with the account and PIN numbers used to access the Flexible Call Forwarding service via the Internet 44. The pre-programmed voice announcements for this aspect of the invention reside in the IVR 45, and implementation of the voice announcements is well known. The authentication information is provided using touch tones from the key pad of the subscriber telephone 25 or, when speech recognition functionality is available, speaking to the receiver of the subscriber telephone 25. The IVR 45 forwards the information to the SMS 48 at step 2822, which in turn verifies the authorization at step 2824.

After verification, the system operates in much the same way as described above with respect to a GUI and the Internet. Specifically, the SMS 48 retrieves account information, including the status of Intelligent Call Forwarding service, at step 2826. At step 2828, the SMS 48 provides the account information to the IVR 45, which verbally recites a menu of options to the subscriber at step 2830 based on the information received from the SMS 48. For example, if the subscriber had previously built a priority screening list, activation of this list would be included among the options provided to the user over the telephone. The subscriber listens to the options and inputs various choices at step 2832 by depressing the touch tone keys or speaking into the telephone receiver. The choices may include, for example, turning on Intelligent Call Forwarding or selecting and activating a predefined priority screening list, rejection screening list or weekly schedule. The subscriber can also set the automatic-off function date and time.

The commands are forwarded from the IVR 45 to the SMS 48 at step 2834. The SMS 48 then updates the Intelligent Call Forwarding data contained in the SCP 23 at step 2836. Once the data is stored at the SCP 23, the Intelligent Call Forwarding service is set with respect to incoming calls, in accordance with the customizing instructions from the subscriber.

Once Intelligent Call Forwarding is customized and activated, it is implemented in much the same way as ICID, as described below. In an embodiment of the invention, a TAT is assigned to the subscriber's directory number or line, depending upon the type of switch. Once the trigger has been assigned and activated, every terminating call to the subscriber telephone 25 will cause the terminating SSP 24 to suspend the call and send an AIN query message, via the existing SS7 network and the appropriate STP 22, to the subscriber's serving SCP 23 for instructions. The SCP 23 stores a call processing record for each subscriber and requests information from the other network elements. In particular, the SCP 23 receives the TAT query from the SSP 24 and responds to the SSP 24 with routing instructions for calls to subscribers.

In one embodiment, as depicted in FIG. 25, the RS 56 receives registration requests from the client software 34 when the subscriber logs on to the Internet 44 and activates the service. The RS 56 stores information related to the subscriber's on-line Internet status. The RS 56 is the first database accessed by the SCP 23 during the processing of an Intelligent Call Forwarding or an ICID call. Based upon the information provided in a GetData query, the RS 56 returns a response containing information associated with requested data elements to the SCP 23. For example, the RS 56 responds to the GetData query from the SCP 23 with information about the subscriber's Internet session status. Alternatively, the SCP 23 itself can determine the subscriber's on-line Internet status.

A GetData query, sent via TCP/IP, includes an identifier, a service key, and a data element. The identifier indicates that the query is a GetData query, the service key contains an indication of the subscriber for which information is requested and, optionally, security information. The data element is the calling party's name being retrieved.

Additionally, the SCP 23 uses the name database 50 to retrieve calling party name information associated with the calling party's telephone number for transmission to the subscriber. The interface between the name database 50 and the SCP 23 may be the Bellcore GetData query provided over the SS7 network. With this interface, the SCP 23 can receive data from the name database 50. To support the GetData query, the SCP 23 accesses the name database 50 with the directory number of the calling party in order to obtain the calling party name. Detailed information about the GetData interface may be obtained in Bellcore GR-2838-CORE, Generic Requirements for GetData, the disclosure of which is expressly incorporated by reference herein in its entirety. Alternatively, depending on the capabilities of the SCP 23, the calling party name can be stored and retrieved at the SCP 23 without an external database.

If it is determined that the subscriber is on-line, the SCP 23 queries the LNP database 55, in a known manner, to determine if the calling party number received in the TAT query has been ported. The telephone number received in a response from the LNP database 55 is used to determine the calling party name, when it is available.

In this embodiment of the invention, the ICW server 61 is the communications interface between the SCP 23 and the client software 34 at the web client 30. Specifically, the ICW server 61 receives information related to incoming calls from the SCP 23 and passes this information directly to the subscriber via TCP/IP utilizing the Internet 44. Further, the ICW server 61 passes de-registration requests from the client software 34 to a heartbeat server 58.

Additionally, the SCP 23 provides the ICW server 61 with the client software version number running on the subscriber's PC 32. Subsequently, the ICW server 61 determines if the subscriber has the latest version of the client software. If the ICW server 61 determines that the subscriber does not have the latest version of the client software, it notifies the subscriber that they need to update their client software. This notification is given when the ICW server 61 passes the caller identification information to the subscriber.

During the course of an active Internet session with the Intelligent Call Forwarding or the ICID service turned on, the client software 34 periodically transmits heartbeat messages via the Internet 44 utilizing TCP/IP to the heartbeat server 58, in one embodiment of the invention. In response, the heartbeat server 58 updates the RS 56 via TCP/IP with the subscriber's on-line status, and notifies the RS 56 in situations where there is an interruption of heartbeat messages from the client software 34, indicating a possible undesired disconnection of the Internet session. Additionally, if the subscriber currently connected to the Internet 44 elects to accept an incoming telephone call (as will be discussed later), the client software 34 sends a de-registration request, which is passed to the heartbeat server 58.

After the RS 56 receives a registration request from the client software 34, the RS 56 sends a heartbeat setup message to the heartbeat server 58 via TCP/IP to alert it to expect to receive heartbeat messages from the client. As a result, the heartbeat server 58 begins to receive keep-alive messages from the client after the registration is completed. If the client sends a keep-alive message that does not match the information in the heartbeat server 58 memory, then the heartbeat server 58 sends a registration database query to the RS 56 via TCP/IP. If the query results match the data received, the copy in memory is updated. If the results of the query do not match, the heartbeat server 58 opens a TCP/IP session to send a message instructing the client to re-register with the RS 56.

The interface between the SCP 23 and the RS 56 and between the SCP 23 and the ICW server 61 is, for example, the Bellcore GDI for TCP/IP. This interface provides the capability to send/receive transactions to and from external systems over TCP/IP using Transaction Capabilities Application Part (TCAP) messages. The SCP 23 can get data, send data, or invoke an application (InvokeApp) from a database such as the RS 56 or ICW server 61. More information may be obtained from Bellcore SR-3389, SCP Generic Data, Interface Specification for TCP/IP, Version 5.0, Issue 2, January 1997, the disclosure of which is expressly incorporated by reference herein in its entirety.

The client software 34 is the subscriber interface for the Intelligent Call Forwarding and the ICID services. As discussed above, the client software 34 permits the subscriber to turn the services ON and OFF, choose preset options, and select call disposition options. An InvokeApp message is used to invoke the applications on the ICW server 61 and to return the subscriber's selected disposition options. Additionally, the client software 34 provides a visual and audible alert to the subscriber of an incoming telephone call, sends Internet registration and de-registration requests, sends the subscriber's option selection to the ICW server 61, and sends heartbeat messages to the heartbeat server 58. An InvokeApp message, sent via TCP/IP, may include standard AIN parameters, well known in the art.

Figure 29:
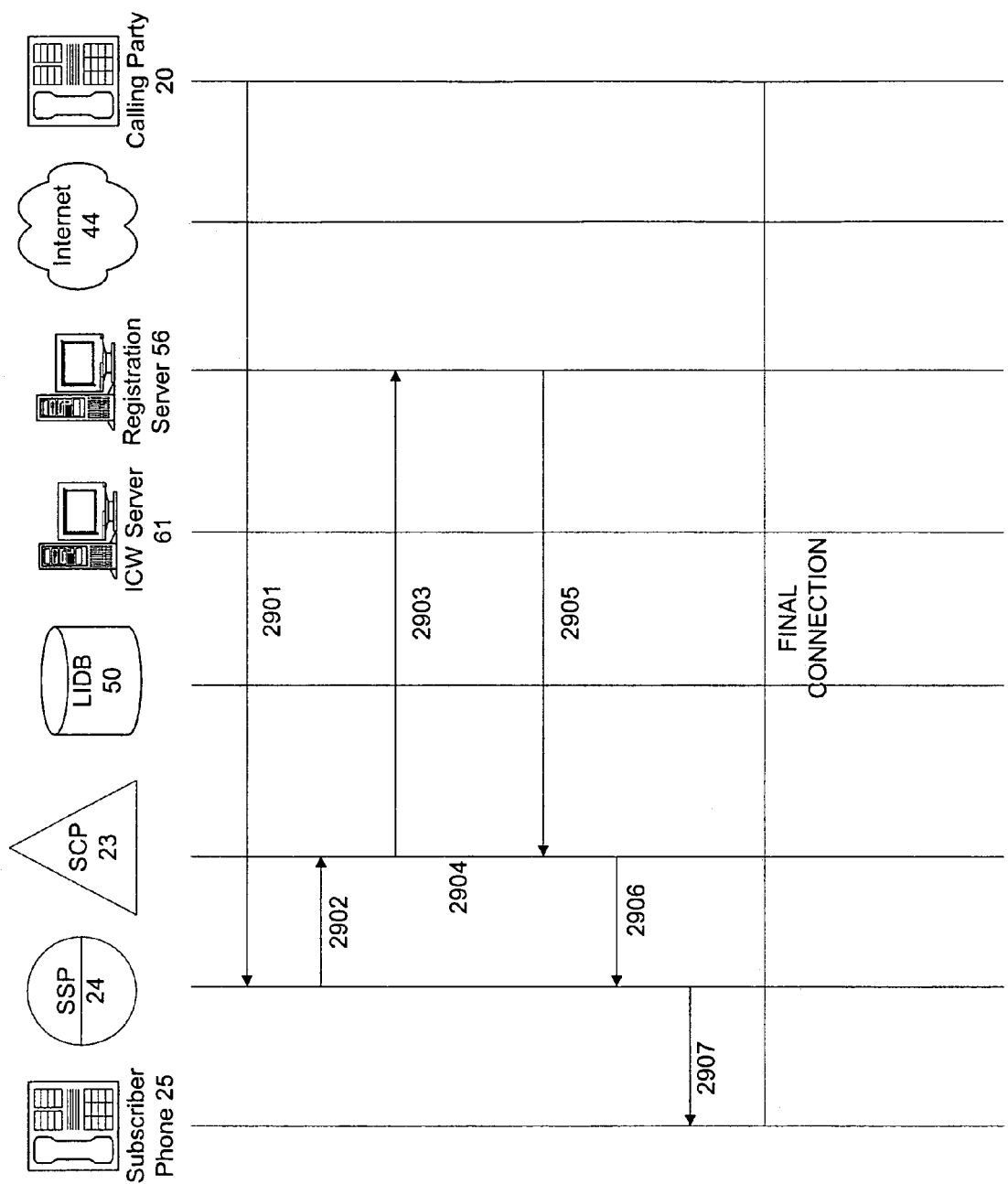
FIG. 29 is an exemplary call flow diagram in which Intelligent Call Forwarding and ICID have been deactivated, or when no active Internet session exists, according to an aspect of the present invention.

The exemplary telecommunications network depicted in FIG. 25 handles incoming calls according to various options invoked by the subscriber, as depicted in exemplary call flow diagrams of FIGS. 29–36. FIG. 29 is a call flow diagram in which neither the Intelligent Call Forwarding nor the ICID service has been turned on, or in which no active Internet session exists, although in an embodiment, the Intelligent Call Forwarding service can be active even when there is no active Internet session. At step 2901, a telephone call is placed to the subscriber. A TAT in the terminating SSP 24 causes the call to be suspended at the SSP 24. The trigger also causes the SSP 24 to transmit an AIN query message including the calling party number (if available) and called party number via the SS7 network and the appropriate STP 22 to the subscriber's serving SCP 23 at step 2902. At step 2903, the SCP 23 sends a GetData query to the RS 56 with the called party's telephone number to request the on-line status of the subscriber. At step 2904, the SCP 23 sets a timer equal to a predetermined time, e.g., 2 seconds. In the event that the RS 56 does not respond within the predetermined time (indicating a timeout condition) or responds with an error, the SCP 23 sends an authorize termination response to the SSP 24. As a result, the SSP 24 terminates the suspended telephone call at the subscriber's line and the call may encounter features programmed on the line, e.g., call waiting.

If it is determined at the RS 56 that the subscriber is not currently on-line or has the services turned off, the RS 56 responds with a "0" at step 2905. The SCP 23 then sends an authorize termination response to the SSP 24 at step 2906, which terminates the call to the subscriber's telephone line at step 2907. As a result, a connection is made between the calling party and the subscriber. As the call attempts to terminate, it encounters any features programmed on the subscriber's telephone line, e.g., call waiting.

Figure 30:
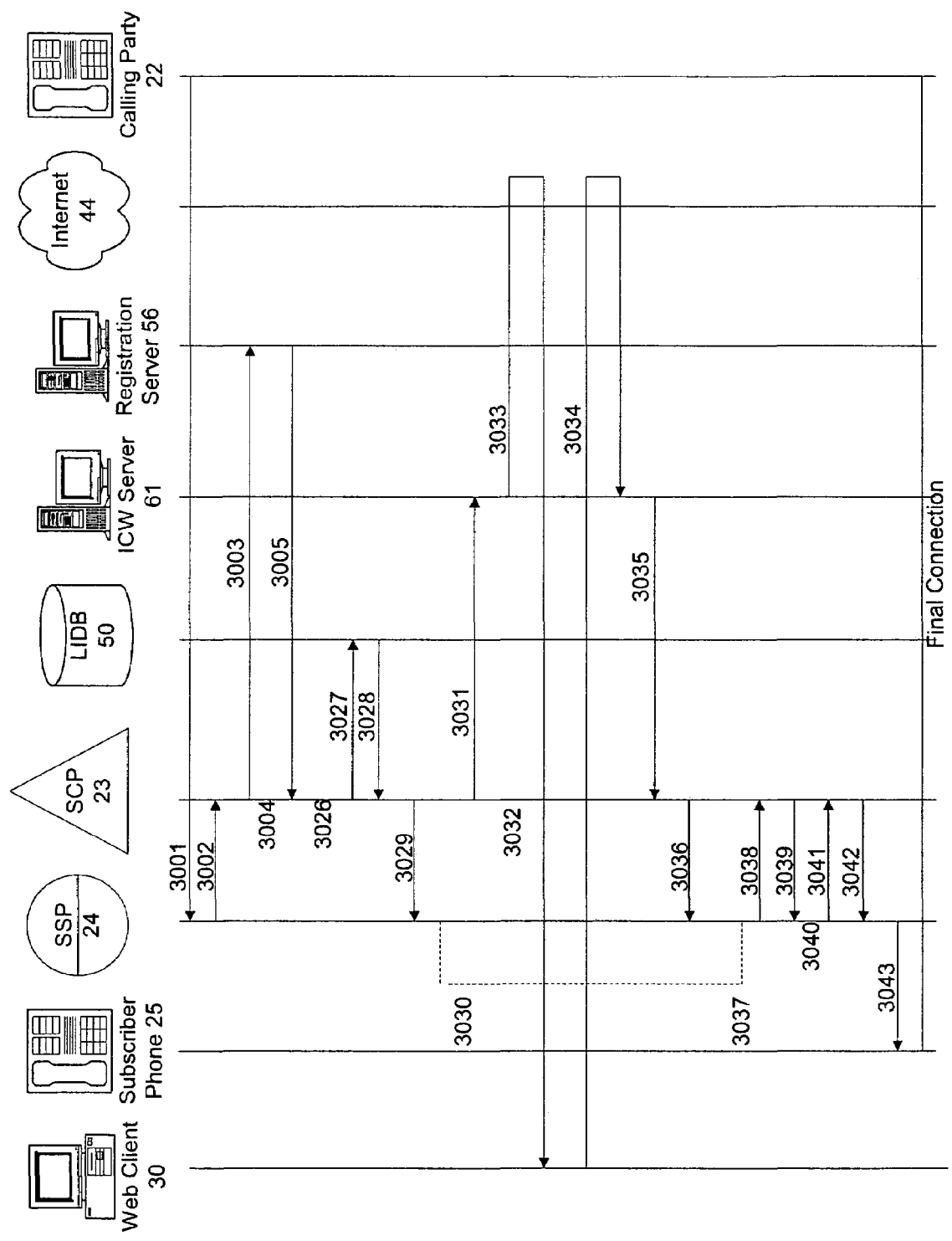
FIG. 30 is an exemplary call flow diagram in which the subscriber elects to accept the incoming telephone call, according to an aspect of the present invention.

FIG. 30 is a call flow diagram in which the subscriber elects to accept the incoming telephone call. The telephone call is placed by the calling party 20 at steps 3001–3004, and handled as previously described according to steps 2901–2904. If the subscriber is on-line and the Intelligent Call Forwarding or the ICID service is active, the RS 56 responds with a "1" at step 3005. The RS 56 also responds with the IP address, port number and subscriber key information for the subscriber's Internet session.

At step 3026, a check is performed at the SCP 23 to confirm that the subscriber has voice mail service. Also, the SCP 23 determines whether the presentation restriction value is restricted or unavailable. If the presentation restriction value is restricted and the called party subscribes to the Anonymous Call Rejection (ACR) service, an authorize termination response is sent to the SSP 24 allowing the call to be rejected. ACR prevents calls to subscribers when a calling party blocks their number.

If the calling party number is delivered with the query and the presentation restriction indicator for the incoming call is allowed, the SCP 23 launches a query to the local number portability database 55 to determine whether the received calling party number is ported. The telephone number returned in the response is either equal to the calling party number sent in the query if the telephone number is not ported or the local routing number if the telephone number is ported. The telephone number from the response is used as the calling party number and checked against entries in a table to determine if the NPA-NXX belongs to a participating local exchange carrier (LEC). A participating LEC is one that provides data from its LIDB, or allows access to its LIDB.

If the calling party number is found to be a participating LEC, a GetData query is launched to the name database 50 at step 3027 to retrieve the calling party's name. If the calling party number was not delivered with the query, or there is no participating LEC, or the presentation restriction indicator for the incoming call is anonymous or unavailable, the SCP 23 will not launch a GetData query to the name database 50 to retrieve the calling party's name. In this event, the calling party name is null in the InvokeApp query to the ICW server 61. If available, the calling party's name is sent to the SCP 23 from the name database 50 at step 3028.

At step 3029, the SCP 23 instructs the SSP 24 to play a "please hold" announcement to the calling party to request the calling party to hold the line (step 3030). At step 3031, the SCP 23 sends an InvokeApp request to the ICW server 61. The request contains the called party number, the calling party number (if available and not presentation restricted), the calling party name (if available and not presentation restricted), an associated IP address, the port number, the client software version, and an indicator as to whether or not the subscriber has voice mail service.

At step 3032, the SCP 23 sets a timer equal to a predetermined time, e.g., 25 seconds. In the event that the ICW server 61 does not respond within the predetermined time (indicating a timeout condition) or responds with an error, the SCP 23 instructs the SSP 24 to stop playing the "please hold" announcement to the caller. Then, the SSP 24 begins playing an announcement to the caller or forwarding the call in accordance with the Intelligent Call Forwarding instructions. When voice mail is available, the message informs the caller that the call is being forwarded to a voice mail service. Lastly, the SCP 23 sends an authorize termination response to the SSP 24. If the subscriber does not have voice mail service, an error is reported and the SCP 23 sends an authorize termination response to the SSP 23. As a result, the SSP 23 terminates the suspended telephone call to the subscriber's telephone line and the call encounters any other features programmed on the line.

If no timeout occurs, at step 3033 the ICW server 61 sends a message via the Internet 44 to the subscriber, which appears on the subscriber's display at web client 30, informing the subscriber of the incoming call and presenting the subscriber with disposition options for the call. The message displayed may be a pop-up dialog box.

At step 3034, the subscriber elects to accept the telephone call, and as a result, the client software 34 responds to the ICW server 61 with option 1 and will send a de-registration message to the RS 56, and begin to terminate the subscriber's Internet session. The ICW server 61 passes the subscriber's option 1 selection to the SCP 23 at step 3035. At step 3036, the SCP 23 instructs the SSP 24 to stop playing the "please hold" announcement to the caller. At step 3037, the "please hold" announcement is terminated by the SSP 24 and at step 3038, the SSP 24 sends a resource clear message to the SCP 23 confirming that the message is no longer playing. At step 3039, the SCP 23 instructs the SSP 24 to begin playing a "will take your call" announcement to the caller (step 3040). At step 3041, the SSP 24 sends a resource clear message to the SCP 23. At the conclusion of the "will take your call" announcement, the SCP 23 sends an authorize termination response to the SSP 24 which terminates the suspended call to the subscriber's telephone line (steps 3042–3043). That is, the calling party 20 is connected to the subscriber telephone 25.

Figure 31:
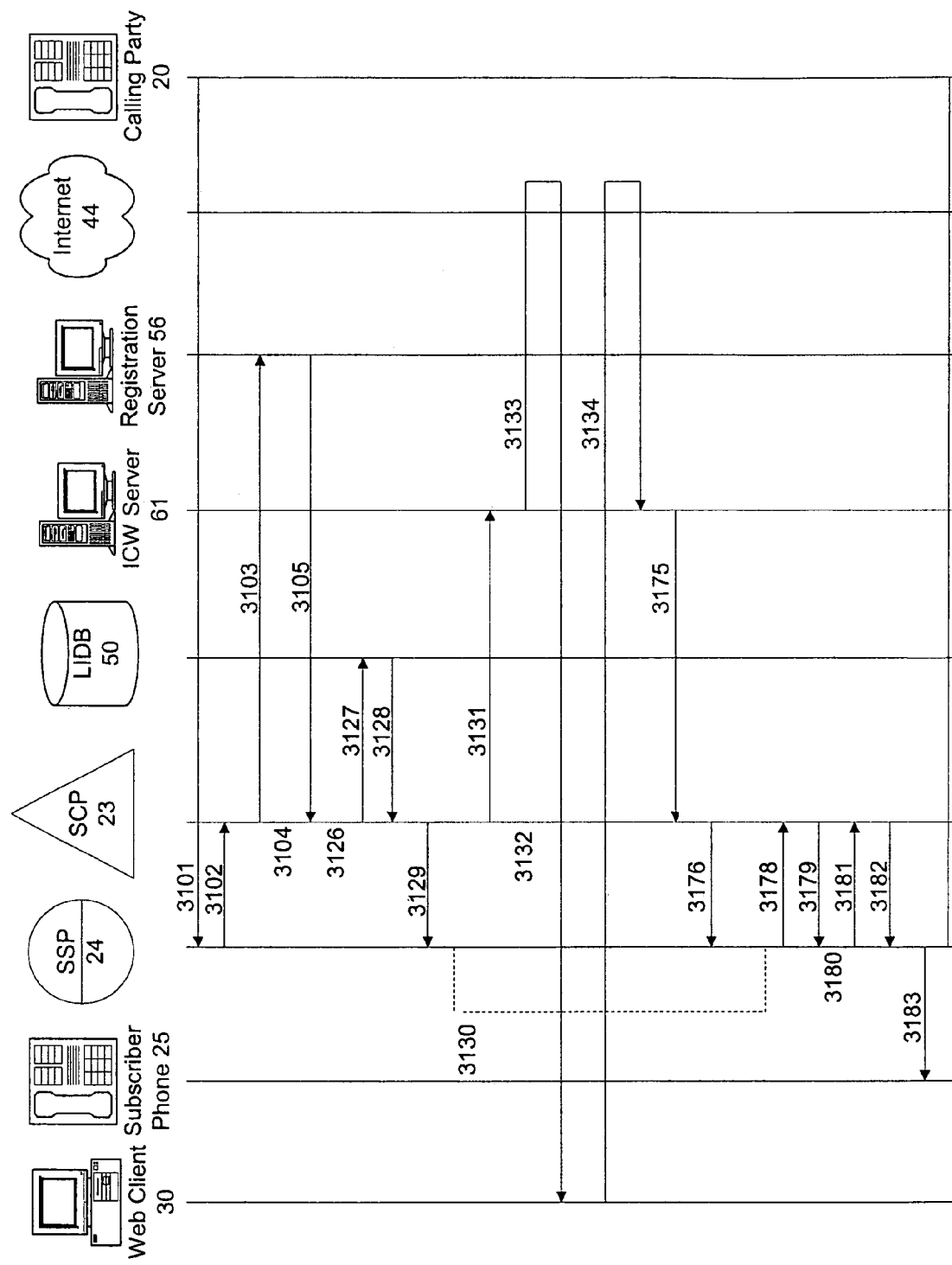
FIG. 31 is an exemplary call flow diagram in which the subscriber elects to forward the incoming telephone call to voice mail, according to an aspect of the present invention.

FIG. 31 is a call flow diagram in which the subscriber is on-line and elects to forward an incoming telephone call to voice mail service. The telephone call placed to the subscriber is processed at steps 3101–3133 in the same manner indicated by steps 3001–3033, discussed above. In response to the query from the ICW server 61 (at step 3133), the subscriber elects option 2 at step 3174 to send the incoming telephone call to voice mail service. As a result, the client software 34 responds to the ICW server 61 and will not terminate the subscriber's Internet session.

The ICW server 61 passes the subscriber's option 2 selection to the SCP 23 at step 3175. At step 3176, the SCP 23 instructs the SSP 24 to stop playing the "please hold" announcement to the caller. At step 3177, the "please hold" announcement is terminated by the SSP 24 and at step 3178, the SSP 24 sends a resource clear message to the SCP 23 confirming that the message is no longer playing. At step 3179, the SCP 23 instructs the SSP 24 to begin playing a "forwarding to voice mail service" announcement to the caller (step 3180). At step 3181, the SSP 24 sends a resource clear message to the SCP 23.

At the conclusion of the "forwarding to voice mail service" announcement, the SCP 23 sends an authorize termination response to the SSP 24 which terminates the suspended call to the subscriber's busy telephone line (steps 3182–3183). As the call attempts to terminate at the subscriber's line, the call encounters programming associated with voice mail service and the call is forwarded accordingly. Ultimately, the calling party is connected with the subscriber's voice mail box and has the option of leaving a message.

Figure 32:
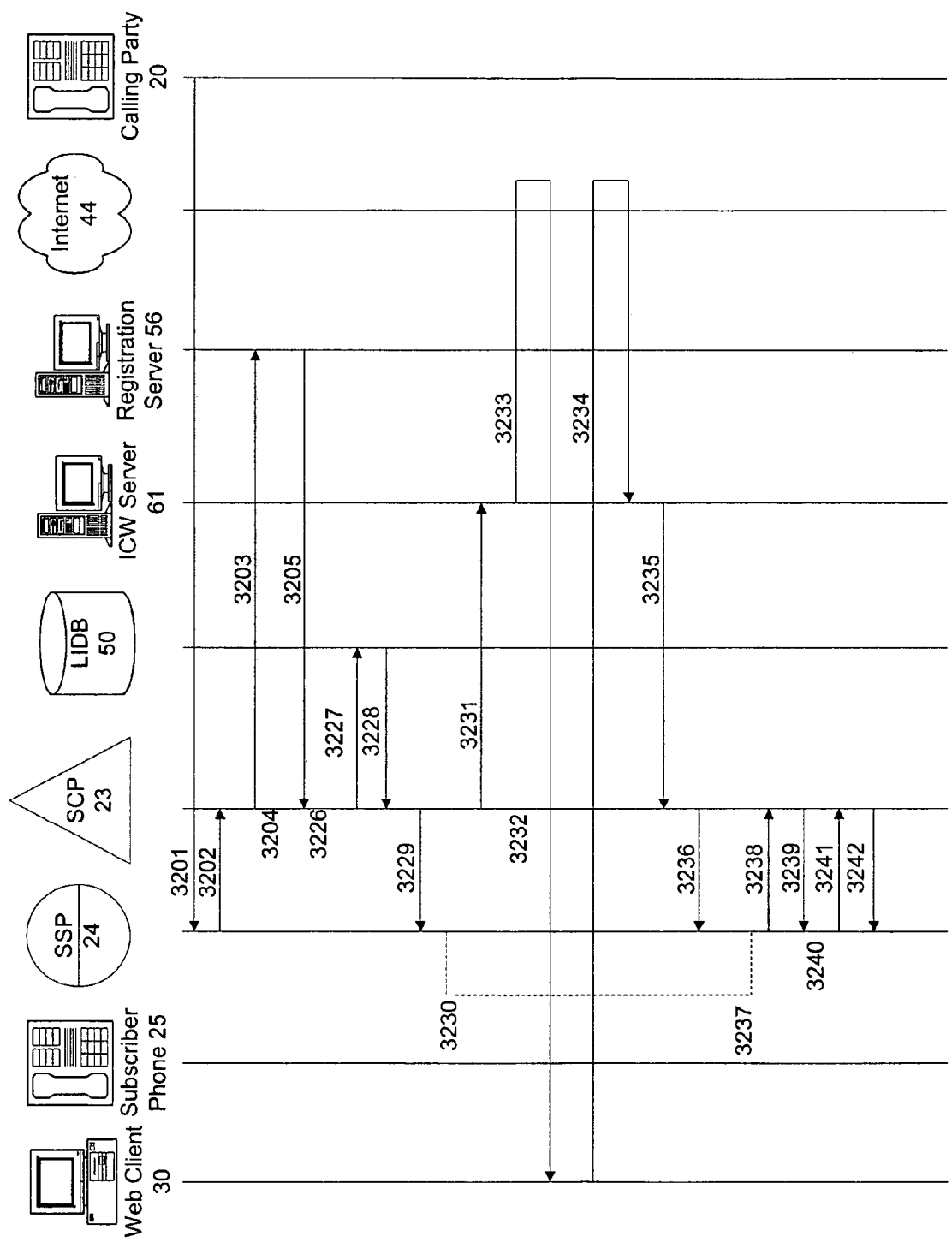
FIG. 32 is an exemplary call flow diagram in which the subscriber elects to play an announcement to the caller, according to an aspect of the present invention.

FIG. 32 is a call flow diagram in which the subscriber is on-line and elects to send an incoming telephone call to an announcement. The telephone call placed to the subscriber is processed at steps 3201–3233 in the same manner indicated by steps 3001–3033, discussed above. In response to the query from the ICW server 61, the subscriber elects to send the telephone call to an announcement at step 3234. As a result, the client software 34 responds to the ICW server 61 with the announcement selection number, which includes two choices. The first message that may be played advises the caller that the subscriber is busy and that the caller should call back later. The second option advises the caller that the subscriber is busy and that the subscriber will return the call to the caller at a later time.

The ICW server 61 passes the subscriber's selection to the SCP 23 at step 3235. At step 3236, the SCP 23 instructs the SSP 24 to stop playing the "please hold" announcement to the caller. At step 3237, the "please hold" announcement is terminated by the SSP 24 and at step 3238, the SSP 24 sends a resource clear message to the SCP 23 confirming that the message is no longer playing. At step 3239, the SCP 23 instructs the SSP 24 to begin playing the selected announcement (step 3240). At step 3241, the SSP 24 sends a resource clear message to the SCP 23. At the conclusion of the selected announcement, the SCP 23 instructs the SSP 24 to disconnect the call at step 3242.

Figure 33:
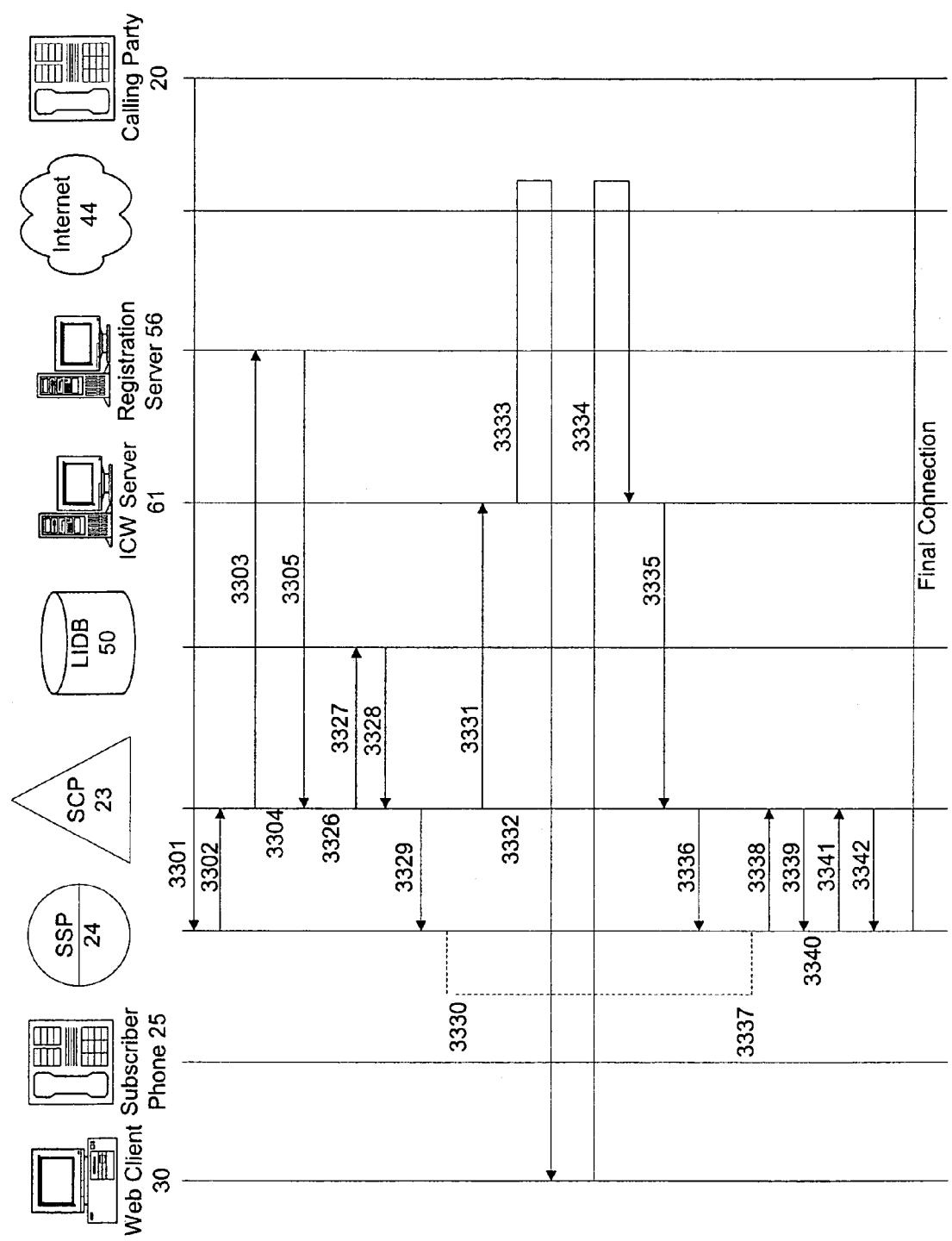
FIG. 33 is an exemplary call flow diagram in which the subscriber elects to redirect the incoming telephone call to an alternate telephone number, according to an aspect of the present invention.

FIG. 33 is a call flow diagram in which the subscriber is on-line and elects to forward an incoming telephone call to another telephone line. The telephone call placed to the subscriber is processed at steps 3301–3333 in the same manner indicated by steps 3001–3033, discussed above. In response to the query from the ICW server 61, the subscriber elects option 3 to redirect the call to another telephone number at step 3334. As a result, the client software 34 responds to the ICW server 61 with option 3 and a ten digit "forward to" telephone number as selected by the subscriber. The ICW server 61 passes the subscriber's option 3 selection and the selected ten digit "forward to" telephone number to the SCP 23 at step 3335.

At step 3336, the SCP 23 instructs the SSP 24 to stop playing the "please hold" announcement to the caller. At step 3337, the "please hold" announcement is terminated by the SSP 24 and at step 3338 the SSP 24 sends a resource clear message to the SCP 23 confirming that the message is no longer playing. At step 3339, the SCP 23 instructs the SSP 24 to begin playing a "forwarding to another number" announcement to the caller (step 3340). At step 3341, the SSP 24 sends a resource clear message to the SCP 23. At the conclusion of the "forwarding to another number" announcement, the SCP 23 sends a Forward Call response to the SSP 24 which initiates the process of forwarding the call to the specified telephone number (step 3342). Ultimately, the calling party is connected to the forwarded number through the SSP 24.

In FIGS. 31–33, if the subscriber does not respond to the query from ICW server 61, or if the RS 56 indicates that the subscriber is no longer on-line, the SCP 23 processes the incoming call in accordance with the subscriber's previously built and stored call forwarding data. In one embodiment of the invention, the subscriber can specifically choose to instruct the SCP 23 to process the call in accordance with previously built and stored call forwarding data, in response to the query from ICW server 61. Processing calls in accordance with previously built and stored call forwarding data is discussed in detail in regard to FIGS. 37–39, below.

Figure 34:
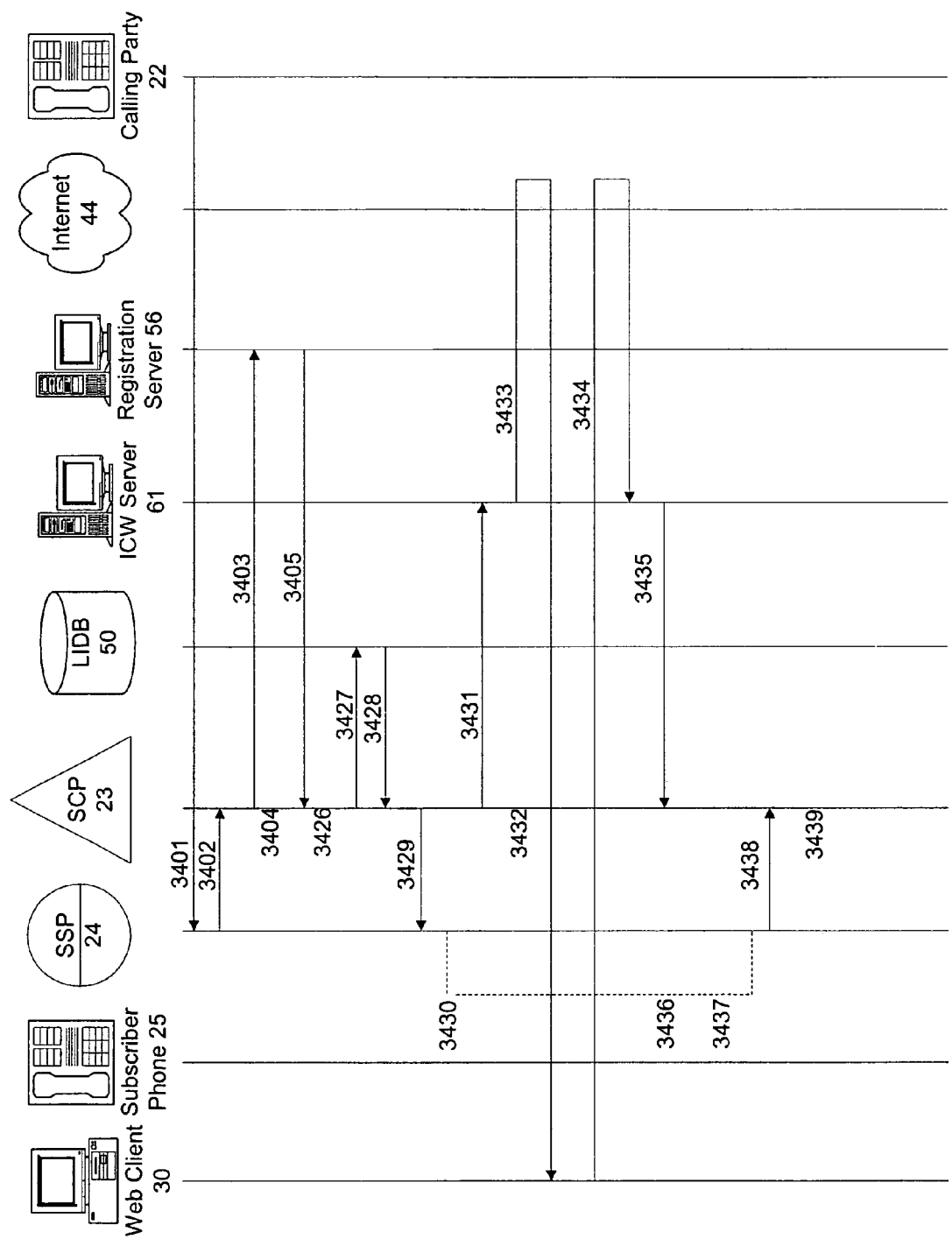
FIG. 34 is an exemplary call flow diagram in which the calling party abandons the telephone call to the subscriber after a response from the web server, according to an aspect of the present invention.

FIG. 34 is a call flow diagram in which the caller abandons a telephone call after a response from the ICW server 61. The telephone call placed to the subscriber is processed at steps 3401–3433 in the same manner indicated by steps 3001–3033, discussed above. In response to the query from the ICW server 61, the subscriber elects a call disposition option described herein in order to control the incoming telephone call. As a result, the client software 34 responds to the ICW server 61 with the option at step 3434. The ICW server 61 passes the subscriber's option selection to the SCP 23 at step 3435.

At step 3436, the caller abandons the telephone call by hanging up, in which case the SSP 24 stops playing the "please hold" announcement to the caller at step 3437 and at step 3438, the SSP 24 sends resource clear message to the SCP 23 due the abandonment of the telephone call by the caller. At step 3439, the SCP 23 terminates call processing record (CPR) processing.

Figure 35:
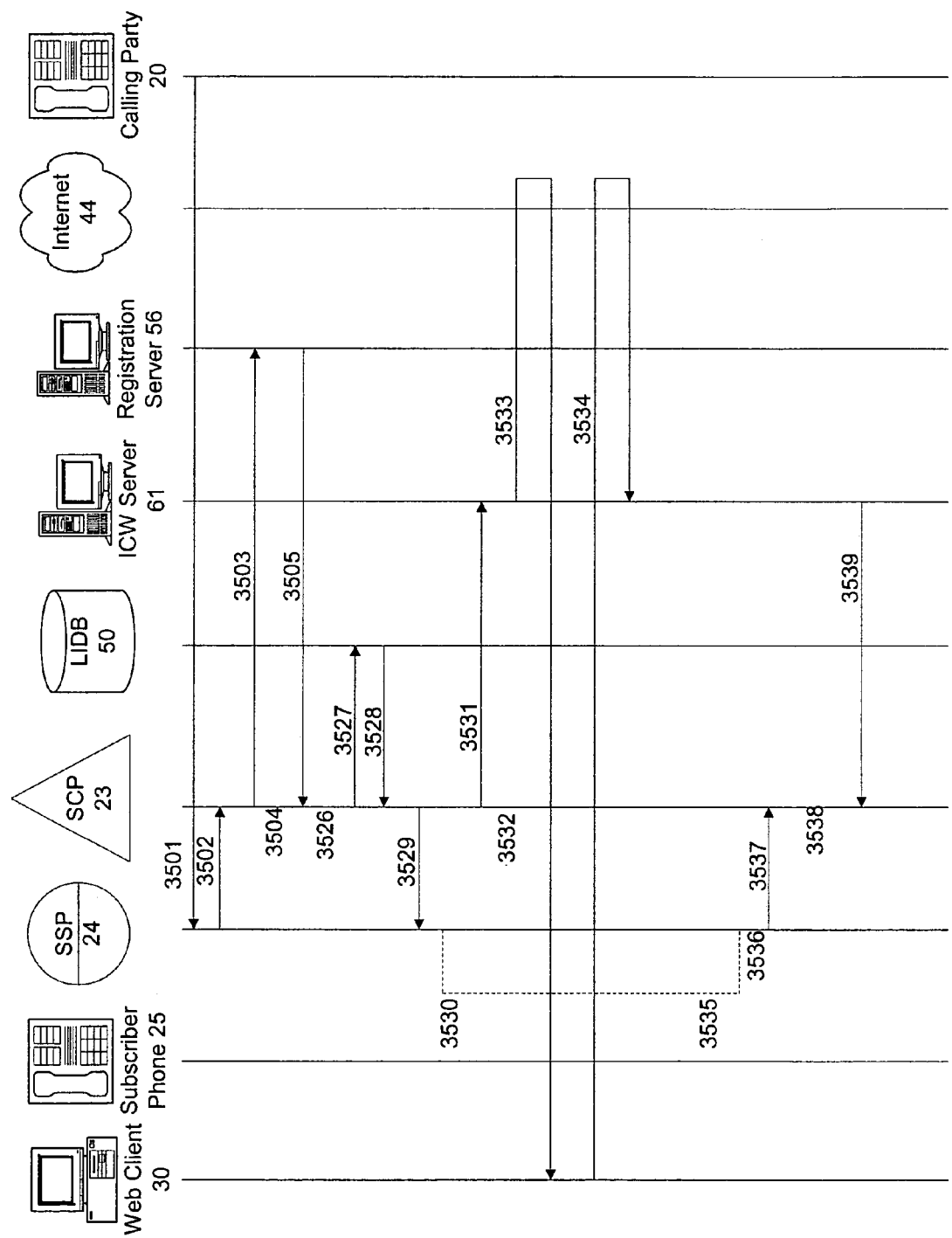
FIG. 35 is an exemplary call flow diagram in which the calling party abandons the telephone call to the subscriber before a response from the web server, according to an aspect of the present invention.

FIG. 35 is a call flow diagram in which the caller abandons the telephone call before a response from the ICW server 61 is received. The telephone call placed to the subscriber is processed at steps 3501–3533 in the same manner indicated by steps 3001–3033, discussed above. In response to the query from the ICW server 61, the subscriber elects a call disposition option to control the call at step 3534. As a result, the client software 34 responds to the ICW server 61 with the selected option. At step 3535, the caller abandons the telephone call by hanging up, in which case the SSP 24 stops playing the "please hold" announcement to the caller at step 3536 and at step 3537, the SSP 20 sends a resource clear message to the SCP 23 due the abandonment of the telephone call by the caller. At step 3538, the SCP 23 terminates CPR processing, ignoring any responses from the ICW server 61 related to this disconnected call at step 3539.

In an alternative embodiment of the invention, as depicted in FIG. 1, a service node (e.g., the SN/IP 57) essentially replaces the combination of the ICW server 61, the RS 56 and the heartbeat server 58. In particular, whenever the subscriber connects to the Internet 44, the SN/IP 57 is automatically notified of the on-line status. The SN/IP 57 contemporaneously forwards the subscriber's on-line status to the SCP 23, regardless of whether a call to the subscriber's number is being processed. The SCP 23 stores the on-line status data in conjunction with the other data related to the subscriber. The data is stored as a YES indication in the subscriber Internet provider (SIP) field. Likewise, when the subscriber exits the Internet session, the SN/IP 57 is notified that the subscriber is no longer on-line. The SN/IP 57 likewise transmits this information to the SCP 23, which changes the SIP indication to NO. Therefore, when a telephone call to the subscriber telephone 25 is processed according to the embodiment depicted in FIG. 1, the SCP 23 determines the on-line status without having to query an external server.

Figure 36:
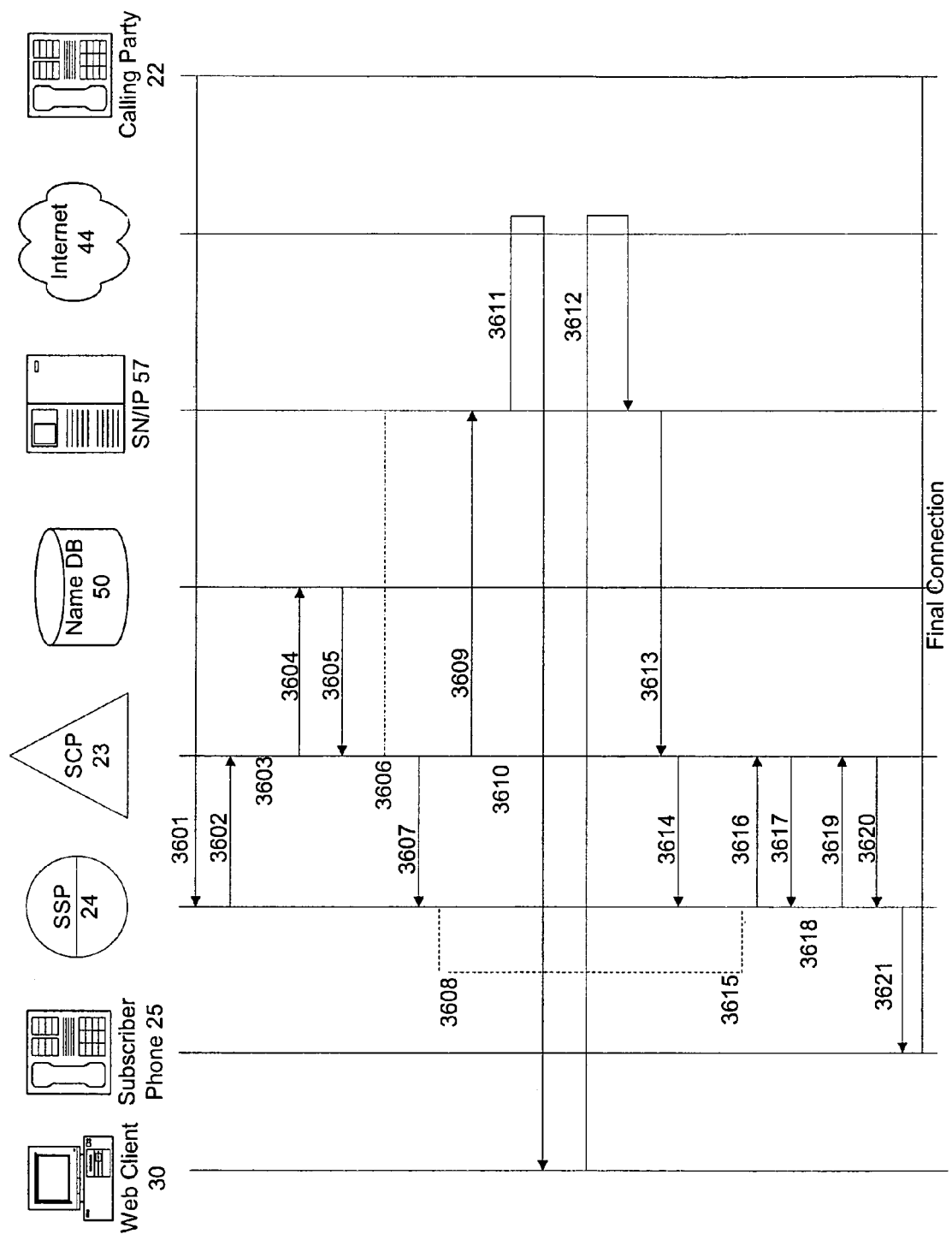
FIG. 36 is an exemplary call flow diagram of an alternative embodiment of the invention, in which the subscriber elects to accept the incoming telephone call, according to an aspect of the present invention.

FIG. 36 is a call flow diagram depicting the process by which the subscriber elects to accept the incoming telephone call, according to the alternative embodiment of FIG. 1. At step 3601, a telephone call is placed by the calling party 20 to the subscriber telephone 25. A TAT in the terminating SSP 24 causes the call to be suspended at the SSP 24. The trigger also causes the SSP 24 to transmit an AIN query message including the calling party number (if available) and called party number via the SS7 network and the appropriate STP 22 to the subscriber's serving SCP 23 at step 3602. At step 3603, a check is performed at the SCP 23 to confirm that the subscriber has voice mail service. Also, the SCP 23 determines whether the presentation restriction value is restricted or unavailable. If the presentation restriction value is restricted and the called party subscribes to the ACR service, an authorize termination response is sent to the SSP 24 allowing the call to be rejected. ACR prevents calls to subscribers when a calling party blocks their number.

If the calling party number is delivered with the query and the presentation restriction indicator for the incoming call is allowed, the SCP 23 launches a query to an LNP database (not pictured), for example, to determine whether the received calling party number is ported. The telephone number returned in the response is either equal to the calling party number sent in the query if the telephone number is not ported or the local routing number if the telephone number is ported. The telephone number from the response is used as the calling party number and checked against entries in a table to determine if the NPA-NXX belongs to a participating LEC.

If the calling party number is found to be a participating LEC, a query is launched to the name database 50 at step 3604 to retrieve the calling party's name. The name database 50 can be, for example, an external LIDB or a local real time database servicing the SCP 23. If the calling party number was not delivered with the query, or there is no participating LEC, or the presentation restriction indicator for the incoming call is anonymous or unavailable, the SCP 23 will not launch the query to the name database 50 and the SSP 24 terminates the suspended telephone call at the subscriber's line. If available, the calling party's name is sent to the SCP 23 from the name database 50 at step 3605.

At step 3606, the SCP 23 determines the on-line status of the subscriber. As discussed above, this information is previously provided by the SN/IP 57 to the SCP 23. Therefore, the SCP 23 simply retrieves the on-line status data from it subscriber database. If the subscriber is not currently on-line, the SCP 23 sends an authorize termination response to the SSP 24, which terminates the call to the subscriber's telephone line. However, if the subscriber is on-line, as shown in FIG. 36, the SCP 23 instructs the SSP 24 to play a "please hold" announcement to the calling party at step 3607 to request the calling party to hold the line (step 3608).

At step 3609, the SCP 23 sends an SIP invite to the SN/IP 57. The SIP invite contains the called party number, the calling party number (if available and not presentation restricted), the calling party name (if available and not presentation restricted), the IP address, the port number, the client software version, an indicator as to whether or not the subscriber has voice mail service and a session key. At step 3610, the SCP 23 sets a timer equal to a predetermined time, e.g., 25 seconds. In the event that the SN/IP 57 does not respond within the predetermined time (indicating a timeout condition) or responds with an error, the SCP 23 instructs the SSP 24 to stop playing the "please hold" announcement to the caller. Then, the SSP 24 begins playing an announcement to the caller or forwarding the call in accordance with the Intelligent Call Forwarding instructions. When voice mail is available, the message informs the caller that the call is being forwarded to a voice mail service. Lastly, the SCP 23 sends an authorize termination response to the SSP 24. If the subscriber does not have voice mail service, an error is reported and the SCP 23 sends an authorize termination response to the SSP 23. As a result, the SSP 23 terminates the suspended telephone call to the subscriber's telephone line and the call encounters any other features programmed on the line.

If no timeout occurs, at step 3611, the SN/IP 57 sends a message via the Internet 44 to the subscriber, which appears on the subscriber's display at the web client 30, informing the subscriber of the incoming call and presenting the subscriber with disposition options for the call. The message displayed may be a pop-up dialog box.

At step 3612, the subscriber elects to accept the telephone call, and as a result, the client software 34 responds to the SN/IP 57 with an OK message encrypted with the session key. In response, the SN/IP 57 initiates termination of the subscriber's Internet session. The SN/IP 57 also passes the subscriber's selection to accept the incoming call to the SCP 23 at step 3613. At step 3614, the SCP 23 instructs the SSP 24 to stop playing the "please hold" announcement to the caller. At step 3615, the "please hold" announcement is terminated by the SSP 24 and at step 3616 the SSP 24 sends a resource clear message to the SCP 23 confirming that the message is no longer playing.

At step 3617, the SCP 23 instructs the SSP 24 to begin playing a "will take your call" announcement to the caller (step 3618). At step 3619, the SSP 24 sends a resource clear message to the SCP 23. At the conclusion of the "will take your call" announcement, the SCP 23 sends an authorize termination response to the SSP 24 which terminates the suspended call to the subscriber's telephone line (steps 3620–3621). That is, the calling party 20 is connected to the subscriber telephone 25.

In comparison to FIG. 30, which is the call flow when the subscriber elects to accept an incoming call while on-line, according to the embodiment of FIG. 25, FIG. 36 differs only through step 3610. After step 3610, the embodiments are substantially the same. Therefore, substitution of steps 3601 through 3610 for the first 12 steps of the call flows in FIGS. 29–35 produces a corresponding call flow diagram depicting the alternative embodiment of FIG. 1. These alternative call flows will therefore not be repeated herein to avoid redundancy.

Figure 37:
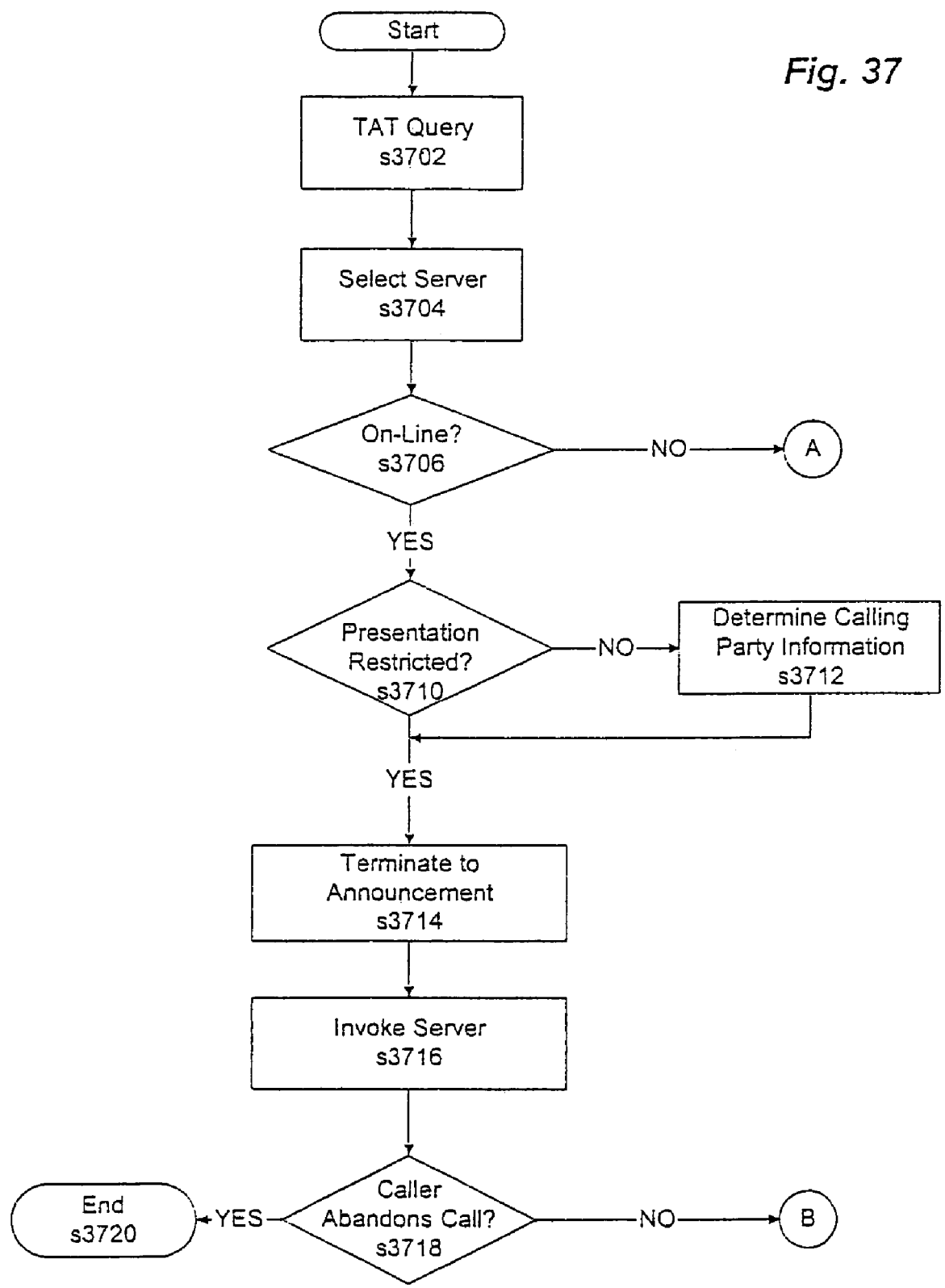
FIG. 37 is a flowchart of exemplary SCP service logic for Intelligent Call Forwarding and ICID, according to an aspect of the present invention.
Figure 38:
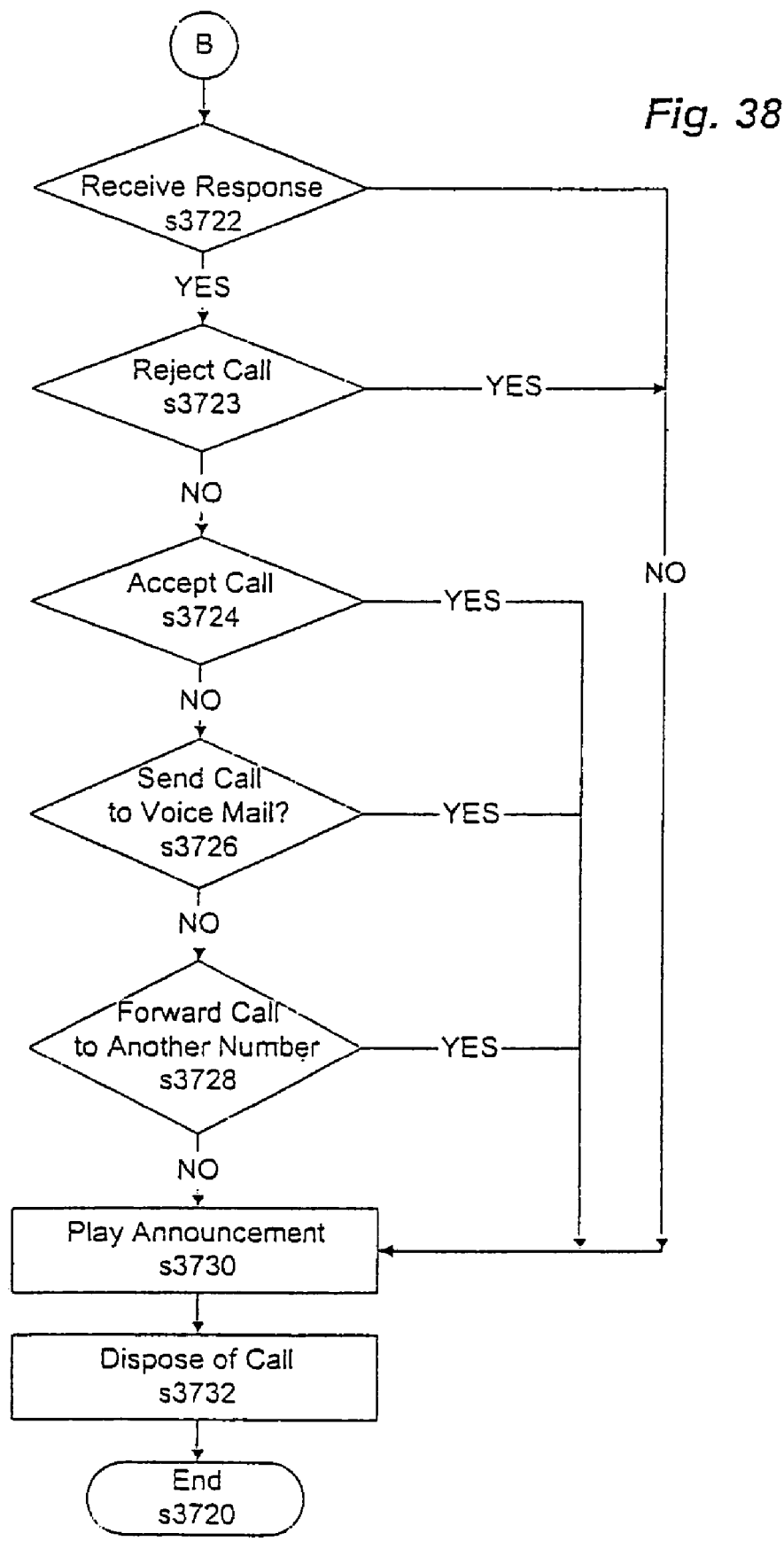
FIG. 38 is a continuation of the exemplary flowchart diagram of FIG. 38.
Figure 39:
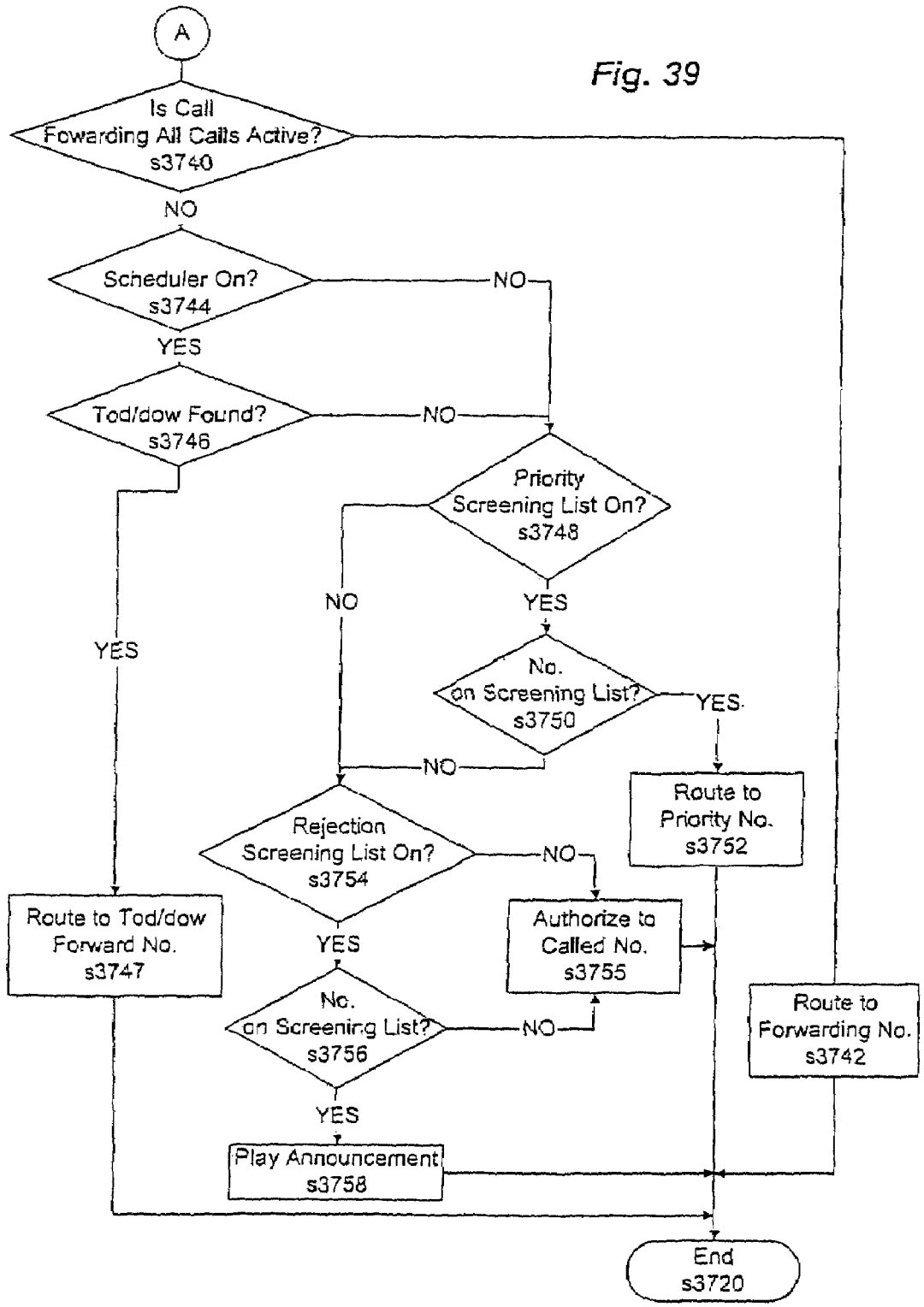
FIG. 39 is a continuation of the exemplary flowchart of FIG. 38.

FIGS. 37–39 show an exemplary flowchart diagram of the SCP service logic, according to an aspect of the present invention, whenever Intelligent Call Forwarding has been activated. At step s3702 of FIG. 37, a query, including the called party's telephone number and the calling party's telephone number, is received by the SCP 23 from the terminating switch SSP 24. At step s3704, a table is used to derive the local access and transport area (LATA) based upon the NPA-NXX of the called party number. In the embodiment depicted in FIG. 25, the LATA is used to determine the corresponding registration server 56 and ICW server 61 to query for the GetData and InvokeApp requests. The system selects from among multiple registration servers and ICW servers assigned to predetermined areas.

Subsequently, at step s3706 the SCP 23 launches a query to the appropriate server to obtain the subscriber's on-line status and sets a timer equal to a predetermined time, e.g., 2 seconds. If the query is unsuccessful, an error is reported and the SCP 23 instructs the SSP 24 to terminate the suspended call to the subscriber's line. If however, the query is successful, the subscriber's on-line status is determined at step s3706.

In an alternative embodiment, which incorporates the SN/IP 57 as shown in FIG. 1, there is no need for the SCP 23 to send a query to a server to determine the subscriber's on-line status. Instead, the SCP 23 already has that data stored and available. Every time the subscriber initiates an Internet session, a service node (e.g., the SN/IP 57) is notified. The service node, in turn, systematically notifies the SCP 23 that the subscriber is on-line and the SCP 23 stores the on-line status information. Therefore, when the SCP 23 receives a TAT query from SSP 24 regarding the subscriber's telephone number, the SCP 23 already has an on-line indication without having to query an external server. In other words, pursuant to the embodiment of FIG. 1, step s3704 is by-passed and step s3706 is executed using data already stored at the SCP 23.

If at step s3706, it is determined that the subscriber is not on-line, the SCP 23 instructs the SSP 24 according to any services associated with the called number. If the subscriber has Intelligent Call Forwarding, the SCP 23 proceeds to step s3740 of FIG. 39 to implement call forwarding options, as discussed below.

If the subscriber is on-line, a determination is made to ascertain whether the presentation restriction value is restricted or unavailable, at step s3710. If the presentation restriction indicator for the incoming call is "allowed," the SCP 23 launches a query to the LNP database 55 to determine whether the received calling party number is a ported telephone number at step s3712. If the query is successful, the telephone number returned in the response is either equal to the calling party number sent in the query if the telephone number is not ported, or the local routing number if the telephone number is ported. The telephone number returned in the response is checked against entries in a table to determine if the NPA-NXX belongs to a participating LEC, in which case a query is launched to the name database 50 to retrieve the calling party's name at step s3712.

If either query is not successful, an error is reported, the calling party name is set to null, and a determination is made as to whether the subscriber has voice mail service. Next, when the calling party name and number have been retrieved from the name database 50 at step s3714, a "please hold" announcement is played to the caller. If the subscriber has voice mail service, the caller is advised that the called party is on another call and that the caller should wait, and that the wait may take fifteen seconds. If the subscriber does not have voice mail service, the caller is advised that the called party is on another call, and that if the caller's call is not taken, the caller may hear a busy signal or be transferred to another number.

If the calling party name is not in the name database 50, an error is reported, the calling party name is set to null, and a determination is made as to whether the subscriber has voice mail service. Next, at step s3714 a "please hold" announcement is played to the caller. An appropriate message is played, depending on whether the subscriber has voice mail service.

If a call is received with a presentation restriction indicator of restricted (i.e., anonymous) and the subscriber has the ACR feature activated, an authorization response is sent to the SSP 24 and the suspended call attempts to terminate at the subscriber's line. If no ACR feature is active, or if the presentation restriction value is unavailable, the calling party name is set to null and the calling party number is set to anonymous or unavailable. Next, at step s3714 a "please hold" announcement is played to the caller. An appropriate message is played, depending on whether the subscriber has voice mail service.

At step s3716, the SCP 23 contacts the appropriate server (e.g., via an InvokeApp request to the ICW server 61 of FIG. 25) or service node (e.g., via an SIP invite to the SN/IP 57 of FIG. 1) with a request that includes the called party number, calling party number (if available and not presentation restricted), the calling party name (if available and not presentation restricted), IP address, port number, client software version number, and an indicator as to whether the subscriber has voice mail service. If there is no response within a predetermined time period, e.g., 25 seconds (indicating a timeout condition), an error is reported and an authorization response will be sent to the SSP 24 and the suspended call will attempt to terminate at the subscriber's line. If, however, there is a response within the predetermined time period, a determination is made as to whether the caller has abandoned the call at step s3718. If the call was abandoned, the connection is disconnected at step s3720. If the caller is still on the line, the server or the service node formats an Internet message to the client software 34 on the subscriber's PC 32, which causes a pop-up box dialog box to be displayed on the subscriber's display, informing the subscriber of the incoming call and presenting the subscriber with several call disposition options. Subsequently, the logic proceeds to step s3722 of FIG. 38.

Referring to FIG. 38, which continues the flow of FIG. 37, a check is made at step s3722 to determine whether the subscriber selected a call disposition option and the please hold announcement is terminated. If no call disposition option is made within a predetermined time period, the SCP 23 instructs the SSP 24 to begin playing a "call me back later" announcement at step s3730, after which the SSP 24 disposes of the call at step s3732, ending the logic flow at s3720.

If the subscriber selects a call disposition option (step s3722—YES), the SCP 23 first determines whether the subscriber has expressly rejected the call at step s3723. If the call is rejected (step s3723—YES), the SCP 23 instructs the SSP 24 to begin playing a "call me back later" announcement at step s3730, after which the SSP 24 disposes of the call at step s3732, ending the logic flow at s3720. If the call is not rejected (step s3723—NO), the logic flow proceeds to step s3724.

If the subscriber elects to accept the incoming call (step s3724—YES), the SCP 23 instructs the SSP 24 to begin playing a "will take your call" announcement at step s3730, after which the SCP 23 sends an authorize termination response to the SSP 24 which terminates the suspended call to the subscriber's telephone line at steps s3732 to s3720. Otherwise, the logic flow proceeds to step s3726 (step s3724—NO).

If the subscriber elects to forward the incoming call to voice mail service (step s3726—YES), the SCP 23 instructs the SSP 24 to begin playing an announcement to the caller that the call is being forwarded to a voice mail service at step s3730, after which the SCP 23 sends an authorize termination response to the SSP 24 at step s3732. The call is then connected to the subscriber's voice mail service. If the subscriber does not forward the call to voice mail (step s3726—NO), the logic flow proceeds to step s3728.

If the subscriber elects to forward the incoming call to another telephone line (step s3728—YES), the SCP 23 instructs the SSP 24 to begin playing a "forwarding to another number" announcement at step s3730, after which the SCP 23 sends a Forward Call response to the SSP 24 at step s3732. The call is then forwarded to the desired number. If the subscriber elects not to send the incoming call to another telephone line (step s3728—NO), the subscriber may select an announcement to be played to the caller at step s3730. The SCP 23 accordingly instructs the SSP 24 to begin playing the announcement selected by the subscriber at step s3730. One optional announcement advises the caller that the subscriber is busy and that the caller should call back later. Another option advises the caller that the subscriber is busy and that the subscriber will call the caller back later. After the selected announcement is played to the caller, the logic ends at step s3720.

FIG. 39 continues the flow from FIG. 37 whenever it is determined that an Intelligent Call Forwarding subscriber is not on-line. At step s3740, the SCP 23 determines whether call forwarding for all calls is active. If so, the incoming call is routed to the forwarding number at step s3742. If not, it is determined whether the scheduler is active at step at s3744. If the scheduler is ON, and the tod/dow is found at step s3746, the SCP 23 processes calls according to the tod/dow table, if populated, at step s3747. Processing the call according to the tod/dow table may include terminating the call to the subscriber telephone number if the time of day and day of the week correspond to a deactivation period.

If at step s3744, it is determined that the scheduler is OFF, or if at step s3746, it is determined that the scheduler is ON but the tod/dow table is not populated, the SCP 23 determines whether the subscriber has identified special routing instructions based on the calling party number. First, the SCP 23 determines whether the priority screening list is ON at step s3748 and, if so, whether the calling party number is on that list at step s3750. Whenever the calling party number is on the priority screening list (step s3750—YES), the SCP 23 instructs the SSP 24 to route the incoming call to a pre-designated priority telephone number at step s3752, ending the call, at s3720.

When the calling party number is not on the priority screening list (step s3750—NO), or when the priority screening list is OFF (step s3748—NO), the SCP 23 goes on to determine whether the rejection screening list is ON at step s3754. Whenever the rejection screening list is ON, the SCP 23 determines whether the calling party number is on that list at step s3756. Whenever the calling party number is on the rejection screening list (step s3756—YES), the SCP 23 instructs the SSP 24 to play an announcement at step s3758 rejecting the caller. In an alternative embodiment of the invention, the SCP 23 instructs the SSP 24 to terminate the incoming call to a directory number, without an announcement, predesignated by the subscriber to receive rejected telephone calls, such as an voice message center, where the call is terminated. Whenever the rejection screening list is OFF (step s3754—NO), or the rejection screening list is ON, but the calling party number is not on the list (step s3756—NO), the SCP 23 instructs the SSP 24 to route the call to the called number at step s3755, ending the process at s3720.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to e-mail or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

What is claimed is:

1. A method for interfacing with a call forwarding service that forwards calls placed to a number of a subscriber to a forward-to number, and that includes call forwarding service data comprising at least one of a screening list, indicating at least one telephone number, and a schedule, indicating at least one activation period, the method comprising:

transmitting display data from a call forwarding service server through a packet switched data network to a graphical user interface of the subscriber;

displaying at least a portion of the display data on a first screen of the graphical user interface, the first screen comprising a forward-to number field and at least one of a plurality of activation fields, the activation fields comprising a first activation indicator corresponding to the call forwarding service, a second activation indicator corresponding to the screening list and a third activation indicator corresponding to the schedule;

receiving data indicating the forward-to number entered in the forward-to number field;

receiving selection data entered by the subscriber in response to the first screen, the selection data indicating one of an ON condition and an OFF condition corresponding to the at least one of the plurality of activation fields;

activating the call forwarding service in response to an ON condition corresponding to the first activation indicator, and implementing call forwarding functionality, subject to the screening list and the schedule, to forward calls to the forward-to number;

activating the screening list in response to an ON condition corresponding to the second activation indicator, forwarding only calls from the at least one number to the forward-to number when the call forwarding functionality is active; and activating the weekly schedule in response to an ON condition corresponding to the third activation indicator, enabling the call forwarding functionality only during the at least one activation period.

2. The method according to claim 1, in which the first screen further comprises a list creation field corresponding to the screening list, the method further comprising:

transmitting additional display data from the server to display a second screen on the graphical user interface in response to selection of the list creation field, the second screen comprising a screening table including a name column and a priority telephone number column;

receiving additional selection data indicating at least one name, entered in the name column, and a corresponding priority telephone number, entered in the priority telephone number column; and forwarding only calls from the at least one priority telephone number to the forward-to number when the call forwarding functionality is active and when the screening list is activated in response to the ON condition corresponding to the second activation indicator.

3. The method according to claim 1, in which the first screen further comprises a schedule creation field corresponding to the schedule, the method further comprising:

transmitting additional display data from the server to display a third screen on the graphical user interface in response to selection of the schedule field, the third screen comprising a schedule table including a plurality of columns corresponding to a plurality of days in a week, each of the plurality of columns comprising at least one start field and a corresponding stop field;

receiving schedule data indicating the at least one activation period, comprising at least one start time and a corresponding stop time during one of the plurality of days, the start time and the corresponding stop time corresponding to the start field and the stop field of the column corresponding to the one of the plurality of days; and activating the call forwarding functionality only during the at least one activation period when the schedule is activated in response to the ON condition corresponding to the third activation indicator.

4. A system for implementing a call forwarding service of a subscriber, the call forwarding service including call forwarding service data corresponding to a telephone number of the subscriber and comprising a screening list indicating at least one telephone number and a schedule indicating at least one activation period, the system comprising:

a service control point that processes telephone calls in a public switched telecommunications network, the service control point being configured to communicate with a database comprising the call forwarding service data; and a web server, enabling a communications interface between the database and a graphical user interface of the subscriber via a packet switched data network;

wherein the web server transmits display data relating to the call forwarding service to display a first screen on the graphical user interface, the first screen comprising a forward-to number field and a plurality of activation fields, the activation fields comprising a first activation indicator corresponding to the call forwarding service, a second activation indicator corresponding to the screening list and a third activation indicator corresponding to the schedule, each of the activation indicators showing one of an ON and an OFF condition.

5. The system for implementing the call forwarding service of the subscriber according to claim 4, wherein the database receives data entered at the graphical user interface, the entered data indicating the forward-to number entered in the forward-to number field and a plurality of selection conditions corresponding to the activation indicators of the plurality of activation fields, the database updating the call forwarding service data in accordance with the entered data; and wherein the service control point retrieves the updated call forwarding service data and processes calls to the subscriber telephone number in accordance with the updated call forwarding service data, including activating the call forwarding service in response to the ON condition corresponding to the first activation indicator to implement call forwarding functionality to forward calls to the forward-to number, activating the screening list in response to the ON condition corresponding to the second activator indication to forward only calls from the at least one number to the forward-to number when the call forwarding functionality is active, and activating the schedule in response to the ON condition corresponding to the third activation indicator to enable the call forwarding functionality only during the at least one activation period.

6. The system for implementing the call forwarding service of the subscriber according to claim 5, wherein the first screen further comprises a list creation field corresponding to the screening list; and wherein the web server further transmits additional display data to display a second screen on the graphical user interface in response to selection of the list creation field, the second screen comprising a screening table including a name column and a priority telephone number column.

7. The system for implementing the call forwarding service of the subscriber according to claim 6, wherein the database receives screening data indicating at least one name, entered in the name column, and a corresponding priority telephone number, entered in the priority telephone number column; and wherein the service control point retrieves the screening data from the database and forwards only calls from the at least one priority telephone number to the forward-to number when the call forwarding functionality is active and when the screening list is activated in response to the ON condition corresponding to the second activation indicator.

8. The system for implementing the call forwarding service of the subscriber according to claim 5, wherein the first screen further comprises a schedule creation field corresponding to the schedule; and wherein the web server further transmits additional display data to display a third screen on the graphical user interface in response to selection of the schedule field, the third screen comprising a schedule table including a plurality of columns corresponding to a plurality of days in a week, each of the plurality of columns comprising at least one start field and a corresponding stop field.

9. The system for implementing the call forwarding service of the subscriber according to claim 8, wherein the database receives schedule data indicating the at least one activation period, comprising at least one start time and a corresponding stop time during one of the plurality of days, the start time and the corresponding stop time corresponding to the start field and the stop field of the column corresponding to the one of the plurality of days; and wherein the service control point retrieves the schedule data from the database and activates the call forwarding functionality only during the at least one activation period when the schedule is activated in response to the ON condition corresponding to the third activation indicator.

\* \* \* \* \*